(12) United States Patent
Kesler

(10) Patent No.: US 12,219,963 B2
(45) Date of Patent: Feb. 11, 2025

(54) AUTOMATED PIZZA-MAKING SYSTEM

(71) Applicant: James R. Kesler, Chino, CA (US)

(72) Inventor: James R. Kesler, Chino, CA (US)

( * ) Notice: Subject to any disclaimer, the term of this patent is extended or adjusted under 35 U.S.C. 154(b) by 378 days.

(21) Appl. No.: 17/448,329

(22) Filed: Sep. 21, 2021

(65) Prior Publication Data

US 2022/0071219 A1   Mar. 10, 2022

Related U.S. Application Data

(63) Continuation of application No. 16/817,467, filed on Mar. 12, 2020, now Pat. No. 11,178,879.

(51) Int. Cl.

| | | |
|---|---|---|
| A21C 9/08 | (2006.01) | |
| A21B 1/48 | (2006.01) | |
| A21C 9/04 | (2006.01) | |
| A21C 11/00 | (2006.01) | |
| A21C 11/10 | (2006.01) | |
| A21C 13/02 | (2006.01) | |
| B65G 15/12 | (2006.01) | |
| B65G 17/12 | (2006.01) | |
| B65G 17/32 | (2006.01) | |
| B65G 65/48 | (2006.01) | |
| F24C 15/30 | (2006.01) | |

(52) U.S. Cl.
CPC ............... *A21C 9/083* (2013.01); *A21B 1/48* (2013.01); *A21C 9/04* (2013.01); *A21C 11/006* (2013.01); *A21C 11/10* (2013.01); *A21C 13/02* (2013.01); *B65G 15/12* (2013.01); *B65G 17/123* (2013.01); *B65G 17/32* (2013.01); *B65G 65/4872* (2013.01); *F24C 15/30* (2013.01)

(58) Field of Classification Search
CPC ............................... A21C 15/002; A21C 9/04
See application file for complete search history.

(56) References Cited

U.S. PATENT DOCUMENTS

| | | |
|---|---|---|
| 3,602,154 A | 8/1971 | Schimkat et al. |
| 3,946,856 A | 3/1976 | Herrera |
| 4,014,428 A | 3/1977 | Ossbahr |
| 4,152,976 A * | 5/1979 | Kawasaki ............... A21C 9/04 |
| | | 426/292 |
| 4,184,421 A | 1/1980 | Ahlgren |

(Continued)

FOREIGN PATENT DOCUMENTS

| | | | |
|---|---|---|---|
| CN | 205266774 U | 6/2016 | |
| EP | 1388286 A1 * | 2/2004 | ............... A21C 9/04 |

(Continued)

OTHER PUBLICATIONS

Chicago Deep Dish Pizza with Spinach, 2016, https://www.savorytooth.com/chicago-deep-dish-pizza-spinach/ (Year: 2016).

*Primary Examiner* — John J Norton
(74) *Attorney, Agent, or Firm* — VIA LLP

(57) ABSTRACT

A vehicle-based, automated pizza-making system including a two-piece pizza pan conveyed between pizza-making components on a series of pan drive rails. The two-piece pizza pan can include a base and a removable ring for containing the unfinished pizza and toppings. The rails can include timing belts for conveying the two-piece pizza pan through the system with improved positional control and accuracy.

17 Claims, 56 Drawing Sheets

(56) References Cited

U.S. PATENT DOCUMENTS

| | | | |
|---|---|---|---|
| 4,248,173 A * | 2/1981 | Kuhlman | A21C 9/04 118/20 |
| 4,539,213 A | 9/1985 | Cherkasky et al. | |
| 4,546,873 A | 10/1985 | Debenham et al. | |
| 4,632,836 A | 12/1986 | Abbott et al. | |
| 4,634,365 A | 1/1987 | Triporo et al. | |
| 5,074,777 A | 12/1991 | Garner | |
| 5,154,115 A | 10/1992 | Kian | |
| 5,469,779 A | 11/1995 | Amore et al. | |
| 5,678,475 A | 10/1997 | Villar Otero | |
| 5,845,805 A | 12/1998 | Ragland | |
| 5,921,170 A | 7/1999 | Khatchadourian et al. | |
| 5,997,924 A | 12/1999 | Olander, Jr. et al. | |
| 6,245,370 B1 | 6/2001 | Pilati et al. | |
| 6,363,838 B1 | 4/2002 | Tomatis | |
| 6,550,632 B2 | 4/2003 | Gubbini et al. | |
| 6,629,493 B1 | 10/2003 | Schaible, II et al. | |
| 6,915,734 B2 | 7/2005 | Torghele et al. | |
| 7,790,213 B2 | 9/2010 | Lakossavas | |
| 7,913,970 B2 | 3/2011 | Bennet et al. | |
| 8,252,353 B2 | 8/2012 | Hrudka | |
| 8,425,959 B2 | 4/2013 | Westberg | |
| 8,710,408 B2 | 4/2014 | Khatchadourian et al. | |
| 9,016,493 B2 | 4/2015 | Friedl et al. | |
| D749,888 S | 2/2016 | Magistro | |
| 9,914,223 B2 | 3/2018 | Fritz-Jung et al. | |
| 9,999,228 B2 | 6/2018 | Fernando | |
| 10,140,587 B2 | 11/2018 | Garden | |
| 11,178,879 B2 | 11/2021 | Kelser | |
| 2002/0022071 A1 * | 2/2002 | Hansen | A21C 9/04 426/289 |
| 2004/0011219 A1 | 1/2004 | Sioutis et al. | |
| 2008/0187637 A1 * | 8/2008 | Spiegel | A21C 9/04 99/485 |
| 2011/0059209 A1 | 3/2011 | Khatchadourian | |
| 2012/0024170 A1 * | 2/2012 | Fritz-Jung | B25J 11/00 99/450.1 |
| 2013/0259628 A1 | 10/2013 | Hirasawa | |
| 2013/0295262 A1 | 11/2013 | Giordano | |
| 2014/0050825 A1 * | 2/2014 | van Blokland | A21C 9/08 118/712 |
| 2014/0373734 A1 | 12/2014 | Gianni | |
| 2017/0065123 A1 | 3/2017 | Fox | |
| 2017/0290345 A1 | 10/2017 | Garden | |
| 2018/0158153 A1 | 6/2018 | Ekin | |
| 2018/0338504 A1 | 11/2018 | Lavri | |
| 2018/0343875 A1 | 12/2018 | Miceli | |
| 2019/0037859 A1 | 2/2019 | Hamon | |
| 2019/0054625 A1 | 2/2019 | Fritz-Jung et al. | |
| 2019/0059645 A1 | 2/2019 | Nelson et al. | |
| 2019/0124933 A1 * | 5/2019 | Hamon | A21C 9/04 |
| 2021/0282409 A1 | 9/2021 | Kelser | |

FOREIGN PATENT DOCUMENTS

| | | |
|---|---|---|
| WO | WO 92/08358 | 5/1992 |
| WO | WO 2005/015509 | 2/2005 |
| WO | WO 2017/134147 | 8/2017 |

* cited by examiner

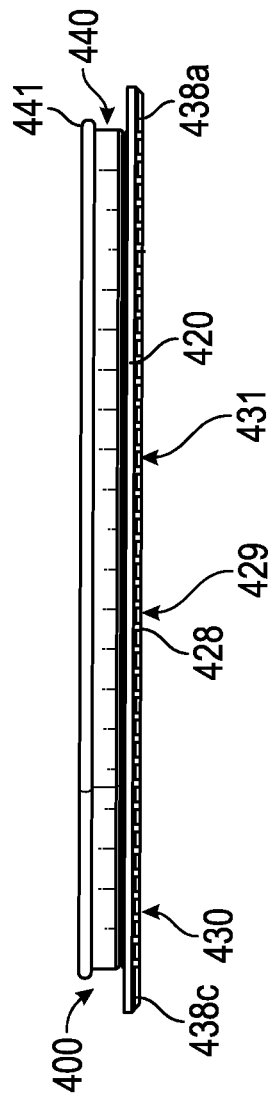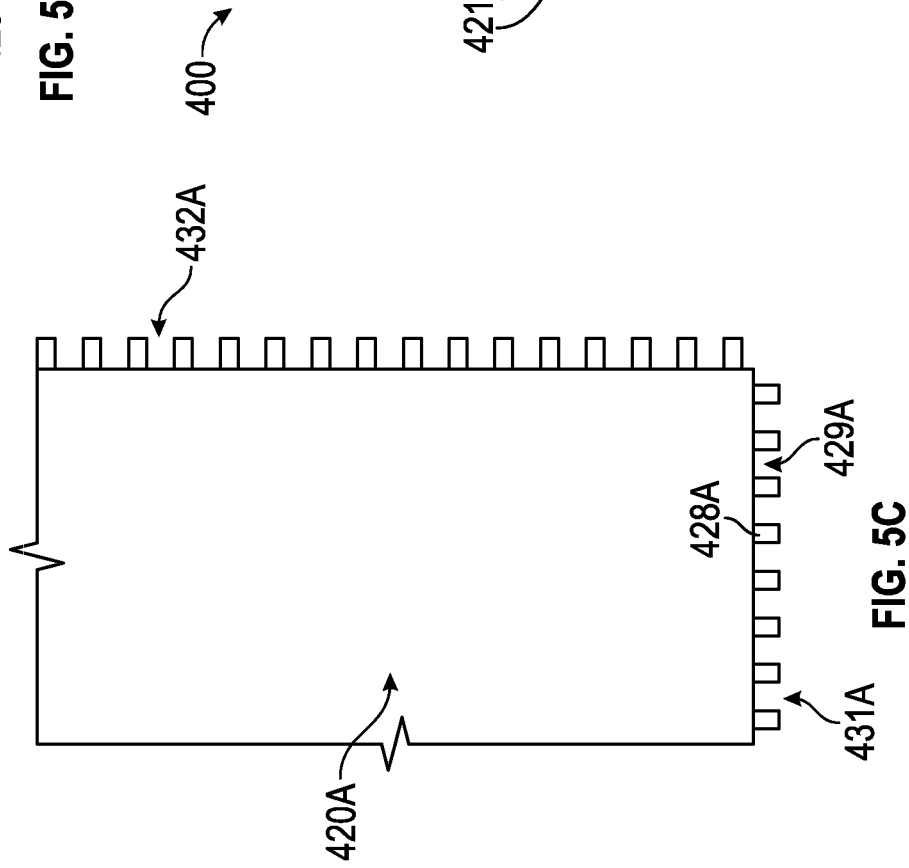

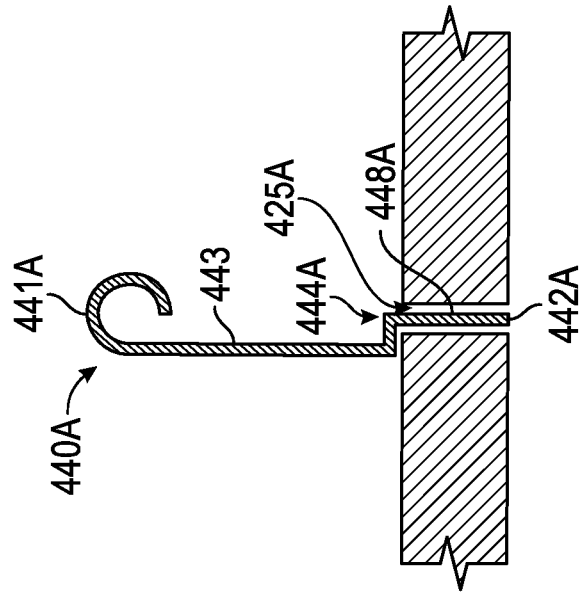
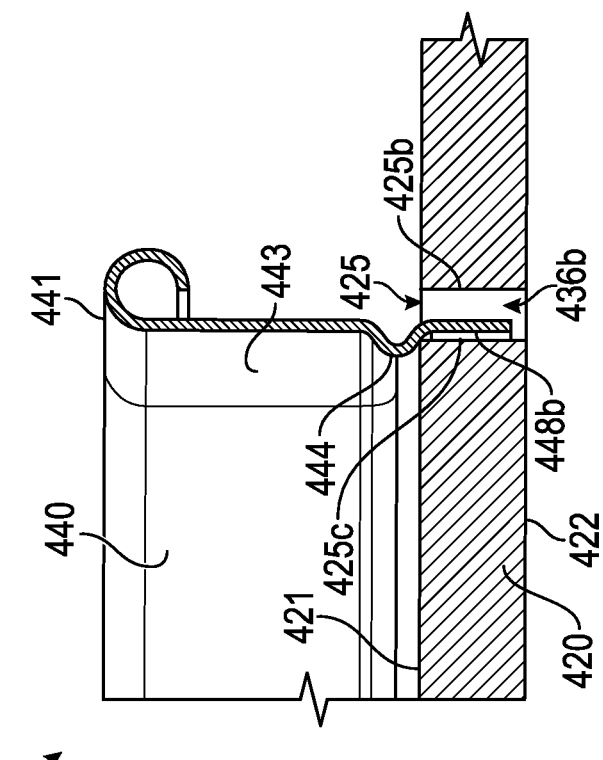

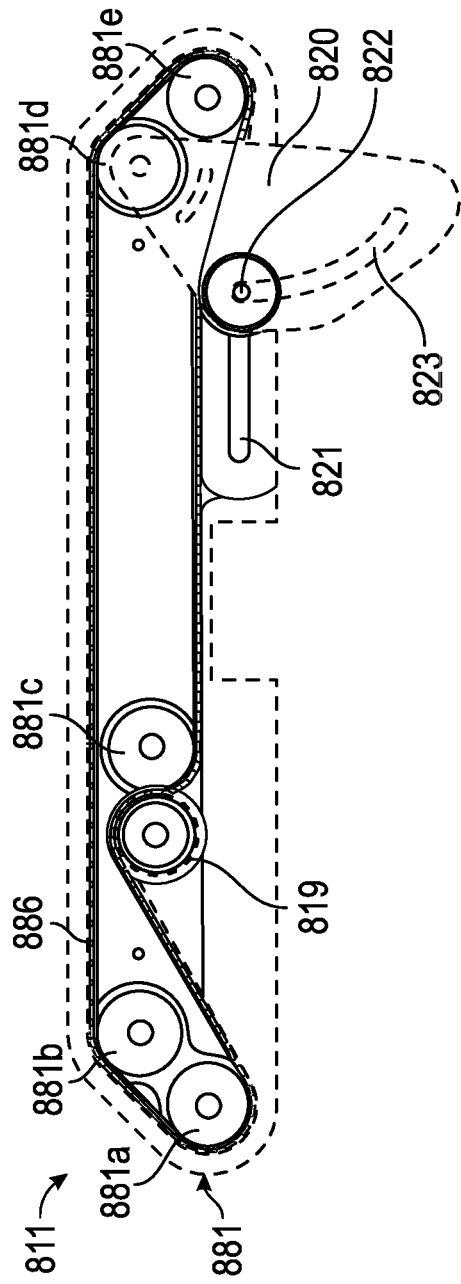
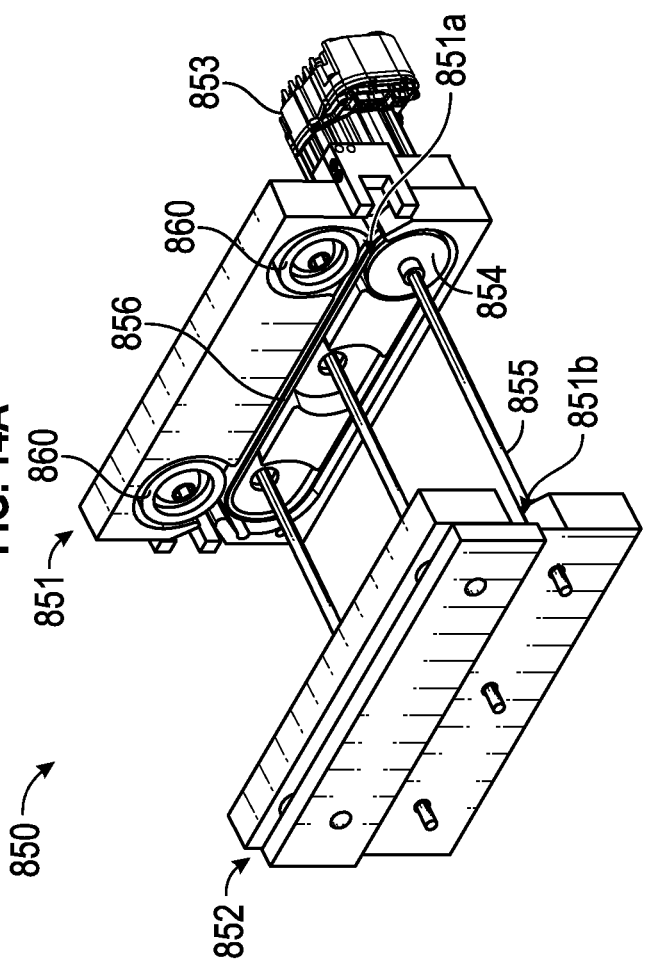

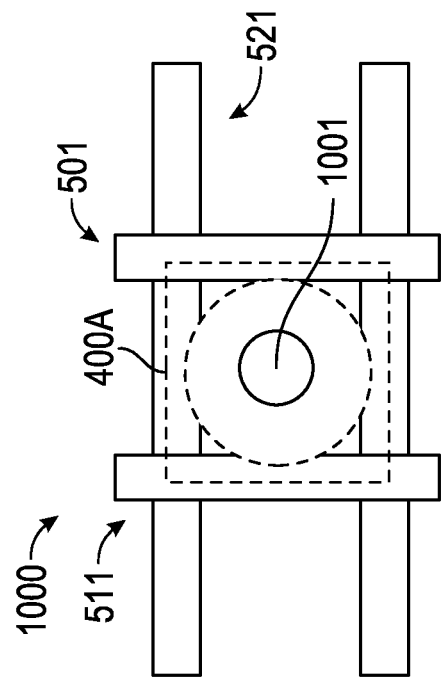
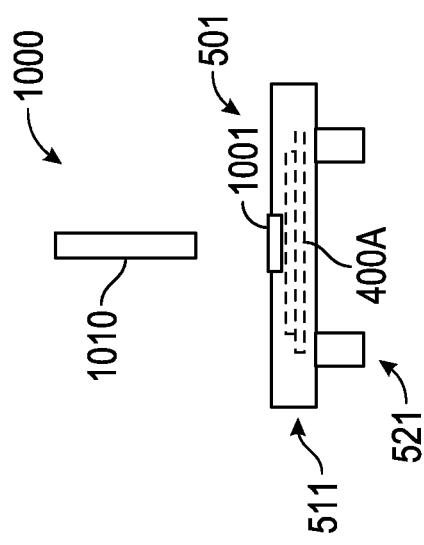
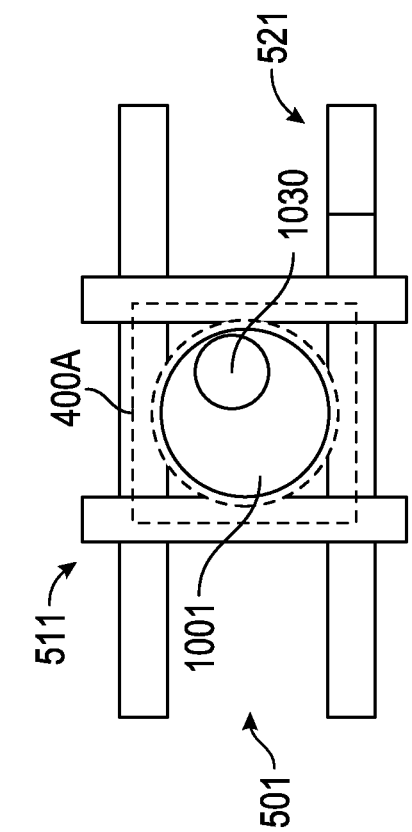
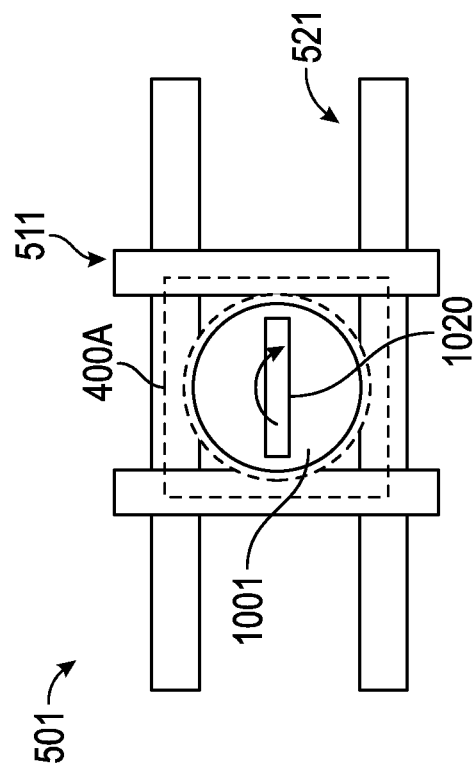
FIG. 16A
FIG. 16B
FIG. 16C
FIG. 16D

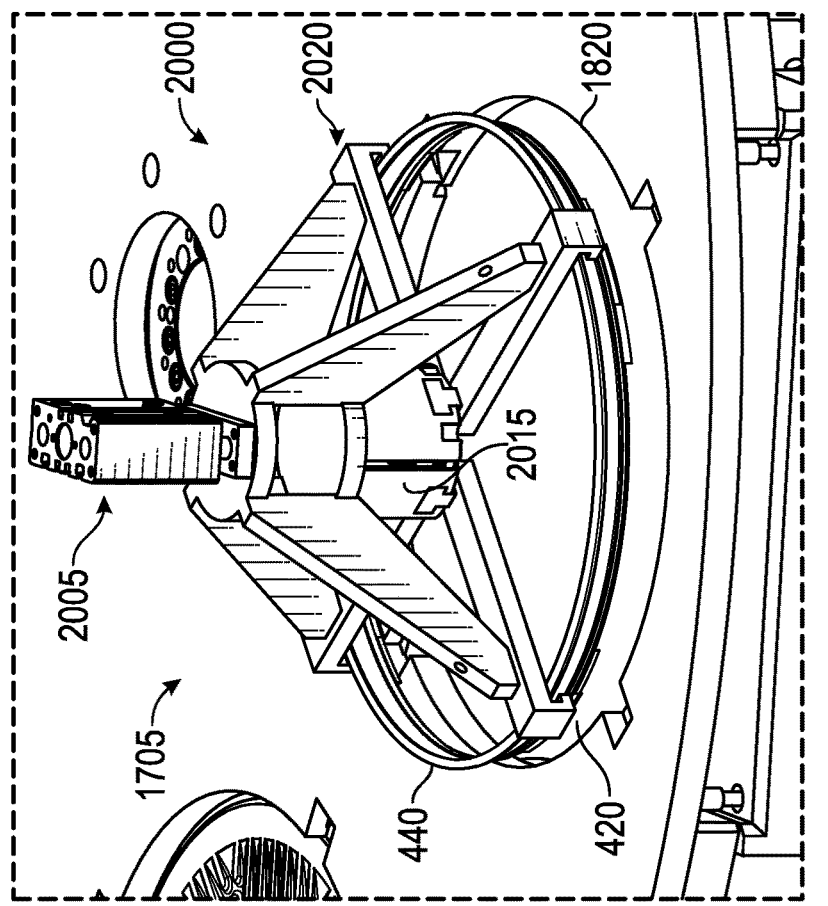
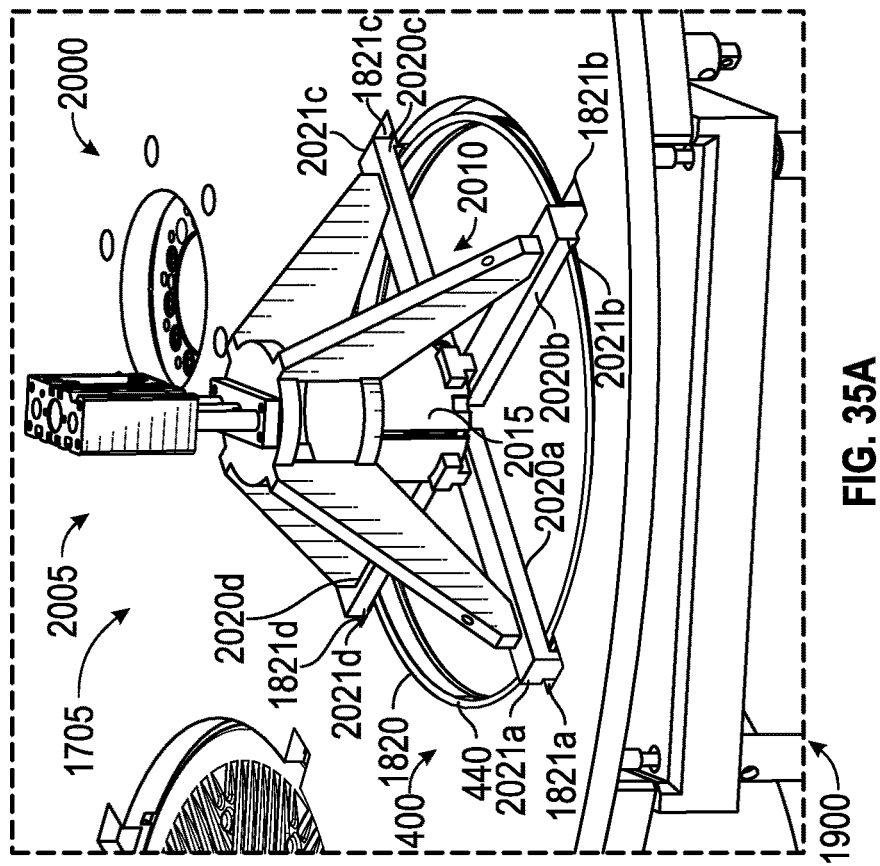
FIG. 35B
FIG. 35A

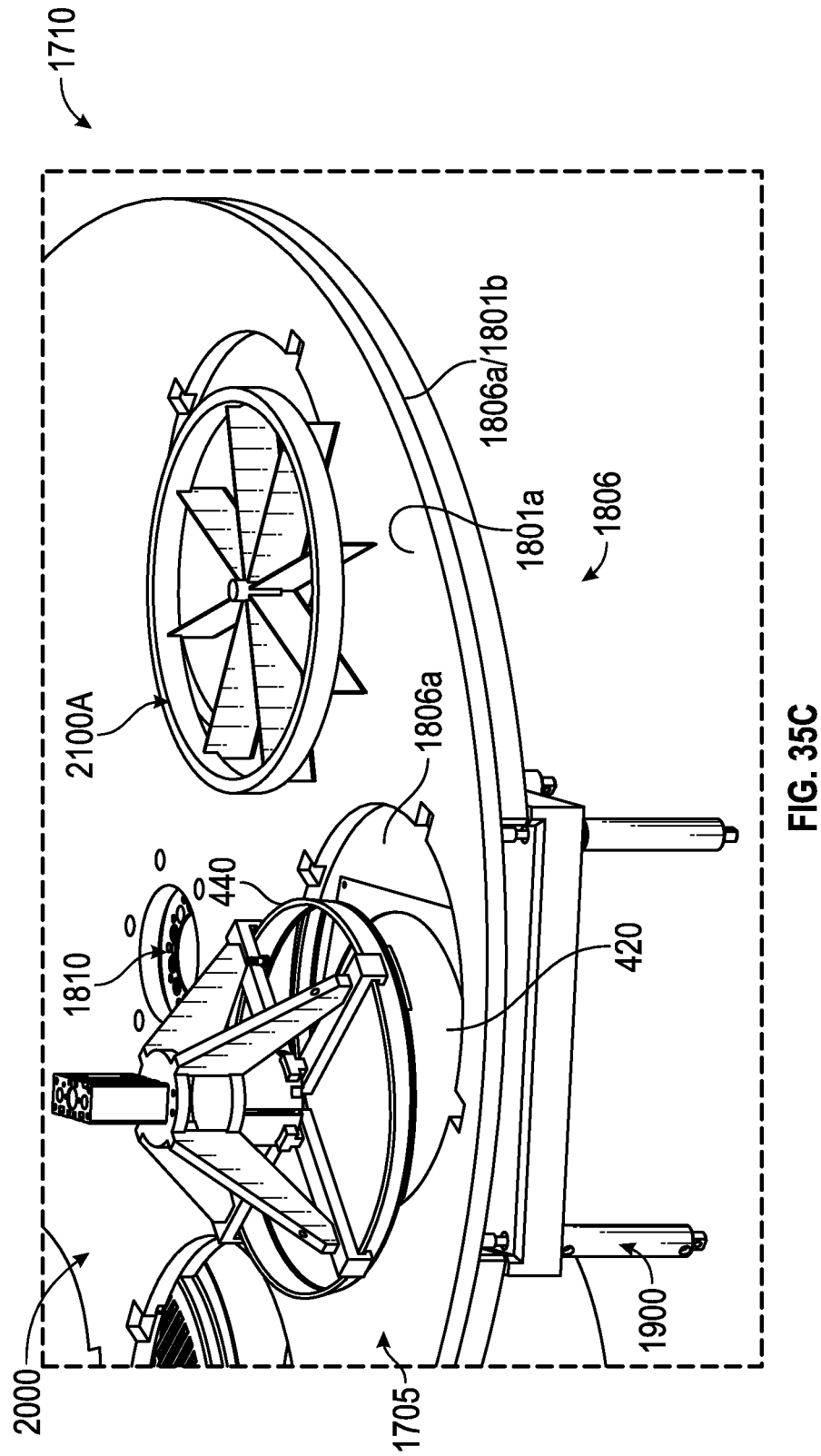

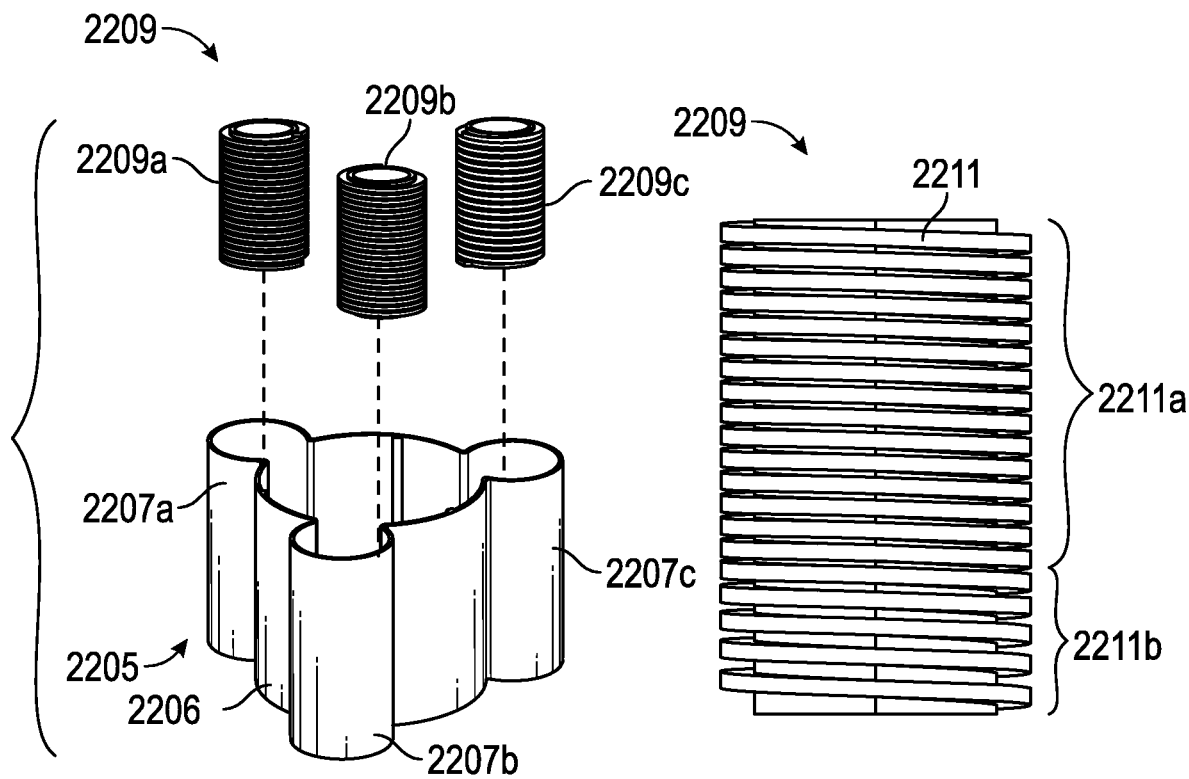
FIG. 37A
FIG. 37B
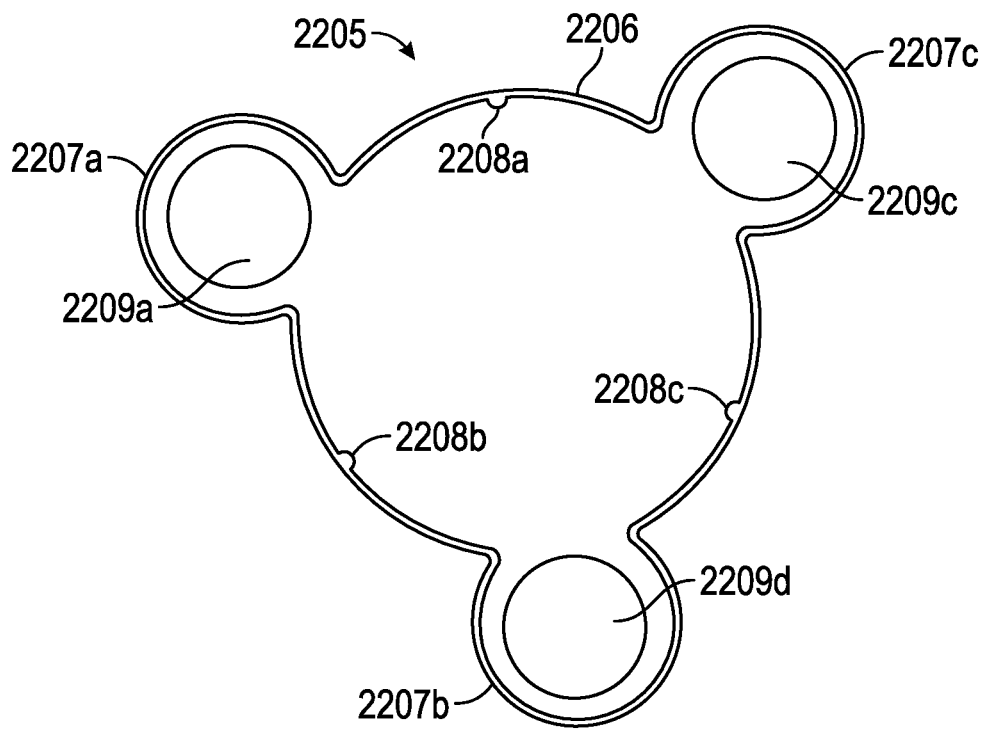
FIG. 37C

AUTOMATED PIZZA-MAKING SYSTEM

INCORPORATION BY REFERENCE TO PRIORITY APPLICATIONS

This application is a continuation of application of U.S. patent application Ser. No. 16/817,467, filed Mar. 12, 2020. The disclosure of this prior application is hereby incorporated by reference herein in its entirety and should be considered a part of this specification for all purposes. Any and all applications for which a foreign or domestic priority claim is identified in the Application Data Sheet as filed with the present application are hereby incorporated by reference under 37 CFR 1.57.

BACKGROUND

Field

This disclosure generally relates to an automated pizza-making system and related methods.

Related Art

The process of creating a pizza has traditionally been completed entirely by human labor. This process generally includes proofing, dough shaping, adding sauces and toppings, baking in an oven, and boxing the finished pizza. Previous attempts have been made to automate various aspects of the pizza-making process and/or to robotically assist human labor.

SUMMARY

The present disclosure includes improved pizza-making systems, sub-systems, and methods. According to one aspect, an automated pizza-making system includes a dough divider and rounder component, a dough proofing component, a dough press component, a sauce dispenser component, a bulk topping dispenser component, a loose topping component, a pre-oven queue component, an oven component, and/or a finishing component. Any of these pizza-making components can be staged as successive stations. The finishing component can include a ring removal station, a slicing station, a glazing station, and/or a boxing station.

According to another aspect, the automated pizza-making system can be mounted on a vehicle and operated to deliver pizzas on-location and on-demand in an efficient manner. Accordingly, the automated pizza-making system can be adapted for conveyance in a moving vehicle. Dough (e.g., in cooked or uncooked form) can be conveyed through the system on two-piece pizza pans. The two-piece pizza pans can include a removable ring fixed within a base. The removable ring can contain the dough and toppings on the base. The two-piece pizza pans can be conveyed between components of the system using pan conveyance system. The pan conveyance system can include a series of pan drive systems. Each of the components or stations can be associated with a pan drive system. The pan drive system can include a pair of rails having pan slots. The base of the two-piece pizza pan can be secured within the pan slots during conveyance.

The foregoing summary is illustrative only and is not intended to be limiting. Other aspects, features, and advantages of the systems, devices, and methods and/or other subject matter described in this application will become apparent in the teachings set forth below. The summary is provided to introduce a selection of some of the concepts of this disclosure. The summary is not intended to identify key or essential features of any subject matter described herein

BRIEF DESCRIPTION OF THE DRAWINGS

Various examples are depicted in the accompanying drawings for illustrative purposes, and should in no way be interpreted as limiting the scope of the examples. Various features of different disclosed examples can be combined to form additional examples, which are part of this disclosure.

FIG. 5C shows a side view of the two-piece pizza pan;

FIG. 5D shows an alternative two-piece pizza pan;

FIG. 6A shows a cross-sectional view taken along the line 6A-6A in FIG. 5B;

FIG. 6B shows a cross-sectional view taken along the line 6B-6B in FIG. 5B;

FIG. 6C shows an alternative two-piece pizza pan cross section;

FIG. 14A shows an interior of a rail of another alternative first pair of rails including a chain drive system;

FIG. 14B shows a slip pan drive system;

FIG. 16A is a schematic example of a sauce station;

FIG. 16B is a top view of a sauce dispenser at the sauce station with dispensed sauce on a dough supported by a pizza pan;

FIG. 16C shows distribution of the dispensed sauce across the dough of the pizza pan using a rotary brush system;

FIG. 16D shows distribution of the dispensed sauce across the dough of the pizza pan by moving the pizza pan;

FIGS. 35A-B show removing a ring from a pizza pan;

FIG. 35C shows rotating the upper dial member to advance a pizza to a slicing station;

FIGS. 37A-C show a hopper of the boxing station including a dispensing mechanism;

DETAILED DESCRIPTION

The various features and advantages of the systems, devices, and methods of the technology described herein will become more fully apparent from the following description of the examples illustrated in the figures. These examples are intended to illustrate the principles of this disclosure, and this disclosure should not be limited to merely the illustrated examples. The features of the illustrated examples can be modified, combined, removed, and/or substituted as will be apparent to those of ordinary skill in the art upon consideration of the principles disclosed herein.

System Overview

Figure 1:
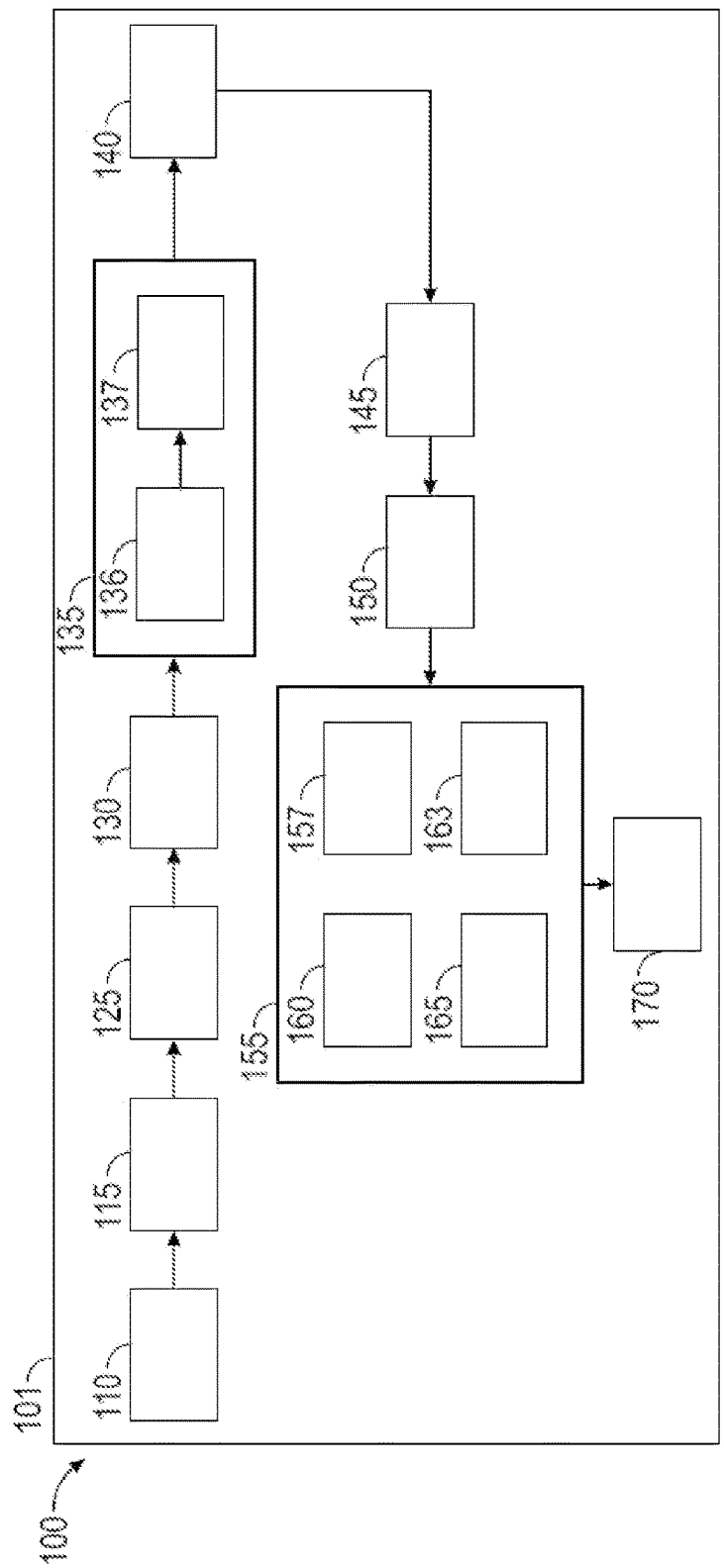
FIG. 1 shows a schematic overview of an automated pizza-making system.

FIG. 1 illustrates a schematic overview of an automated pizza-making system 100 for processing a pizza from refrigerated dough to a finished, boxed pizza. As a complete system, the automated pizza-making system 100 can process raw dough into a finished, boxed pizza without requiring human intervention. The automated pizza-making system 100 can receive an order for a custom pizza from a person (e.g., via a mobile device application) and process that order to prepare and deliver the custom pizza. In other implementations, any one (or more) of the components of the automated pizza-making system 100 can be used in conjunction with human labor to complement a manual pizza making process. Each of the components of the automated pizza-making system 100 can be a separate station or one or more of the components can be combined at a single station.

The system 100 can be located within a fixed or mobile structure 101. A pan conveyance system can transport a pizza pan from station to station (e.g., within the structure 101). The pan conveyance system can include pan drive systems (as described further below), one or more robotically controlled arms, or other conveyance means. In one example, a robotic arm including a plurality of articulable joints and linkages can be positioned to convey a movable pizza support through one or more of the components of the system 100 to complete the pizza. In another example, the movable pizza support can be conveyed on a rail system.

The automated pizza-making system 100 can include a dough divider and rounder component 110. The dough divider and rounder component 110 can portion raw dough and ball it into shape for proofing. The dough divider and rounder component 110 can receive a raw dough in a frozen or semi-frozen state from a refrigerated storage area. The dough divider system can separate a portion of the raw dough for balling. A rounding or balling system can shape and/or tension the portions of the raw dough. The divider and rounder component 110 can be an off-the-shelf system or contain off-the-shelf components for slicing raw dough into portions and/or rounding/tensioning the sliced portions. The divider and rounder component 110 can include an ejection mechanism (e.g., slide) for placing individual dough balls on individual pizza pans. The conveyance system can position the pizza pans for receiving the dough balls.

The automated pizza-making system 100 can include a proofing component 115. The proofing component 115 can store one or more raw dough balls until adequately proofed for further processing by the automated pizza-making system 100. The proofing component 115 can be used in conjunction with a plurality of pizza pans to proof the dough balls. The proofing component 115 can store the raw dough balls on the pizza pans. The proofing component 115 can include one or more racks for storing the pizza pans. The pizza pans can be movable into and/or out of the rack using the conveyance system. The proofing component 115 can be in a temperature controlled portion of the system 100 that maintains ideal proofing conditions. The proofing component 115 can enable the dough to proof for a specific or predetermined amount of time at the correct temperature and humidity. In certain implementations, the proofing time can be based on the temperature of the proofing portion, the mass of the rounded dough balls, and/or demand for the proofing dough by the remainder of the automated pizza-making system 100. To slow or halt proofing, the pan and dough ball can be moved to a cooler portion, or the temperature of the proofing portion can be lowered (e.g., by opening one or more vents).

The automated pizza-making system 100 can include a dough press component 125. The dough press component 125 can press the proofed dough on a pizza pan. The dough press component 125 can include one or more press members, one of which can be moveable, to compress the dough balls. The dough balls, on the respective pizza pans, can be aligned with the movable press member and the press member can be actuated to press the dough ball against the respective pizza pan. The movable press member can include recesses to form a cornicione within the pressed dough. In certain implementations, the dough press component 125 can be used in conjunction with a lubricant dispenser such as an oil spritzer, flour duster or other material for inhibiting sticking of the dough to the press member. In certain implementations, the press member and/or pizza pan can include a non-stick coating, such as a Teflon or ceramic coating, to inhibit sticking of the dough to press.

In certain implementations, the dough press component 125 can include one or more heated components. For example, an upper press member can be heated. The heating can act on an outer surface of the dough to partially dry or cook an outer skin thereof. This can facilitate release of the pressed dough from the press member.

The automated pizza-making system 100 can include a sauce dispenser component 130. The sauce dispenser component 130 can dispense and/or spread one or more sauces on the pressed dough. The sauce dispenser component 130 can include one or a plurality of different sauces. In certain implementations, each different sauce can include its own dispensing mechanism. The pressed dough on the pizza pan can be positioned below a dispenser nozzle of the sauce dispenser component 130. A sauce can be dispensed onto the pressed dough contained on the pizza pan.

In certain implementations, the sauce dispenser component 130 can include a spreading mechanism for spreading the sauce evenly over the pressed dough. The spreading mechanism can be a rotatable brush, air knife, or fixed spreader. The spreading mechanism can ensure an even distribution of the sauce over the dough. The sauce dispenser component 130 can also include a camera or other optical sensor to ensure spreading has been completed. The spreading mechanism can be deployable to contact the pressed dough and retractable allow advancement of the pizza pan through the automated pizza-making system 100. Each sauce dispenser can include its own spreading mechanism to avoid cross-contamination therebetween.

The automated pizza-making system 100 can include a bulk topping dispenser component 135. The bulk topping dispenser component 135 can slice bulk foods, such as block cheeses or processed meats, for dispensing onto the pressed dough. The bulk topping dispenser component 135 can store a bulk topping in a hopper. The hopper can align and/or feed the bulk topping into a slicing system (e.g., using a belt or ram). The slicing system can include a rotating blade (or grater) coupled with a motor for performing the slicing grating. In certain implementations, the bulk topping dispenser component 135 can comprise several different slicing and dispensing mechanisms. For example, the bulk topping dispenser component 135 can include one or more cheese grater components 136 and one or more meat slicer components 137.

The bulk topping dispenser component 135 including a slicer has several advantages over dispensing pre-sliced cheese or meats. Storage of bulk foods requires less space than pre-grated cheese or pre-sliced pepperoni, for example. Bulk foods can also be more easily mechanically secured and advanced through a distribution system (e.g., hopper), given the larger shape. Pre-shredded cheeses also generally require an anti-caking agent such as cellulose to prevent sticking or balling that would cause blockage in a distribution system and prevent consistent cheese placement. Pre-sliced pepperoni can also be difficult to mechanically separate from adjacent pieces. The bulk topping dispenser component 135 including a slicer also can allow selection of thickness of the bulk foods sliced. For example, a user can specify the desired thickness of a meat or cheese slice.

The automated pizza-making system 100 can include a loose topping dispenser component 140. The loose topping dispenser component 140 can mix one or more loose toppings and distribute the mixed loose toppings onto the pressed dough. The loose toppings can include conventional pizza toppings such as fresh, frozen, or canned vegetables, fruits, and meats. The loose topping dispenser component 140 can separately store single toppings in a loose, flowable format, such as in one or more hoppers. The loose topping dispenser component 140 can funnel one or more of the different loose toppings into a mixing and distribution assembly. A mixing system can mix the loose toppings together to provide for an even distribution across the pressed dough. A distribution system can drop the mixed loose topping onto the pressed dough. In certain implementations, the loose topping dispenser component 140 can include multiple loose topping stations. For example, a first loose topping station can exclude meats, allergens, or other types of toppings. This can prevent cross-contamination of the mixing and distribution assemblies between the two loose topping stations.

The automated pizza-making system 100 can include a pre-oven queue component 145. The pre-oven queue component 145 can temporarily store and/or reorder the pizza pans before cooking. The pre-oven queue component 145 can include a plurality of racks for storing individual pizza pans with pizzas contained thereon. The pre-oven queue component 145 can include the racks distributed both horizontally and/or vertically. The pre-oven queue component 145 can be located adjacent to an oven component 150. The pre-oven queue component 145 can be useful for delaying the cooking of all pizzas or of a particular pizza. The pre-oven queue component 145 can be useful for reordering the pizza being cooked. For example, the oven component 150 can require a lead time to heat to cooking temperatures. In another example, an order can be received by the automated pizza-making system 100 in advanced of when it needs to be cooked. The automated pizza-making system 100 can prepare the pizza with all of the toppings and then wait until it is closer to the delivery window/location to cook the pizza by storing it in the rack. The pizza can thus be cooking and finished closer to the time of arrival of the delivery time/location to the customer. This can facilitate delivering the pizzas in a hot state and/or the pizzas not needing to be stored after cooking.

The automated pizza-making system 100 can include an oven component 150. The oven component 150 can be integrated with the pan conveyance system. For example, the oven component 150 can include pan drive rails. The oven component 150 can be heated to temperatures conventional for cooking pizzas.

The automated pizza-making system 100 can include a finish system component 155. The finish system component 155 can receive the pizzas after being cooked in the oven component 150. The finish system component 155 can remove the cooked pizza from the respective pizza pan, slice the pizza into pieces, apply a glaze, and/or box the finished pizza. The finish system component 155 can include a pan removal component 157 for removing the cooked pizza from the pizza pan. The finish system component 155 can include a slicer component 160 for cutting the cooked pizza into individual slices. The slicer component 160 can cut the pizza into a number of slices (e.g., predetermined or customizable). The slicer component 160 can include more than one blade set to prevent cross contamination between pizzas (e.g., between vegetarian and non-vegetarian type pizzas). The finish system component 155 can include a glazer component 163 for applying one or more glazes on the cooked pizza. The finish system component 155 can include a boxer system component 165 for boxing the cooked pizza within a pizza box. The pizza box can include a bottom that is fully separable from a lid. The completed box with cooked pizza inside can then be ejected or stored in a retrieval component 170 until retrieved or ejected by the automated pizza-making system 100.

Figure 2B:
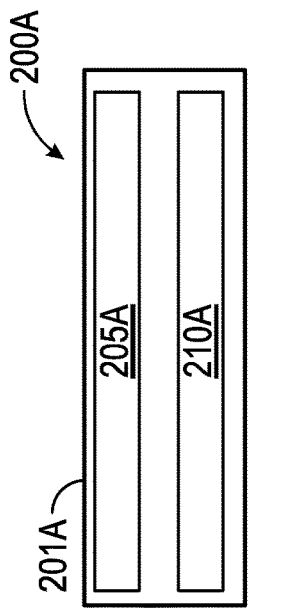
FIG. 2B shows a side view of a schematic layout of an automated pizza-making system in a vehicle.
Figure 2A:
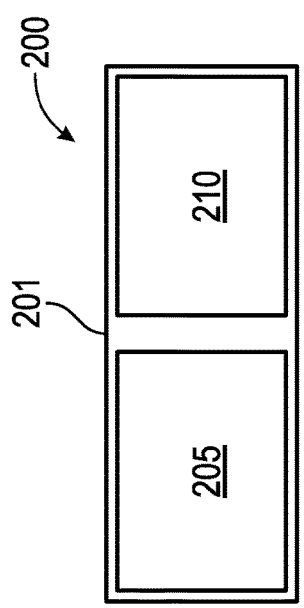
FIG. 2A shows a top view of a schematic layout of an automated pizza-making system in a vehicle.

FIG. 2A shows a schematic layout of a vehicle 200. The vehicle 200 can be, for example, a truck with the automated pizza-making system 100 (or various components thereof) contained in a rear portion 201 thereof. The vehicle 200 can include a refrigerated partition 205 thermally separated from an unrefrigerated partition 210. The unrefrigerated partition 210 can be at least partially separated from the refrigerated partition 205. For example there can be one or more pathways for a pizza pan to pass between the refrigerated partition and the unrefrigerated partition 210. The refrigerated partition 205 can be coupled with a source of cooled air for refrigeration. This can prevent or inhibit the buildup of bacteria that would lead to spoilage of material ingredients of the pizzas and can also prevent the buildup of harmful non-bacterial and other contaminants on the components of the automated pizza-making system 100. The refrigerated partition 205 can contain one or more components of system 100 that can benefit from refrigeration. The refrigerated partition 205 can contain the dough divider and rounder component 110 (including raw dough), the sauce dispenser component 130, the bulk topping dispenser component 135, loose topping dispenser component 140, and/or pre-oven queue component 145. The refrigerated partition 205 can also provide storage for raw dough, loose pizza toppings, bulk toppings (such as processed meats and/or block cheeses), and/or sauces or glazes for preparing the finished pizzas. The unrefrigerated partition 210 can include other components of the automated pizza-making system that benefit from elevated or normal temperatures. The unrefrigerated components 220 can include components such as the proofing component 115, the dough press component 125, the oven component 150, the finish system component 155, and/or the retrieval component 170. As an alternative to the vehicle 200, the system 100 can be located within a fixed structure or kiosk including the refrigerated partition 205 and the unrefrigerated partition 210.

FIG. 2B shows a side view of another schematic layout of the automated pizza-making system 100 on a rear portion 201A of a vehicle 200A. The vehicle 200A can include a refrigerated partition 205A thermally separated from an unrefrigerated partition 210A. One or more portions of the refrigerated partition 205A can be located vertically above one or more of the other components of the automated pizza-making system 100. For example, the refrigerated partition 205A can be located above the dough divider and rounder component 110, the sauce dispenser component 130, the bulk topping dispenser component 135 and/or the loose topping dispenser component 140. A supply of materials (e.g., food in loose or bulk form, sauces, etc.) associated with each of these components can be gravity fed into the distribution mechanism of the component from the refrigerated partition 205A (e.g., through one or more conduits).

Figure 3A:
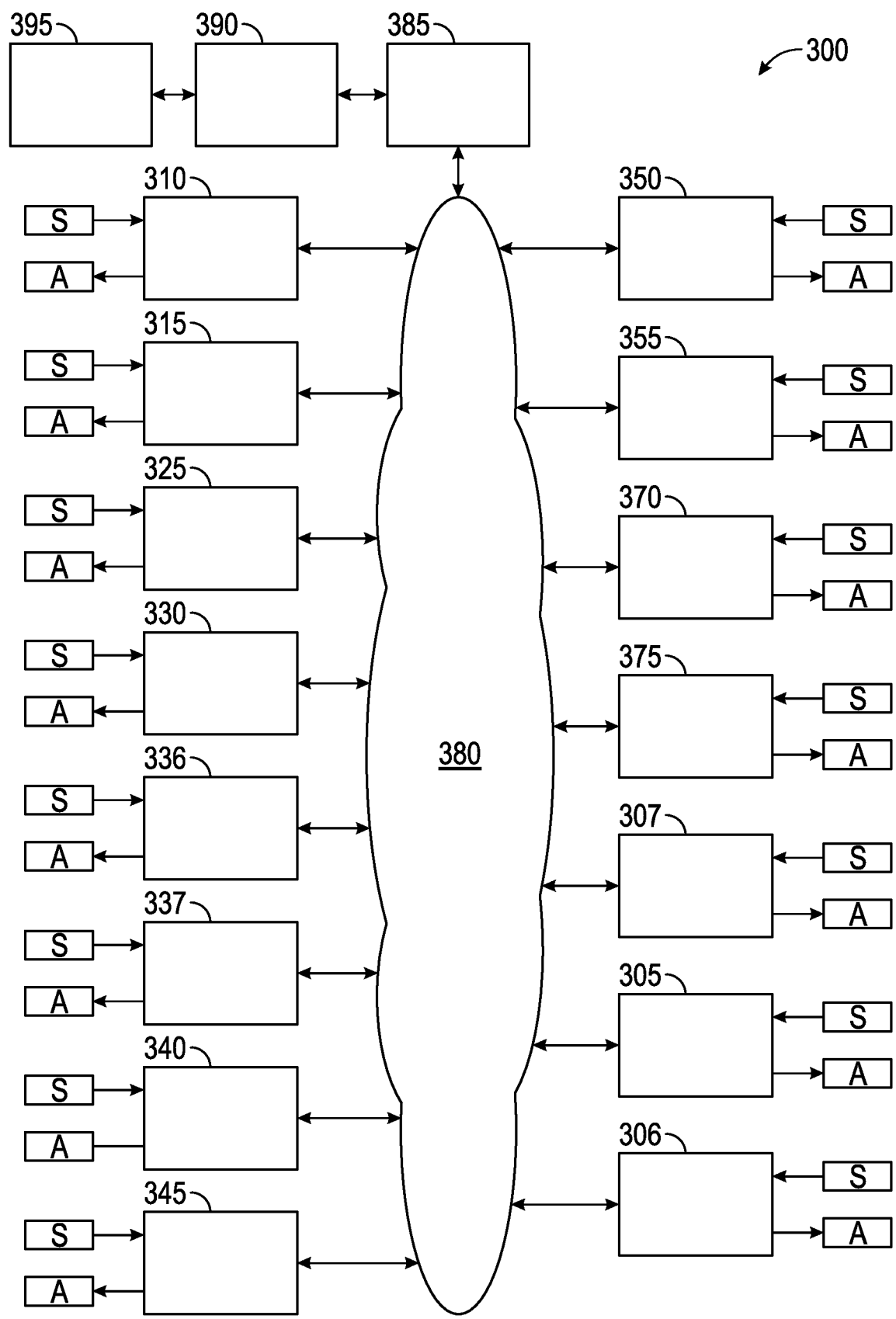
FIG. 3A shows a communication diagram for an automated pizza-making system.

FIG. 3A shows a schematic for a control system 300 for the automated pizza-making system 100. The control system 300 can operate the automated pizza-making system 100 as well as interface the automated pizza-making system 100 with users, operators, and/or one or more vehicles 200. The control system 300 can include a plurality of controllers, such as computers or microcontrollers having processes and executable code thereon, a plurality of sensors, and a plurality of actuators connected by wired or wireless connections.

The control system 300 can include a business master system (BMS) 395. The BMS 395 can include a user interface for receiving pizza orders (e.g., on a mobile device or computer). The orders can include ingredients, destinations, and/or delivery times or windows. The BMS 395 can select a vehicle (e.g., from a fleet of vehicles) for fulfilling the order. The BMS 395 can send the order to the vehicle. The selection of the vehicle can be based on the location or route of the vehicle, ingredients in-stock, pizza queue status or other factors. In certain implementations, the vehicle can be autonomous or operated by a human driver. The user interface can also provide status updates to a user. The status updates can include the location of a vehicle, status of pizza within the automated pizza-making system 100, and/or estimated time of delivery. The BMS 395 can update a routing for the vehicle and/or a production queue for preparing the order.

The control system 300 can include a vehicle master system (VMS) 390. In certain implementations, each of the vehicles of the system can include a VMS 390. The VMS 390 can interface with the BMS 395 to exchange orders, routing updates, queue updates, and/or status updates. The VMS 390 can include a user interface for providing and/or receiving routing information, order status, system status and/or indicate any errors in the system. The VMS can also include a navigation system that interfaces with GPS or other system for determining the location of the vehicle and provide directions to the delivery locations.

The control system 300 can include a master production controller (MPC) 385. In certain implementations, each of the vehicles can include a MPC 385. The MPC 385 can interface with VMS 390 to receive the order. The MPC 385 can operate the components of the automated pizza-making system 100 on the vehicle to prepare a pizza according to a received order. The MPC 385 can coordinate movements and sequences of tasks that are performed by the various components of the automated pizza-making system 100. The MPC 385 can communicate with the VMS 390 to adjust the queue of the automated pizza-making system 100 based on the status of the pizza within the automated pizza-making system 100, the routing of the vehicle, and/or the delivery window of the order.

The control system 300 can include a production system network 380. The production system network 380 can interface with one or more sensors in the pizza-making system 100 and relay information about system status to the VMS 390.

The production system network 380 can link the MPC 385 with one or more controllers used to operate the components of the automated pizza-making system 100. The controllers of the automated pizza-making system 100 can be coupled with one or more sensors S and one or more actuators A for operating the respective components of the automated pizza-making system 100. The sensors S can variously include location, distance, temperature, optical, magnetic, Hall, encoders, or other sensor types. The actuators A can variously include motors, servos, linear actuators, or other actuator types. Data from the sensors S can be received by the respective controllers and/or the MPC 385. The controllers can operate the respective components using the actuators A based on signals from the MPC 385 and/or the respective sensors S.

The controllers of the system 100 can include: a dough divider and rounder controller 310 for operating the divider and rounder component 110, a proofing controller 315 for controlling the proofing component 115, a dough press controller 325 for controlling the dough press component 125, a sauce controller 330 for controlling the sauce dispenser component 130, a cheese grater controller 336 for operating the cheese grater component 136, a sliced meat controller 337 for controlling the meat slicer component 137, a loose topping controller 340 for controlling the loose topping dispenser component 140, a pre-oven queue controller 345 for controlling the pre-oven queue component 145, an oven controller 350 for controlling the oven component 150, a finish controller 355 for controlling the finish system component 155, a boxing system controller 375 for controlling a boxing system component, and/or an ejector controller 370 for controlling the retrieval component 170. The control system 300 can include a dough cell temperature controller 307, a cold cell temperature control 305 controlling the temperature of the refrigerated partition 205, and/or a hot temperature controller 306 for managing temperature of the unrefrigerated partition 210.

Figure 3B:
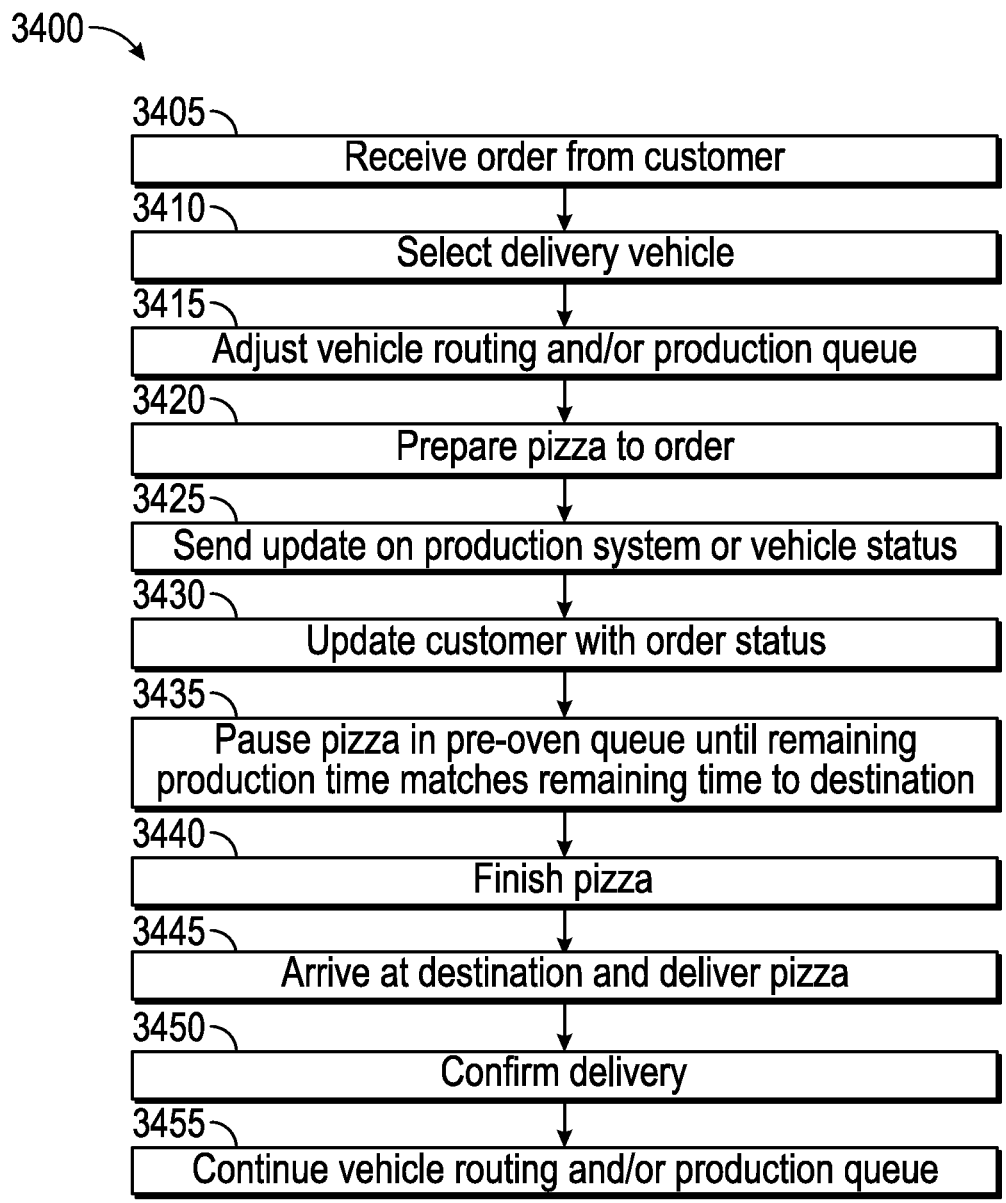
FIG. 3B shows a method of operating an automated pizza-making system.

FIG. 3B shows a method 3400 of ordering and creating a pizza using the automated pizza-making system 100 and the control system 300 according to the present disclosure. At step 3405, the BMS 395 can receive an order. The order can be entered by a customer via a user interface in a device such as a phone or computer. The phone or computer can be linked with the system using a wireless or wired connection. The order can include ingredients for one or more pizzas, a delivery location, and/or a delivery time. The order can also include other additional information.

At step 3410, the BMS 395 can select a delivery vehicle of one or more vehicles based on the information in the order and one or more attributes of the vehicles. The BMS 395 can select the most capable vehicle. The selection of a delivery vehicle can be based on the contents or ingredients that available on the vehicles, the number of orders being processed on the vehicles, the delivery location or time of the order, and/or the location of the vehicles relative to the delivery location.

At step 3415, the BMS 395 can add the destination to the production queue for the vehicle. The BMS 395 can adjust routing of the vehicle to add the destination to the navigation list of the vehicle. The BMS 395 can adjust the routing and/or the delivery queue order to deliver the orders in an efficient manner. The BMS 395 sends the order to a selected vehicle.

At step 3420, the VMS 390 communicating with the BMS 395 receives the order information. The VMS 390 sends the ingredients of the order information to the MPC 385 for operating the pizza-making components of the system 100 to create the ordered pizza.

At step 3425, the VMS 390 can receive information from the MPC 385 about the production state of the order, the ingredient inventory, and/or any other equipment statuses. The VMS 390 can update the BMS 395 with the location of the vehicle, estimated production time, estimated delivery time, production status, equipment status, and/or ingredient inventory status. The status updates between the MPC 385, the VMS 390 and/or the BMS 395 can occur regularly through the process 3400.

At step 3430, the BMS 395 can update the customer regarding the production status of the pizza, the location of the vehicle, and/or estimated delivery time. The status updates to the customer can occur regularly through the process 3400.

At step 3435, the MPC 385 can communicate with the VMS 390 to time the finishing and delivery of the ordered pizza with the delivery time. The pizza can be halted in a pre-oven queue component. In the pre-oven queue, the ordered pizza can wait until the estimated remaining time remaining for the vehicle to arrive at the delivery location for the order matches the estimated remaining production time for the pizza. When this timing condition is met at step 3440, the ordered pizza can be removed from the pre-oven queue to continue processing through the system (e.g., moved into the oven).

At step 3445, the vehicle arrives at the destination. Approximately at the same time, the ordered pizza is finished and delivered to the customer.

At step 3450, the MPC 385 can confirm the ordered pizza is finished to the VMS 390. The driver or another component of the system can confirm delivery of the ordered pizza to the customer. The VMS 390 can update the BMS 395 regarding the order status. The BMS 395 can update the status of the order to the customer in the user interface.

At step 3455, the BMS 395 can update the production queue for the vehicle. The VMS 390 can continue routing of the vehicle to the next destination associated with the next order. The MPC 385 can continue production of subsequent orders.

FIGS. 4A-6B illustrate a two-piece pizza pan 400. The two-piece pizza pan 400 can include a base 420 and a removable ring 440. The base 420 can be generally planar. The base 420 can include an upper surface 421 and a lower surface 422. The base 420 can be rectangular in shape. In certain implementations, the base 420 can be square, circular or otherwise shaped. In certain implementations, the two-piece pizza pan can be formed out of a steel sheet or other metal material. The two-piece pizza pan 400 of the base 420 and the upper surface 421 can be coated with a non-stick substance (e.g., Teflon, ceramic, or other) or texture to allow release of a dough contained on the upper surface 421. Dimensions of the base 420 can generally be in the range of 6 inches to 48 inches (length, width). Dimensions of the removable ring 440 can generally be in the range of more than 6 inches and less than 48 inches (diameter).

The base 420 can include linear (gear) tracks 430 for conveying the pan along a rail system. The base 420 can include first and second linear tracks 431, 432. The first linear track 431 can extend along a first side of the base 420. The second linear track 432 can extend along a second side of the base 420. The second side can be opposite the first side of the base 420. The base 420 can include third and fourth linear tracks 433, 434. The third linear track 433 can extend along a third side of the base 420. The fourth linear track 434 can extend along a fourth side of the base 420. The fourth side can be opposite the third side. The linear tracks can extend from corner-to-corner of the base 420. The first, second, third and fourth side of the base 420 can include a chamfered edge. The chamfered edge can extend along the sides for the base 420 and/or along the teeth 428 of the linear tracks 430. The linear tracks 430 can be located on the upper surface 421 and/or the lower surface 422 (as illustrated).

Each of the linear tracks can comprise a plurality of teeth 428 and grooves 429. The teeth 428 and grooves 429 can be aligned linearly and spaced evenly. The teeth 428 can be aligned with the lower surface 422. A depth and/or spacing of the teeth 428 and the grooves 429 of the linear tracks 430 can be changed to accommodate teeth and grooves in a timing belt used to convey the two-piece pizza pan 400. The grooves 429 can be recessed from the lower surface 422. The linear tracks can extend along an outer edge of the sides of the base 420. Alternatively, one or more of the linear tracks can be disposed inward from the sides of the base 420.

Figure 5A:
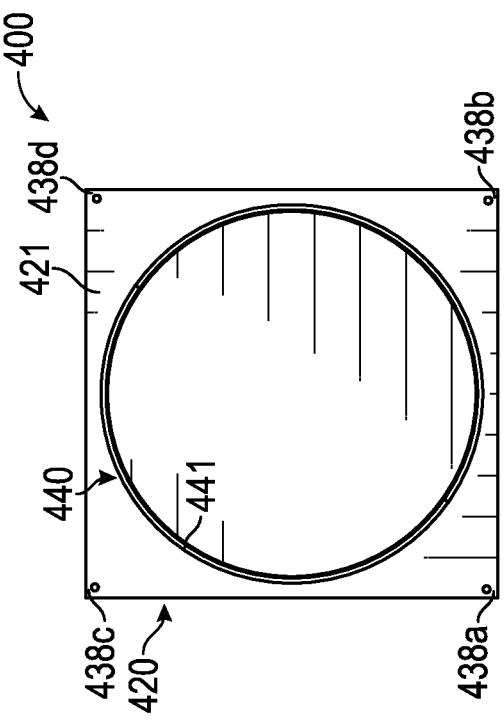
FIG. 5A shows a top view of the two-piece pizza pan.
Figure 5B:
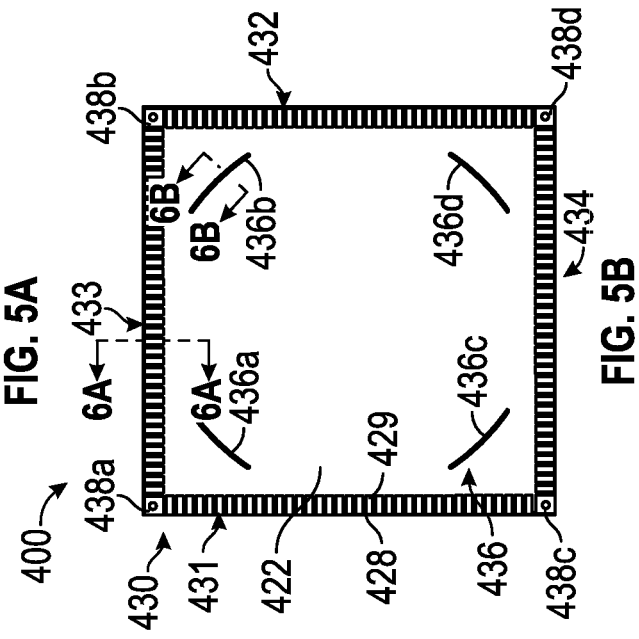
FIG. 5B shows a bottom view of the two-piece pizza pan.
Figure 4A:
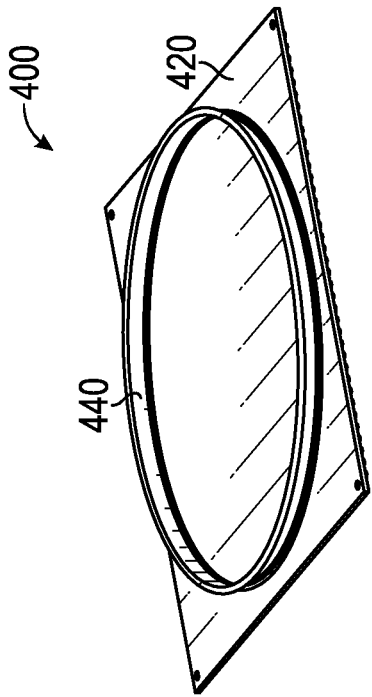
FIG. 4A shows a two-piece pizza pan including a base and a removable ring.
Figure 4B:
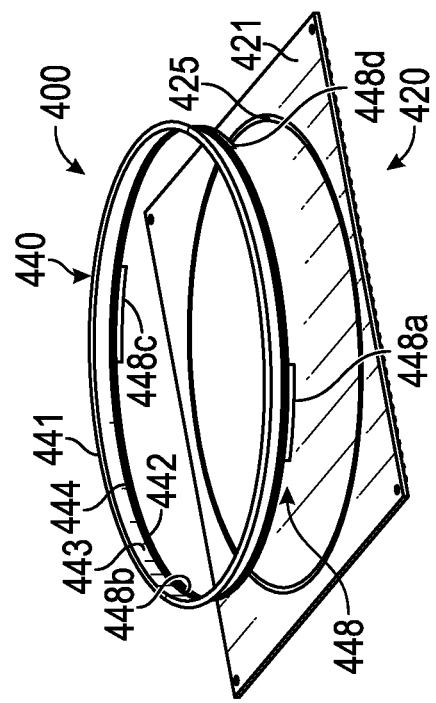
FIG. 4B shows an exploded view of the two-piece pizza pan.

In another alternative implementation of a pan base 420A, as shown in FIG. 5C, the linear tracks can extend outwardly. A linear track 431A and/or linear track 432A can include teeth 428A and grooves 429A that extend outwardly from a periphery of the base 420A. The teeth 428A and grooves 429A can be aligned within the plane of the pan base 420A. In certain other alternatives the pizza pan can forego any linear tracks or include only a single linear track on the base 420 (e.g., centered).

The base 420 can include corners 438a-d between the respective first, second, third and fourth sides of the base 420. The corners 438a-d can comprise recesses. The recesses can have a depth equal to the depth of the grooves 429 of the linear tracks. Additionally, one or more of the corners 438a-d can each include an aperture extending therethrough (e.g. from an upper surface 421 to the lower surface 422 of the base 420). The apertures can function as alignment or grip points for the two-piece pizza pan 400 during conveyance through an automated pizza-making system.

The base 420 can include one or more slots 436 for the removable ring 440. The slots 436 can include slots 436a-d. The slots 436 can extend through the base 420 (e.g. from the upper surface 421 to the lower surface 422). The base 420 can include 4 slots. In certain implementations, the base 420 can include more or fewer slots. The slots 436 can be portions of a circumferential arc. The slots 436 can be spaced an equal distance from the base 420. Alternatively, the slots can include linear portions or curved portions.

The base 420 can include a groove 425. The groove 425 be in the upper surface 421. The groove 425 can include a circumferential arc portion. The groove 425 can include a bottom 425a and sides 425b-c. The bottom 425a can be a flat surface. The sides 425b and/or 425c can include cylindrical surfaces. In other implementations, the bottom 425a and/or sides 425b-c can comprise s concave curvature. One or more of the slots 436a-d can be aligned along portions of the groove 425. The slots 436a-d can be formed in the bottom 425a of the groove 425.

The removable ring 440 can be formed as a complete circle or ring. The removable ring 440 can include an upper rim 441 and a lower rim 442. The removable ring 440 can define a sidewall 443 extending between the upper rim 441 and the lower rim 442. The upper rim 441 can include a rolled edge. The rolled edge of the upper rim 441 can provide a grip point and add stiffness to the removable ring 440. The removable ring 440 can be of particular advantage in a vehicle mounted pizza system. The removable ring 440 can prevent the spillage of toppings placed on the dough, particularly before cooking.

The lower rim 442 can include one or more projections 448. The projections 448 can include projections 448a-d. The projections 448 can extend downwardly from the lower rim 442. The projections can extend generally parallel with the sidewall 443. The projections 448 can comprise arc length segments of a circumference of the removable ring 440. The number of projections 448 can correspond to the number of the slots 436 in the base 420. The lengths and curvatures of the projections 448 can correspond to the lengths and curvatures of the slots 436 such that the projections 448 fit within the slots 436. The projections 448 can pass smoothly into and out of the slots 436 along a vertical direction, with the base 420 horizontal. Similarly, the lower rim 442 can be aligned with the groove 425 and inserted and removed along the vertical direction. This can facilitate the vertical removal and placement of the removable ring 440 into the base 420 (e.g., using a mechanical device). Alternatively, the projections 448 can be one or more pins attached with and extending below the removable ring 440. The pins can be received within corresponding apertures in the base 420.

The lower rim 442 can be sized to fit within the groove 425 of the base 420. The removable ring 440 can include an inner lip 444. The inner lip 444 can extend around an inner circumference of the sidewall 443. The inner lip 444 can be adjacent the lower rim 442. The inner lip 444 can include a bent portion (e.g., by roll forming) of the sidewall 443. The inner lip 444 can be bent inwardly. As shown in FIG. 6A, the inner lip 444 can contact with a corner formed between the groove 425 and the upper surface 421 of the base 420. When the removable ring 440 is assembled with the base 420 by placing the projections 448 within the slots 436 and/or the lower rim 442 within the groove 425. Contact between the base 420 and the inner lip 444 can help prevent the passage of dough from within the removable ring 440 into the groove 425.

FIG. 6C shows an alternative arrangement of the base 420A with a removable ring 440A and a projection 448A fit within a slot 436A. An edge 444A can engage with the upper surface of the base 420 at a corner of the groove 425A.

In certain other implementations, the removable ring 440 can be formed without the projections 448 and the base 420 can be formed without the slots 436. The lower rim 442 can be fit within the groove 425. In another alternative, the base 420 can be formed without the groove 425. The removable ring 440 can rest on the upper surface 421 of the base 420. In certain alternative implementations, the base 420 can include only a single pair of linear tracks on opposite sides of the base 420. In another implementation, the removable ring 440 and/or the base 420 can be magnetic. The removable ring can be held in place against the base 420 at least partially due to magnetic force. The magnetic force can be used alone or in addition to the annular groove 425 and/or the projections 448 and slots 436.

The two-piece pizza pan 400 can convey a pizza through the automated pizza-making system 100. The linear tracks 430 can interface with a timing belt, sprocket or other means for advancement (and reversal) along the conveyance system. The removable ring 440 can be attached with the base 420. The projections 448 can be assembled within the slots 436 and/or the lower rim 442 within the groove 425. A dough ball can be placed on the upper surface 421 within the area enclosed by the removable ring 440 either before or after the removable ring 440 is coupled with the base 420. During the process of creating a pizza on a two-piece pizza pan 400, the removable ring 440 functions to contain the dough on the upper surface 421 and/or to maintain and prevent the spillage of toppings from the dough/pizza pan. This can be especially beneficial where the automated pizza-making system 100 is being conveyed on a vehicle. Accordingly, the removable ring 440 can prevent unnecessary spillage of the toppings, thus preventing loss of topping from the pizza and maintaining cleanliness of the vehicle and the components of the automated pizza-making system 100. Optionally, the pizza pan 400 can include a bar code (e.g., engraving) or other identification feature to allow the system 100 to track individual pans. The identification feature can withstand oven temperatures. In one example, the identification feature is an optical features (such as one or more holes in the pan base 420 through which light shines in a recognizable pattern as detected by an optical sensor).

Figure 7A:
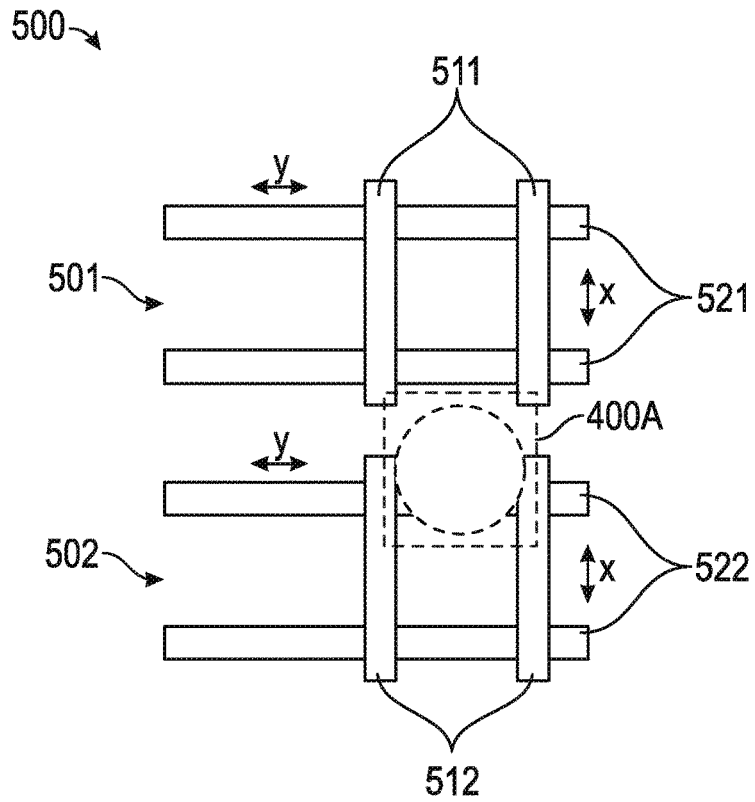
FIG. 7A shows a schematic example of a pan drive system for advancing a pizza pan within an automated pizza-making system.
Figure 7B:
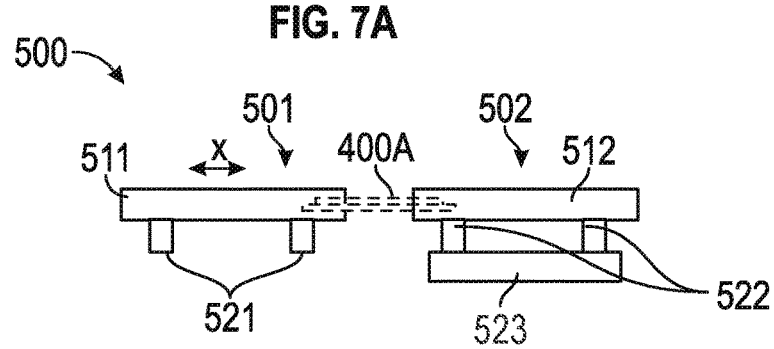
FIG. 7B shows a side view of the pan drive system of FIG. 7A.

FIGS. 7A-B show a pan drive system 500. The pan drive system 500 can be a part of the conveyance system for the automated pizza-making system 100. The pan drive system 500 can be used to advance a pizza pan, such as the two-piece pizza pan 400A, along the x-direction (e.g. in the positive and negative x-directions) and/or along the y-direction (e.g. in the positive and negative y-directions). The pan drive system 500 can include one or more rail sets 501, 502.

The first rail set 501 can include a first pair of drive rails 511 for advancing the two-piece pizza pan 400A along the x-direction. The drive rails 511 can include therein rollers, belts, chains or other advancing mechanisms for conveying the two-piece pizza pan 400A in the x-direction. The drive rails 511 can be coupled on a second pair of (one or more) transverse rails 521. The transverse rails 521 can be mounted at an angle transverse to the x-direction. The transverse rails 520 can be aligned along a y-direction (e.g. or at a generally orthogonal to the x-direction). The drive rails 511 can be moved along the y-direction by the transverse rails 521 to adjust the position of the two-piece pizza pan 400A.

The second rail set 502 can include a pair of drive rails 512 and a pair of transverse rails 522. The two-piece pizza pan 400A can be advanced by being handed off from one rail set to two the next rail set. As one example, the second rail set 502 can include the two-piece pizza pan 400A mounted between the drive rails 512. The drive rails 511 can be aligned with the drive rails 511 of the first rail set 501 by movement of the transverse rails 521 and/or 522. The two-piece pizza pan 400A can be advanced by the drive rails 512. A lead edge of the two-piece pizza pan 400A can be inserted into the drive rails 511 until the two-piece pizza pan 400A is engaged within the drive rails 511. The two-piece pizza pan 400A can then be fully handed off and advanced through the drive rails 511. The tail end of the two-piece pizza pan 400A can also be advanced out of the drive rails 512 by operation of the belt thereof. Moreover, the drive rails 512 and the pair of transverse rails 522 can be mounted on a rotatable support 523; the rotatable support 523 can rotate the drive rails 512 and the pair of transverse rails 522 in a horizontal plane.

In an alternative embodiment, the pan drive system 500 can operate in polar coordinates. The drive rails 511 can be mounted on a turntable. The two-piece pizza pan 400A can accordingly be advanced within the drive rails 511 (to adjust distance) and spun on the turntable (to adjust angle or direction).

Figure 8:
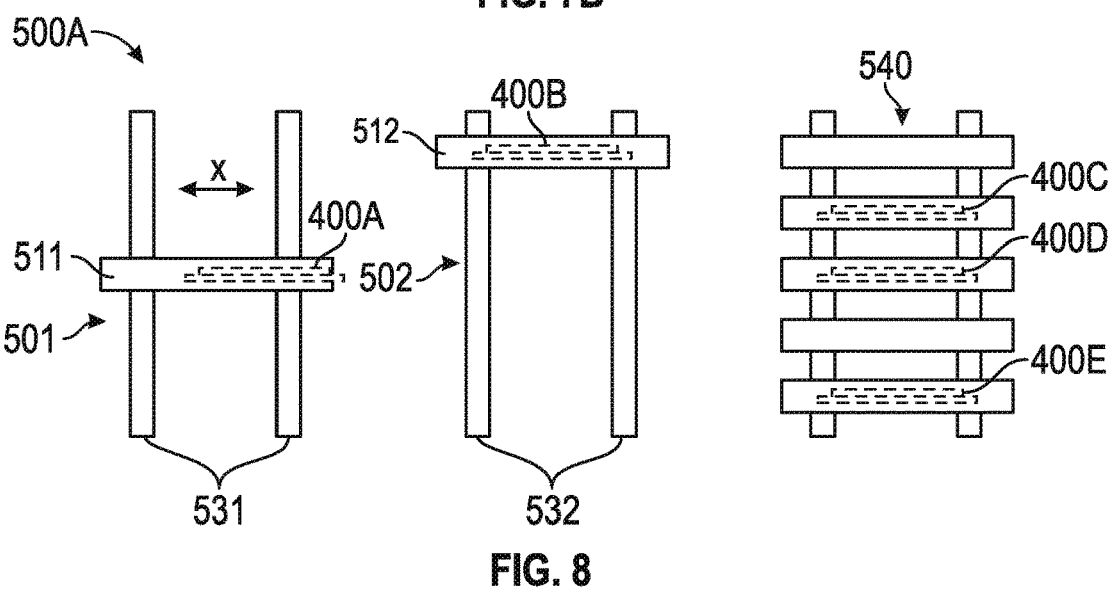
FIG. 8 shows a schematic example of a pan storage rack and a pan drive system.

FIG. 8 shows a pan drive system 500A, a variant of the pan drive system 500. In the pan drive system 500A, one or more of the rails sets 501 and 502 can include the drive rails 511 and 512, as well as one or more lift rails 531 and 532, respectively. The lift rails 531, 532 can move the respective drive rails 511, 512 in the z-direction (e.g., generally vertically). The two-piece pizza pan 400B can be advanced through the pan drive system 500A by aligning the drive rails 511, 512 in the z-direction and handing off the two-piece pizza pan 400A from rail set to rail set by advancement of the belt drives.

The pan drive system 500A can further include a rack 540. The rack 540 can include a plurality of shelves for storing thereon the pizza pans. The rack 540 can be used in various components of the automated pizza-making system 100, such as the proofing component 115, the pre-oven queue component 145, and/or the retrieval component 170. The shelves of the rack 540 can include one or more transverse surface onto which the two-piece pizza pans 400C-400E can be placed. The rack 540 can be used in conjunction with the second rail set 502 including drive rails 512 and lift rails 532. The lift rails 532 can align the drive rails 512 with one of the shelves of the rack 540. The drive rails 512 can advance the pan 400B into position on one of the shelves of the rack. In certain implementations, the rack 540 can include an actuator mechanism for pushing the pizza pan off of the shelf and back into engagement with the drive rails 512.

Figure 9:
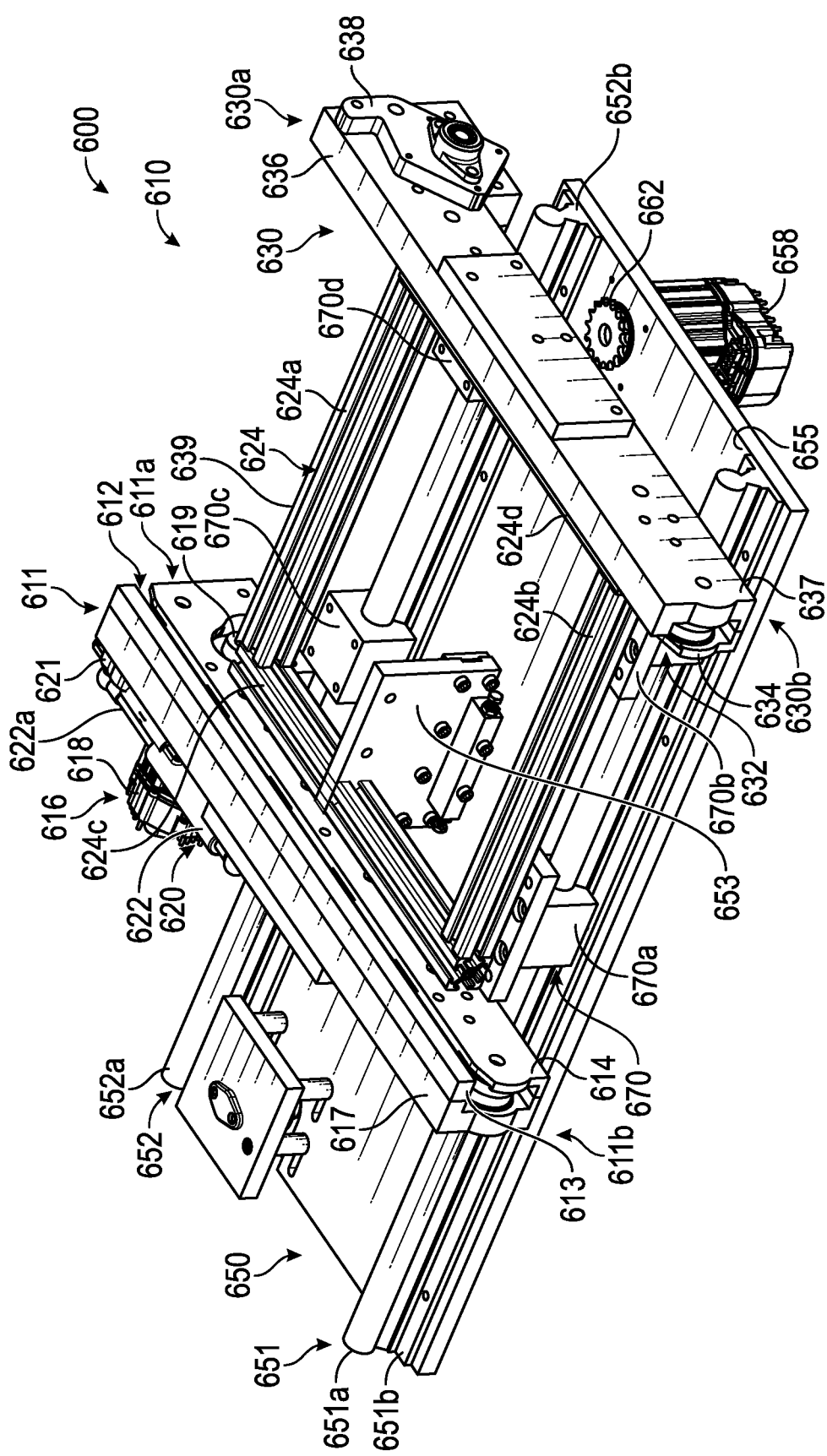
FIG. 9 is a perspective view of a pan drive system.
Figure 10A:
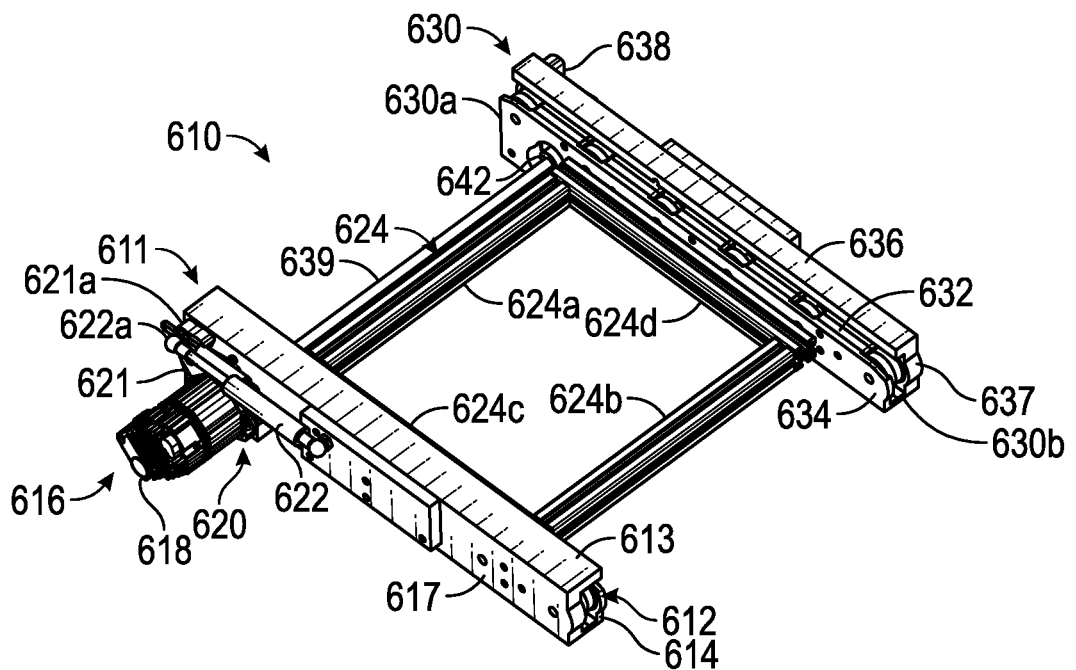
FIG. 10A shows a first pair of rails of the pan drive system.
Figure 10B:
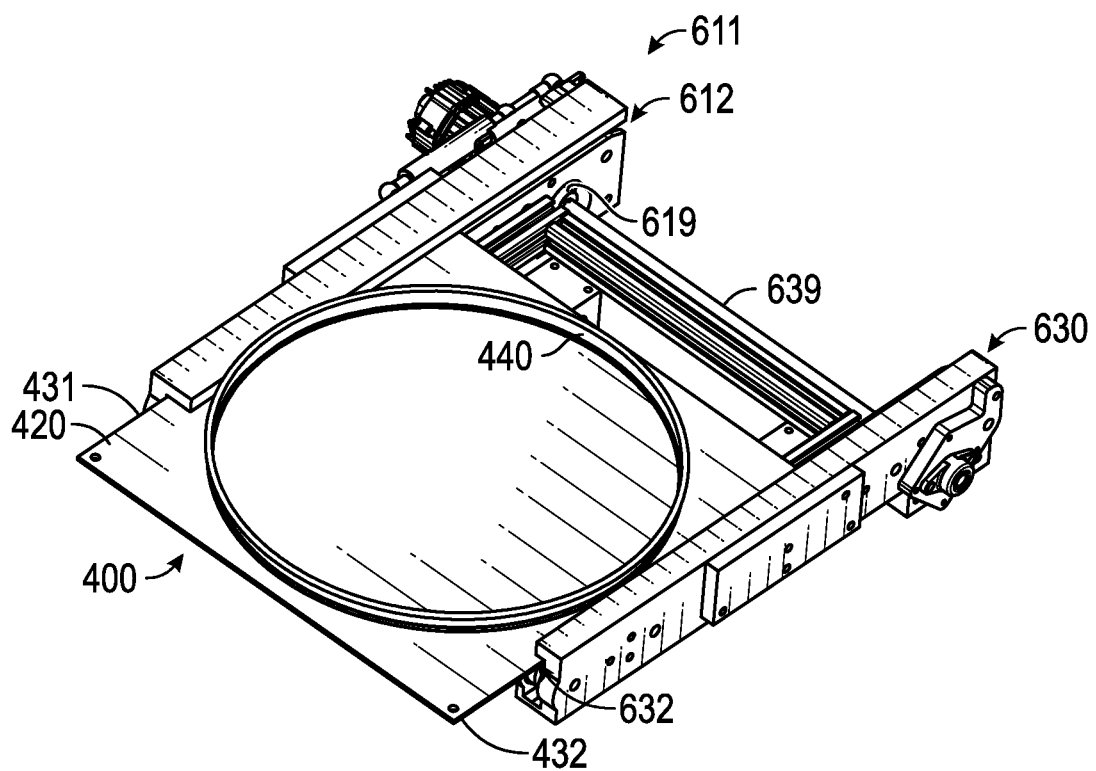
FIG. 10B shows the first pair of rails advancing a pizza pan.

FIGS. 9-10B illustrate a pan drive system 600. The pan drive system 600 can be an implementation of the pan drive system 500. The pan drive system 600 can be used for conveying the two-piece pizza pan 400 between the various components of the automated pizza-making system 100. The pan drive system 600 can include drive rails 610. The drive rails 610 can advance the two-piece pizza pan 400 therethrough (e.g., along the x-direction). The drive rails 610 can be coupled with a pair of transverse rails 650. The transverse rails 650 can move the pizza pan and the drive rails 610 along a transverse direction (e.g. along a y-direction).

The drive rails 610 can include a first rail 611. The first rail 611 can include a first end 611a and a second end 611b. The first rail 611 can include an outer member 617. The first rail 611 can include an inner plate 614. The first rail 611 can include an upper member 613. The upper member 613, the outer member 617 and/or the inner plate 614 can extend from the first end 611a to the second end 611b.

A first pan slot 612 can extend from a first end 611a to the second end 611b. An upper side of the pan slot can be bounded by the upper member 613. A lower side of the first pan slot 612 can be bounded by the inner plate 614. An outer side of the first pan slot 612 can be bound by the outer member 617. An inner side of the first pan slot 612 can be open. The first pan slot 612 can be open at the first end 611a and the second end 611b.

The first rail 611 can include a drive assembly 616. The drive assembly 616 can include a motor 618. A drive shaft 618a of the motor 618 can be coupled with a drive wheel 619. In certain implementations, the motor 618 and drive wheel 619 can include a transmission mechanism. The motor 618 can be coupled with a mount plate 621. The mount plate 621 can be coupled with the outer member 617. The drive wheel 619 can be located within the first rail 611. The drive wheel can be engaged with a timing belt (not shown) disposed within the first pan slot 612.

The drive assembly 616 can include a tension assembly 620. The mount plate 621 can be pivotably coupled with the outer member 617. The tension assembly 620 can include an elastic member 622. The elastic member 622 can couple with the mount plate 621. The mount plate 621 in conjunction with the elastic member 622 can tension a timing belt by controlling the position of the mount plate 621, motor 618 and drive wheel 619.

The drive rails 610 can include a second rail 630. The second rail 630 can have the same structural features as the first rail 611. The second rail 630 can include an outer member 637, an upper member 636, and an inner plate 634 that can define a second pan slot 632. The second pan slot 632 can extend from a first end 630a to a second end 630b of the second rail 630. The second rail 630 can include a mount plate 638. The mount plate 638 can be pivotably coupled with the outer member 637. A shaft 639 can be coupled with a drive wheel disposed within the second rail 630. The shaft 639 can be coupled with the drive wheel 619 of the drive assembly 616 for simultaneous driving of the drive wheels. Alternatively, the second rail 630 can include its own independent drive motor and drive wheel. Having a second, independent drive motor can allow adjustment of the timing belts on either of the rails 611, 630. This can allow correction of misalignments of the two-piece pizza pan 400 within the first and second pan slots 612, 632. In certain implementations, the second rail 630 can include a tension assembly.

The first rail 611 can be spaced from the second rail 630 by a frame 624. The first rail 611 can be parallel with the second rail 630. The first pan slot 612 can be parallel with the second pan slot 632. The first and second pan slots 612, 632 can be located in the same horizontal plane. The frame 624 can comprise a plurality of elongate members 624a-d. The spacing of the first rail 611 and the second rail 630 can correspond to a width of the base 420 of the two-piece pizza pan 400. As illustrated in FIG. 10B, a first edge 423a of the base 420 can be insertable within the first pan slot 612. A second opposite edge 423b can be insertable within the second pan slot 632 of the second rail 630. The pan slots 612, 632 can be open on one side and closed on three sides. The two-piece pizza pan 400 can be advanceable through the first and second pan slots 612, 632 by operation of the drive assembly 616 and the timing belts within the first and second rails 611, 630.

The transverse rails 650 can include a first rail 651 and a second rail 652. The first and second rails 651, 652 can be aligned along a direction transverse to the alignment of the drive rails 610 (e.g., y-direction). The first rail 651 and the second rail 652 can be coupled with a base frame 655. The first rail 651 can include an upper rail portion 651a and a mountable base portion 651b. The second rail 652 can also include an upper rail portion and a mountable base portion. The first and second rails 651, 652 can be parallel and aligned along the transverse direction. The upper rail portions can be aligned in the same plane.

The transverse rails 650 can be coupled with the frame 624 supporting the drive rails 610. The transverse rails 650 can comprise one or more slidable couplings 670. The slidable couplings 670 can include first and second slidable couplings 670a, 670b on the first rail 651. The slidable couplings 670 can include second and third slidable couplings 670c, 670d on the second rail 652. The slidable couplings 670 can include pairs of spaced concave members configured to be coupled over the upper rails portions of the first and second rails 651, 652. The slidable couplings 670 can be coupled with the frame 624.

Figure 11A:
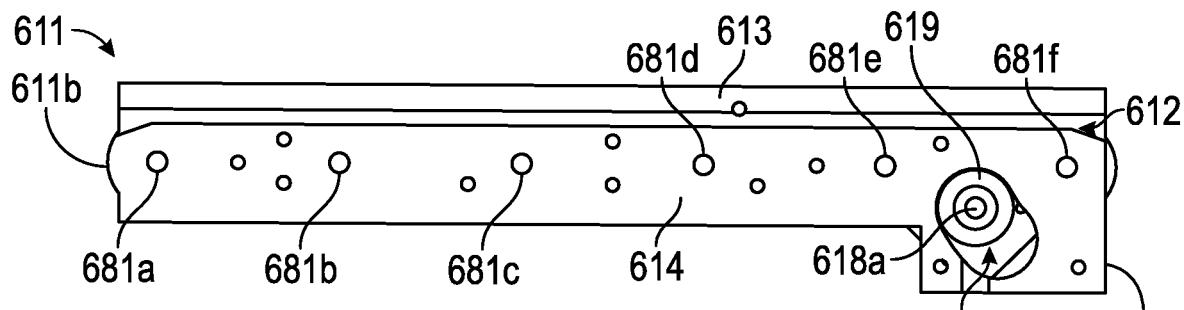
FIG. 11A shows an inner side of a rail of the first pair of rails.
Figure 11B:
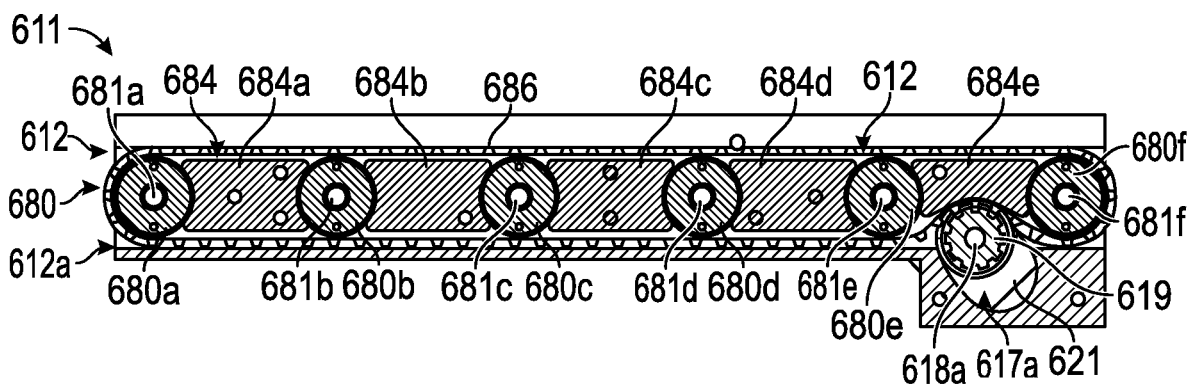
FIG. 11B shows an interior of the rail of the first pair of rails including a timing belt.
Figure 11C:
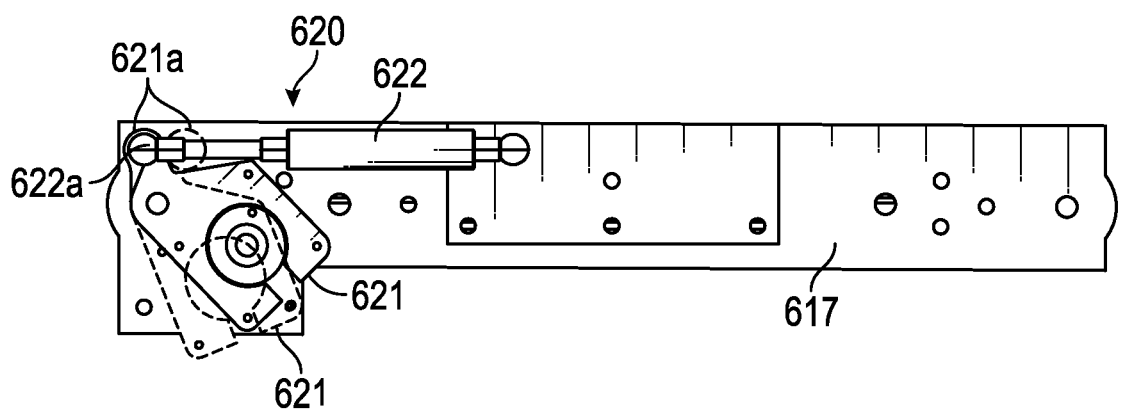
FIG. 11C shows an outer side of the rail of the first pair of rails including a tension assembly.

FIGS. 11A-C show the first rail 611 of the drive rails 610. The first rail 611 can comprise a plurality of idler wheels 680. The idler wheels 680 can include idler wheels 680a-f. The idler wheels 680 can be spaced at intervals between the first end 611a and the second end 611b. The idler wheels 680 can be aligned along a lower side of the first pan slot 612. The first rail 611 can comprise a plurality of spacers 684. The spacers 684 can include spacers 684*a-e*. The spacers 684 can be located between adjacent idler wheels of an idler wheels 680. The spacers 684 can include an upper edge. The upper edge can be generally aligned with upper portions of the idler wheels 680. Thus the spacers 684, in conjunction with the idler wheels 680, can form a surface along a lower side of the first pan slot 612. In certain implementations, the spacers 684 can include concave portions on one or both ends. The concave portions can enable the spacers 684 to be placed in closer proximity to the idler wheels 680 to create additional surface along the first pan slot 612. The idler wheels 680 can each comprise a shaft 681. Shafts 681*a-f* can be coupled through the inner plate 614 and/or the outer member 617.

The first rail 611 can include a timing belt 686. The timing belt 686 can comprise a rubber, polymer, metal, or other materials or composites. The timing belt 686 can form a closed loop. The timing belt 686 can comprise a plurality of teeth extending outwardly from a band forming the closed loop. The first rail 611 can also include an internal return slot 612*a*. The internal return slot 612*a* can be located on an opposite side of the idler wheels 680 from the first pan slot 612. The timing belt 686 can be mounted within the first pan slot 612 and the internal return slot 612*a*. The timing belt 686 can be engaged with the drive wheel 619. The teeth of the timing belt 686 can mesh with sprockets of the drive wheel 619. The tension assembly 620 can bias the drive wheel 619 into contact with the timing belt 686.

FIG. 11C shows the tension assembly 620 on the outer member 617. The drive wheel 619 can be located within a tension slot 617*a* within which the drive wheel 619 and shaft 639 is allowed to move to tension the timing belt 686. The tension assembly 620 can include the elastic member 622 (e.g., gas struts) with an extendable shaft 622*a*. The extendable shaft 622*a* can couple with an upper portion 621*a* of the mount plate 621. The upper portion 621*a* can be located on an opposite side of a pivot point from the drive wheel 619 and the motor 618. FIG. 11C shows a second position of the tension assembly 620 in dash line.

Figure 12A:
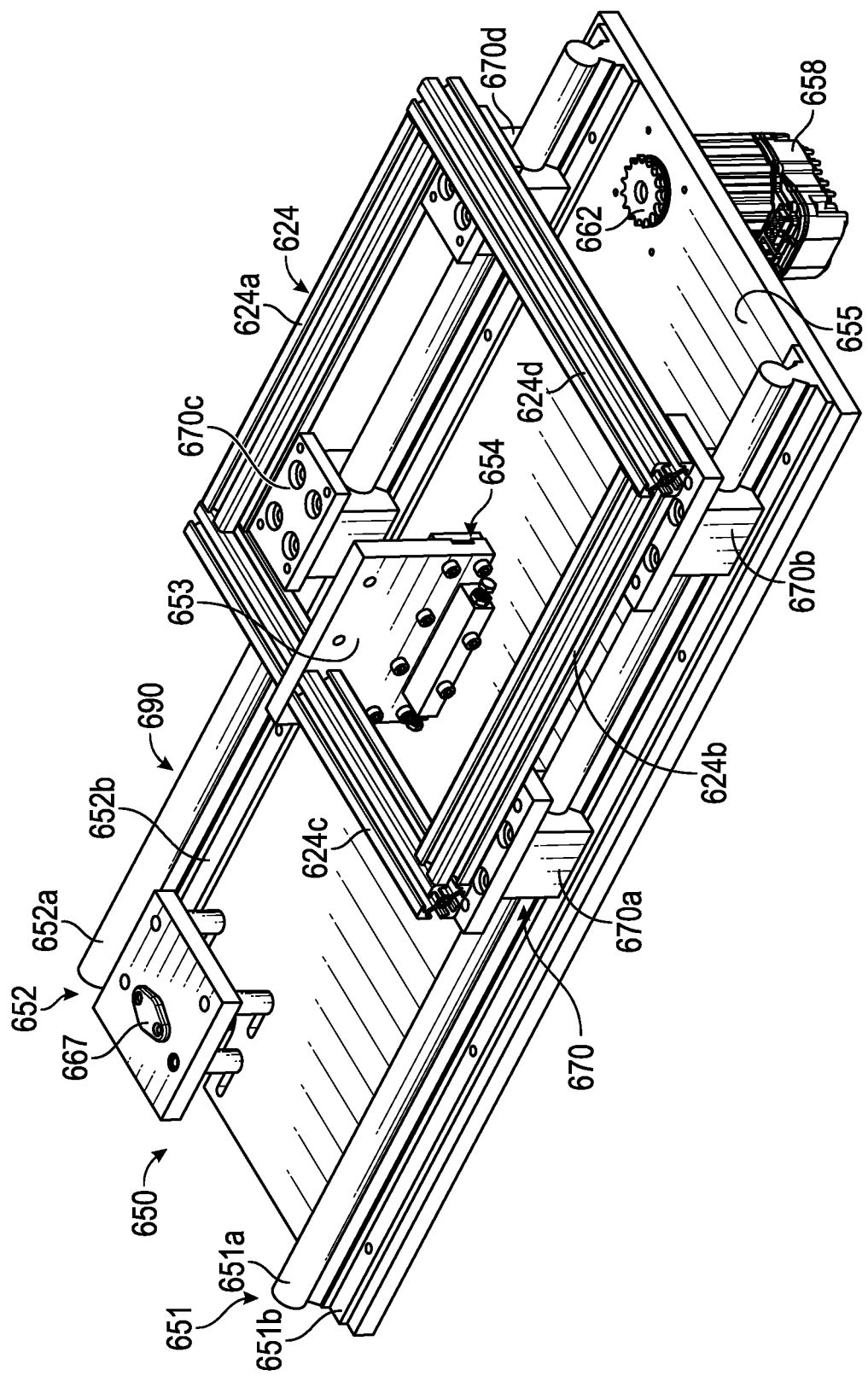
FIG. 12A shows a second pair of rails of the pan drive system.
Figure 12B:
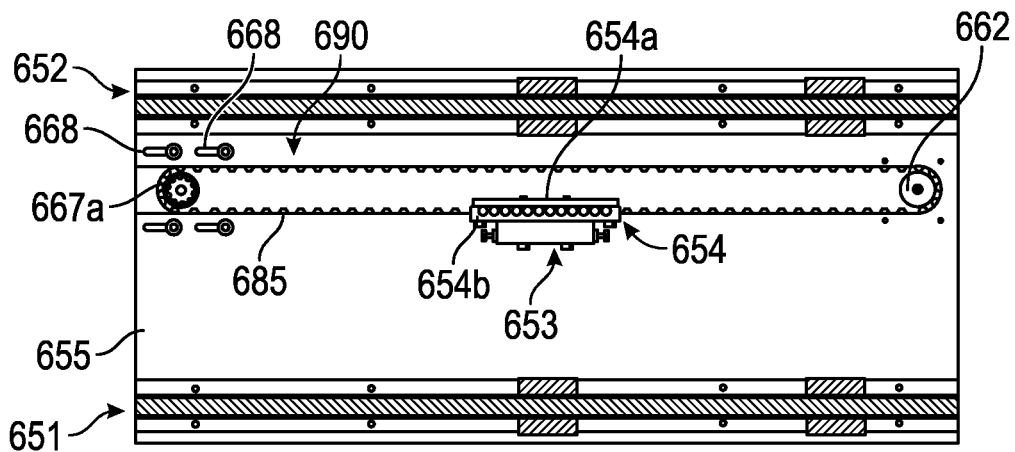
FIG. 12B shows a top view of a belt system for moving the first pair of rails along the second pair of rails.

With reference to FIGS. 12A-B, the transverse rail 650 can include a transverse drive 690. The transverse drive 690 can include a motor 658 coupled with a drive wheel 662. The motor 658 and the drive wheel 662 can be mounted with the base frame 655. An idler wheel 667 can be mounted in the base frame 655 opposite the drive wheel 662 (e.g., in the transverse direction). The transverse drive 690 can include a shuttle mount 653. The shuttle mount 653 can include a plate for coupling with the frame 624. Alternatively, the shuttle mount 653 can be coupled directly with one of the drive rails 610. The shuttle mount 653 can include a slot 654. The slot 654 can be bound on one or both sides by an outer slot plate 654*a* and an inner slot plate 654*b*. The slot 654 can comprise a plurality of teeth. The teeth can be sized for engagement with a timing belt 685. The timing belt 685 can comprise a plurality of teeth. Alternatively, the timing belt 685 can be a belt, chain or other strap.

The timing belt 685 can be coupled with the drive wheel 662, the shuttle mount 653 within the slot 654 and the idler 667. Rotation of the drive wheel 662 by the motor 658 can slide the shuttle mount 653 along the transverse direction with the movement of the timing belt 685. This can cause the frame 624 and the drive rails 610 to slide along the first and second rails 651, 652. Accordingly, the position of the drive rails 610 along the transverse direction of the drive rails 610 can be controlled by the motor 658. Alternatively, the shuttle mount 653 and/or the frame 624 can be coupled with a linear actuator (e.g., including a screw and motor). The linear actuator can convey the frame 624 along the y-direction (e.g., along the rails 651, 652).

Figure 13A:
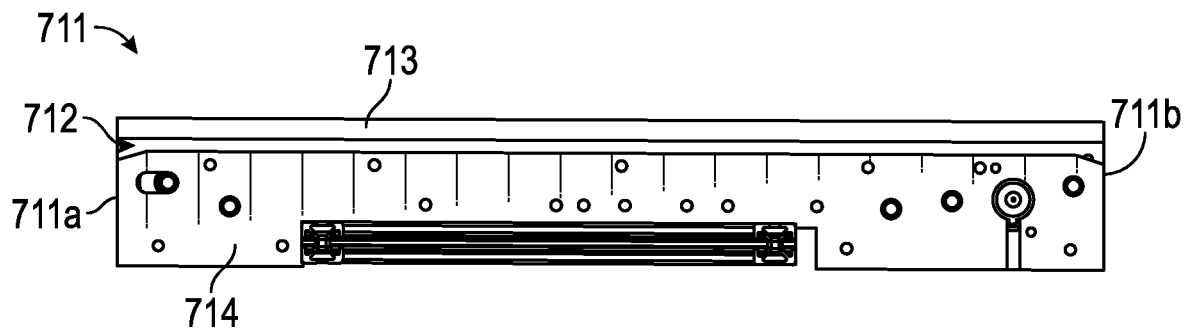
FIG. 13A shows an inner side of a rail of an alternative first pair of rails.
Figure 13B:
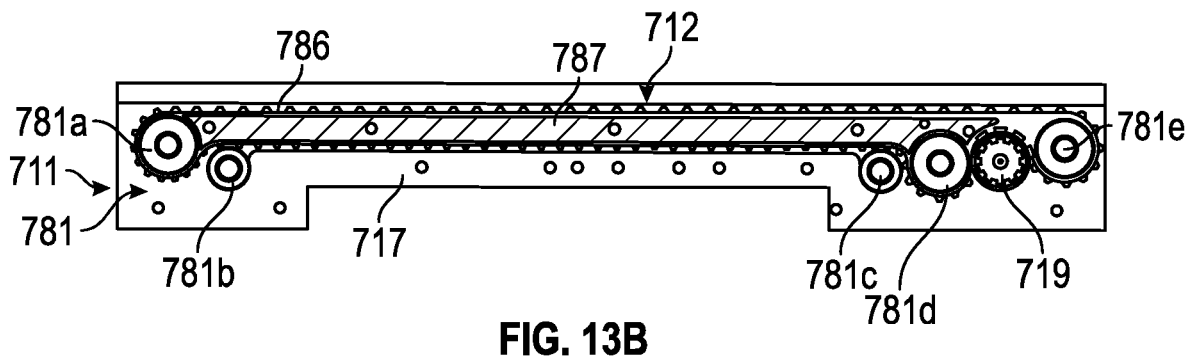
FIG. 13B shows an interior of the rail of the alternative first pair of rails including a timing belt.
Figure 13C:
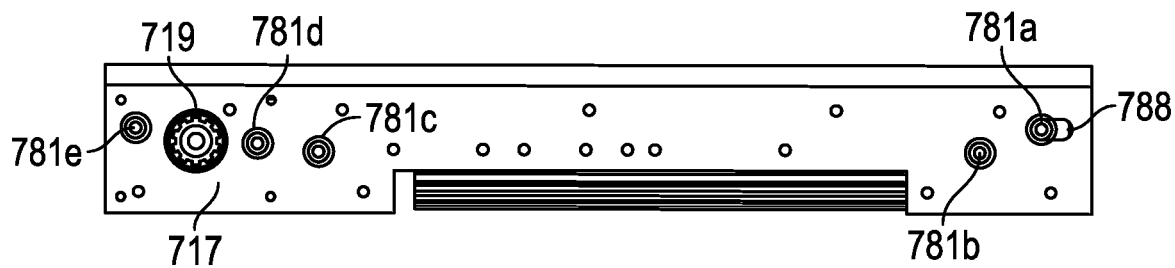
FIG. 13C shows an outer side of the rail of the alternative first pair of rails.

FIGS. 13A-C show a first rail 711 as an alternative to the first rail 611. A structurally similar second rail (not shown) can be paired with the first rail 711 to form a drive rail set for a pan drive system. The first rail 711 can include a first end 711*a* and a second end 711*b*. An inner plate 714, upper member 713, and pan slot 712 can extend from the first end 711*a* to the second end 711*b*. The inner plate 714 and the upper member 713 can be coupled together by an outer member 717. The first rail 711 can include one or more idler wheels 780 and a drive wheel 719. The idler wheels 780 can include idler wheels 780*a-e*. The idler wheels 780 can be located at the first end 711*a* and/or the second end 711*b*. The first rail 711 can include a timing belt 786. The timing belt 786 can be positioned within the pan slot 712. The timing belt 786 can be routed around the idler wheels 780 and engaged with the drive wheel 719. One or more spacers 787 can be aligned between the first end 711*a* and the second end 711*b*. The spacers 787 can generally bound a lower side of the pan slot 712. The spacers 787 can support the timing belt 786 between the idler wheels 785, 781.

The outer member 717 can include mounting locations for shafts 782*a-e* of the respective idler wheels 781-785. The outer member 717 can include a slot 788. The first idler wheel 781 can be mounted within the slot 788. The axle 781*a* can be movable within the slot to apply tension to the timing belt 786 mounted within the first rail 711. The slot 788 and axle 781*a* can be used in conjunction with a tension assembly or can be otherwise adjustable to apply tension to the timing belt 786. The drive wheel 719 can be coupled with a motor assembly for controlling and advancing the timing belt 786.

FIG. 14A shows a first rail 811, as another alternative to the first rail 611. A structurally similar second rail (not shown) can be paired with the first rail 811 to form a drive rail set for a pan drive system. The first rail 811 can include idler wheels 881-885 coupled with a timing chain 886. Alternatively the timing chain 886 can be a belt. A drive wheel 819 can be coupled with the timing chain 886. A tension plate 820 can be adjustable about a pivot 822, and one or more slots 821, 823 to tension with the timing chain 886. Links of the timing change 886 can mesh with sides of the pizza pan (e.g., linear tracks 431A, 432A).

FIG. 14B shows a slip rail set 850. The slip rail set 850 can include first and second rails 851, 852 including respective pan slots 851*a*, 852*a*. A belt 856 can be located within the pan slot 851*a* (e.g., not a timing belt). The belt 856 can be coupled with one or more idler gears and a drive wheel 854. The drive wheel 854 can be coupled with a shaft 855 and a drive motor 853. The second rail 852 can include a similar belt and drive wheel. The drive wheel of the second rail can be coupled with the shaft 855 or another independent drive motor for independent belt advancement. The rail 851 can include one or more roller 860 aligned along an upper side the pan slot 851*a*. The slip rail set 850 can assist in adjusting alignment of the linear tracks of the pizza pan between two adjacent sets of the pan drive 600. The timing belts of the pan drive 600 can be difficult to align with the linear track between pan drive units 600. Accordingly, by providing the slip rail set 850, perfect alignment between serial pan drive rail sets is not required. Moreover the slip rail set 850 can adjust alignment of the pizza pans 400 to a greater degree than the pan drive 600.

Figure 15A:
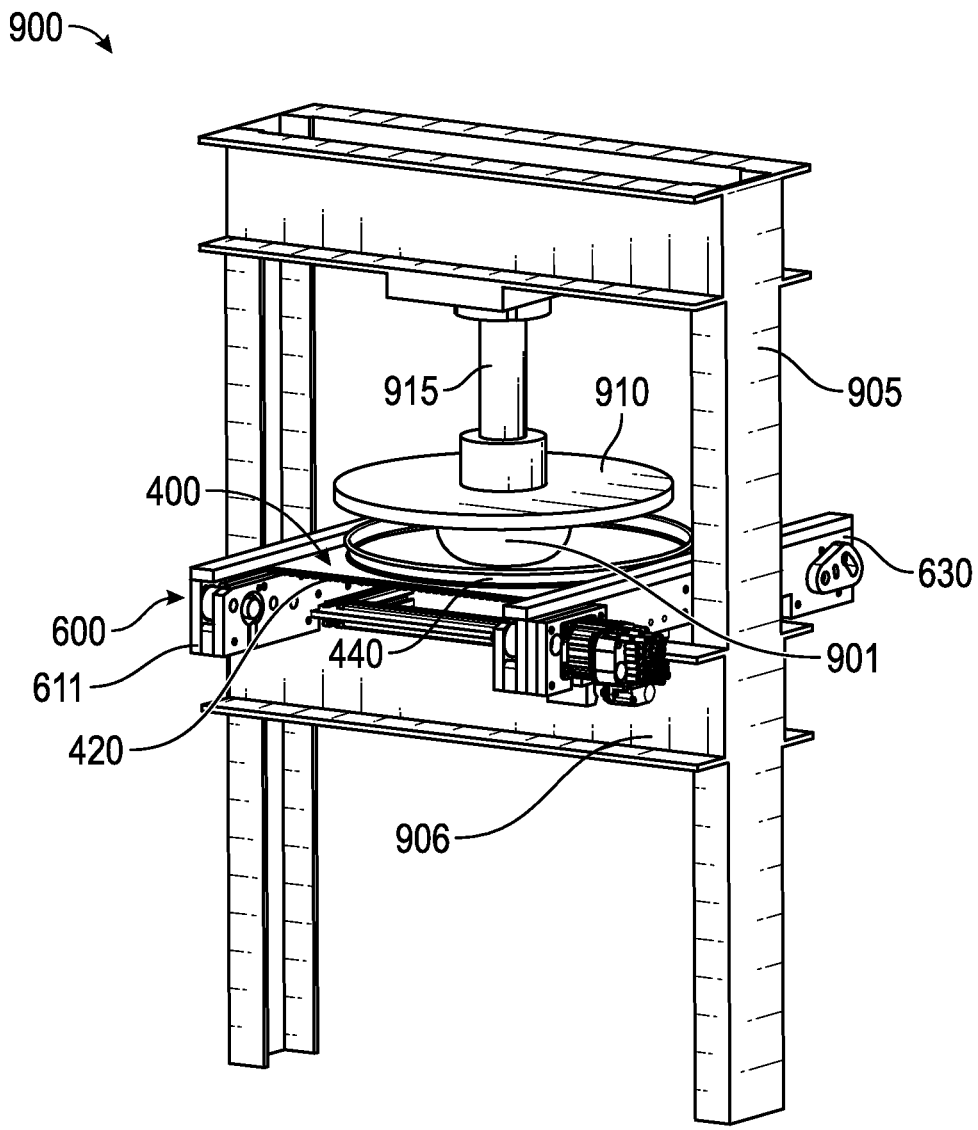
FIG. 15A shows a perspective view of a dough press station.
Figure 15B:
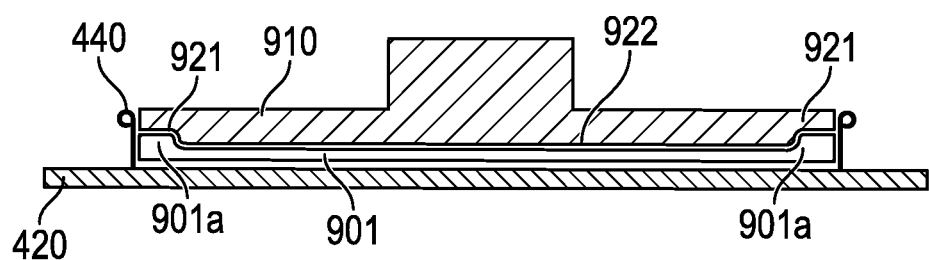
FIG. 15B shows a cross-section of a dough press and pizza pan at the dough press station.

FIGS. 15A-B show a dough press station 900, which can be an implementation of the dough press component 125 of the automated pizza-making system 100. The dough press station 900 can include a frame 905. The frame 905 can include a shelf 906. A pan drive system 600 can be mounted on the shelf 906. The first and second rails 611 and 630 can be mounted directly on the shelf 906. The frame 905 can provide a stable base for supporting the pan drive system 600. The two-piece pizza pan 400 can be advanced using the pan drive system 600 into the dough press station 900. The two-piece pizza pan 400 can include a proofed dough 901 thereon. The proofed dough 901 can be located on the base 420 within the removable ring 440.

The dough press station 900 can include an upper press member 910. The upper press member 910 can be coupled with an actuator 915. The actuator 915 can be, for example, a hydraulic actuator. The upper press member 910 can include a generally flat plate member. The flat plate member can be sized to fit within the removable ring 440. The flat plate member can include a circumferential groove 921 on a lower face 922. The inner circumferential groove can extend around an outer periphery of the upper press member 910.

In operation, the pan drive system 600 can advance the two-piece pizza pan 400 into position underneath the upper press member 910 of the dough press station 900. The actuator 915 can then press the proofed dough 901 using the flat plate member. The proofed dough 901, as shown in FIG. 15B, can include a cornicione (raised outer crust portion) 901a formed therein by the circumferential groove 921.

In certain implementations, the upper press member 910 can be heated. The heating can create a skin in the proofed dough 901 that can improve the release of the upper press member 910 from the pressed dough after pressing. In certain implementations, the lower face 922 can include a non-stick coating thereon. In certain implementations, the dough press station 900 can include an oil or other lubricating fluid dispenser for coating the proofed dough 901 and/or the upper press member 910 before pressing.

FIGS. 16A-B show a schematic example of a sauce dispenser station 1000, which can be an implementation of the sauce dispenser component 130. The sauce dispenser station 1000 can include a nozzle 1010. The nozzle 1010 can dispense a sauce 1001. The sauce 1001 can be dispensed onto a two-piece pizza pan 400A. The sauce 1001 can be dispensed onto a pressed dough on the two-piece pizza pan 400A. The two-piece pizza pan 400A can be conveyed using the first rail set 501. The first rail set 501 can include the drive rails 511 and/or the transverse rails 521.

As shown in FIG. 16C, the sauce dispenser station 1000 can include extend a rotatable brush 1020. The rotatable brush 1020 can contact the dispensed sauce 1001 and spread it to evenly cover the pressed dough on the two-piece pizza pan 400A. FIG. 16D shows an alternative arrangement in which the sauce dispenser station 1000 includes a fixed member 1030. The fixed member 1030 can include convex down surface for engaging and spreading the sauce 1001. The first rail set 501 can move the two-piece pizza pan 400A in the x and y-directions with the fixed member 1030 contacting with the dispensed sauce 1001. The two-piece pizza pan 400A can then be moved in the x and y-directions by the first rail set 501 to spread the dispensed sauce evenly over the pressed dough. In an alternative embodiment, the first rail set 501 can operate in polar coordinates to distribute the sauce. The first rail set 501 can be mounted on a turntable.

Figures 17A, 17B:
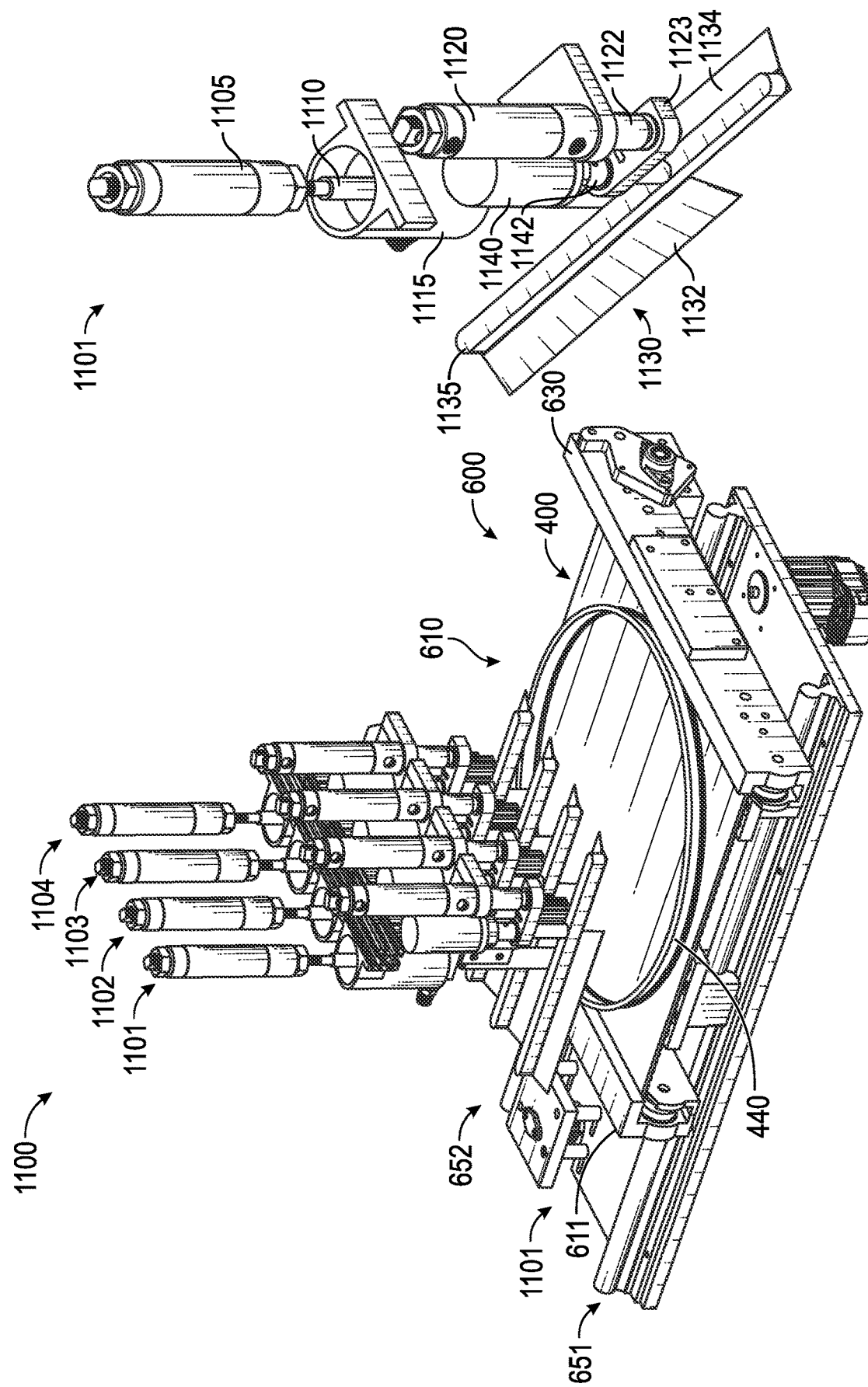
FIG. 17A shows a sauce dispensing station including a plurality of sauce dispensers.
FIG. 17B shows a single sauce dispenser including a dispenser cylinder and rotary system.
Figure 19A:
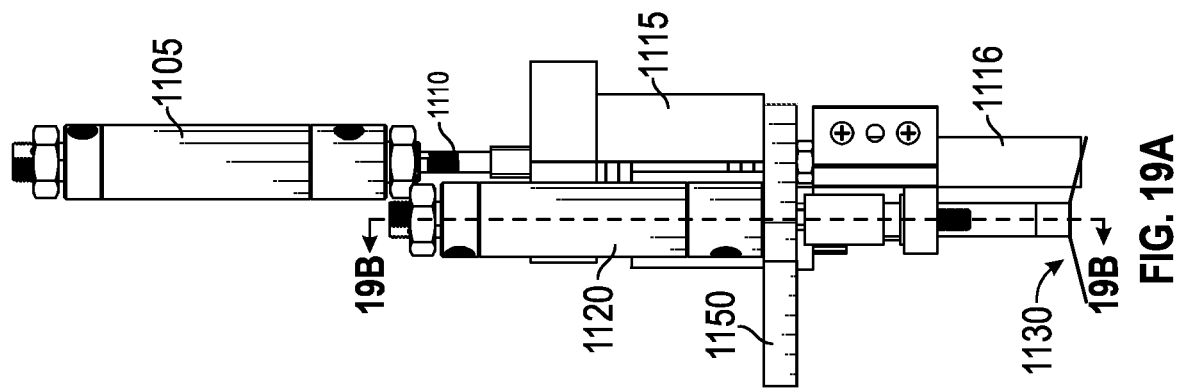
FIG. 19A is a side view of the sauce dispenser.
Figure 18B:
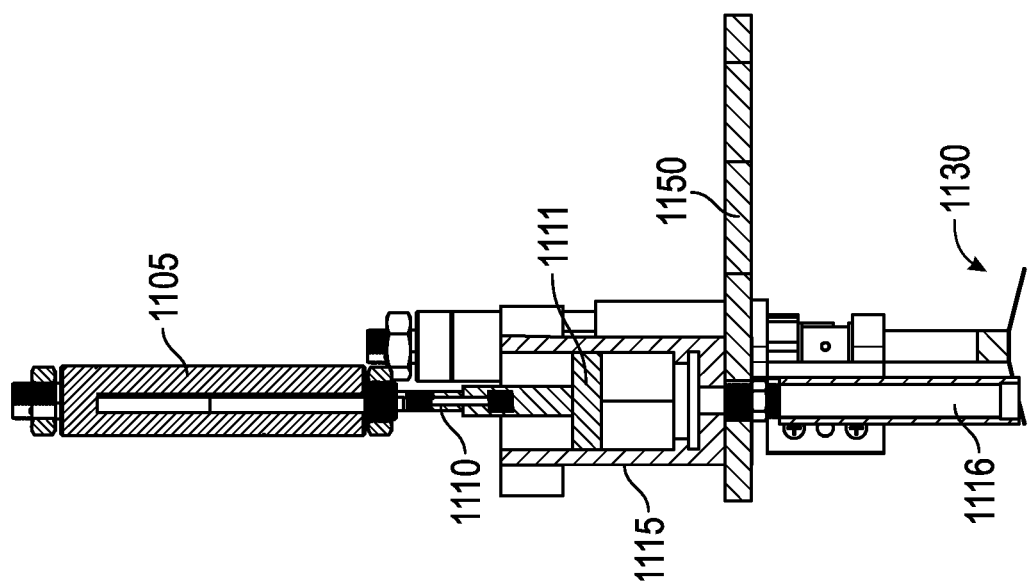
FIG. 18B is a cross-sectional view taken along the line 18B-18B in FIG. 18A.
Figure 18A:
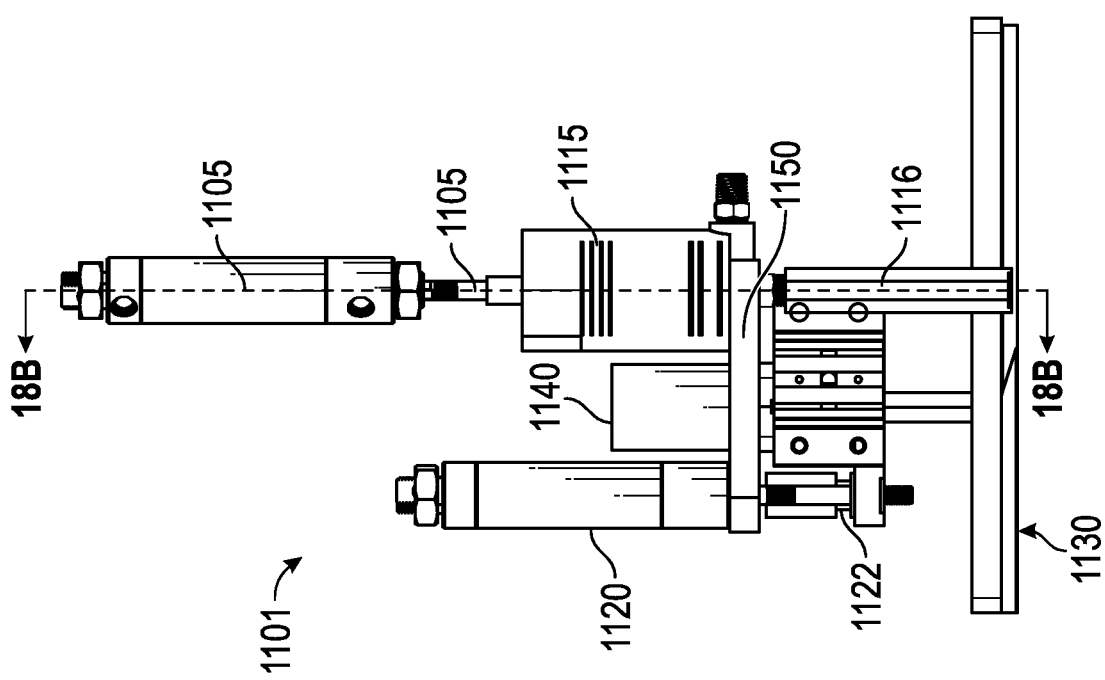
FIG. 18A shows a front view of the sauce dispenser.
Figure 19B:
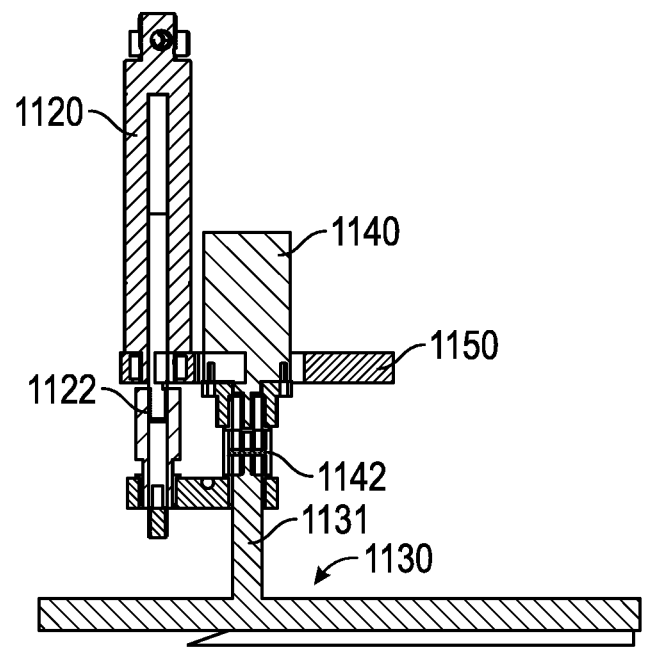
FIG. 19B is a cross-sectional view taken along the line 19B-19B of FIG. 19A.
Figure 19C:
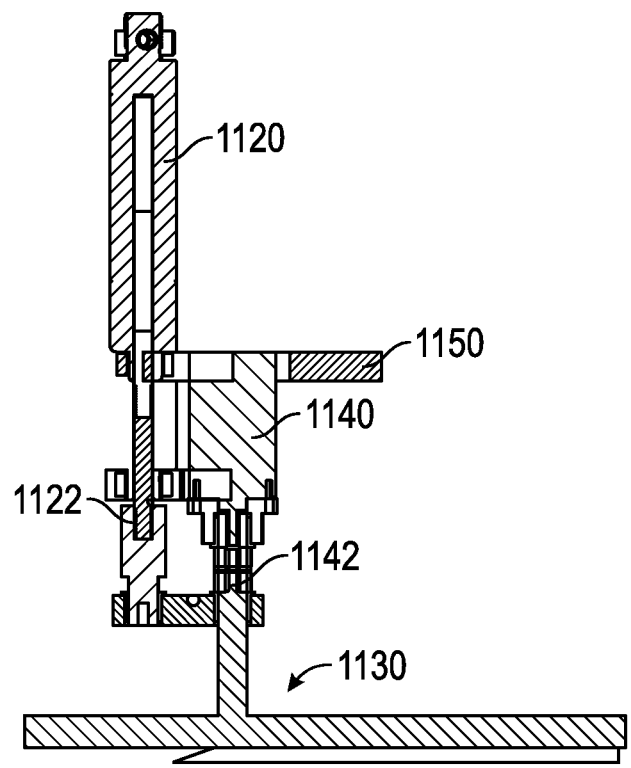
FIG. 19C is the cross-sectional view shown in FIG. 19C in an extended configuration of the rotary brush system.
Figure 20A:
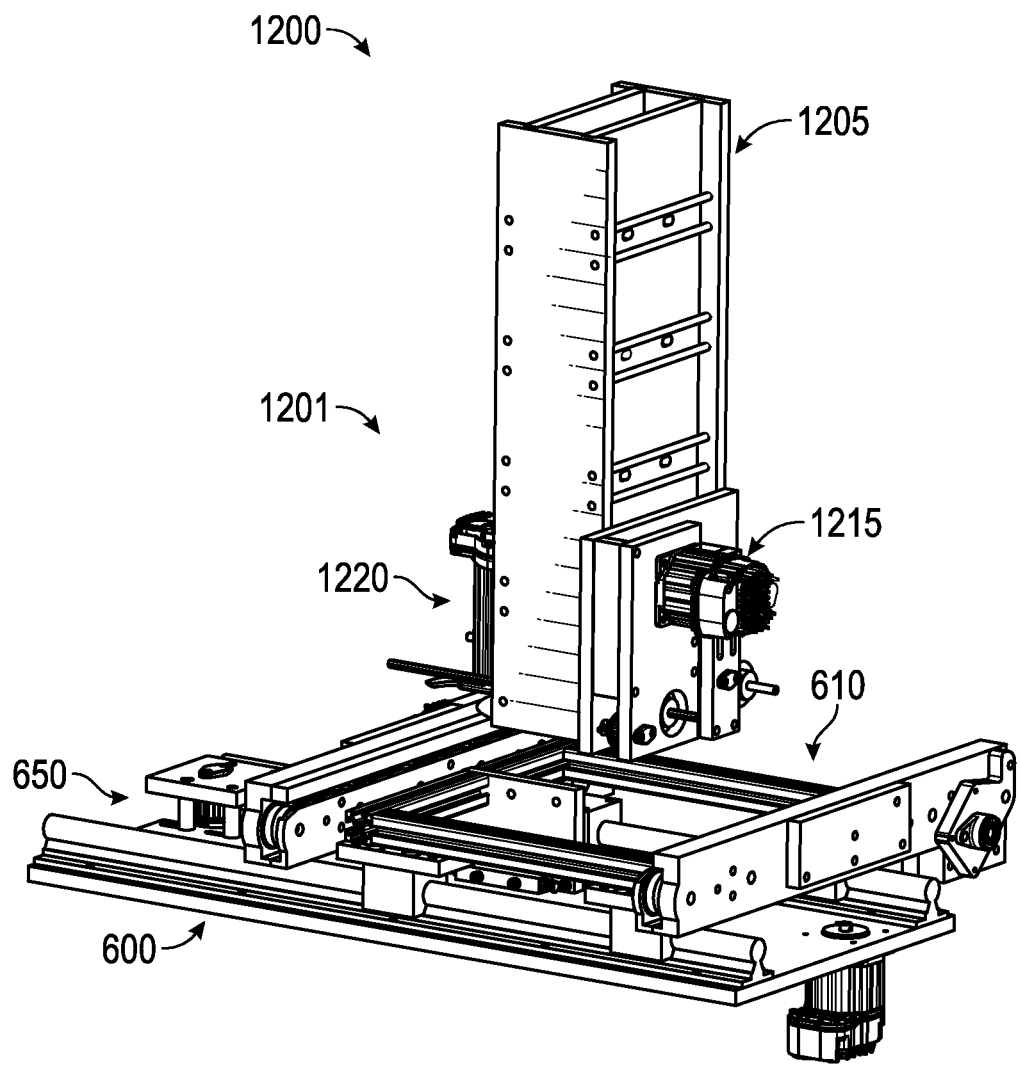
FIG. 20A is a perspective view of a bulk topping station.
Figure 20B:
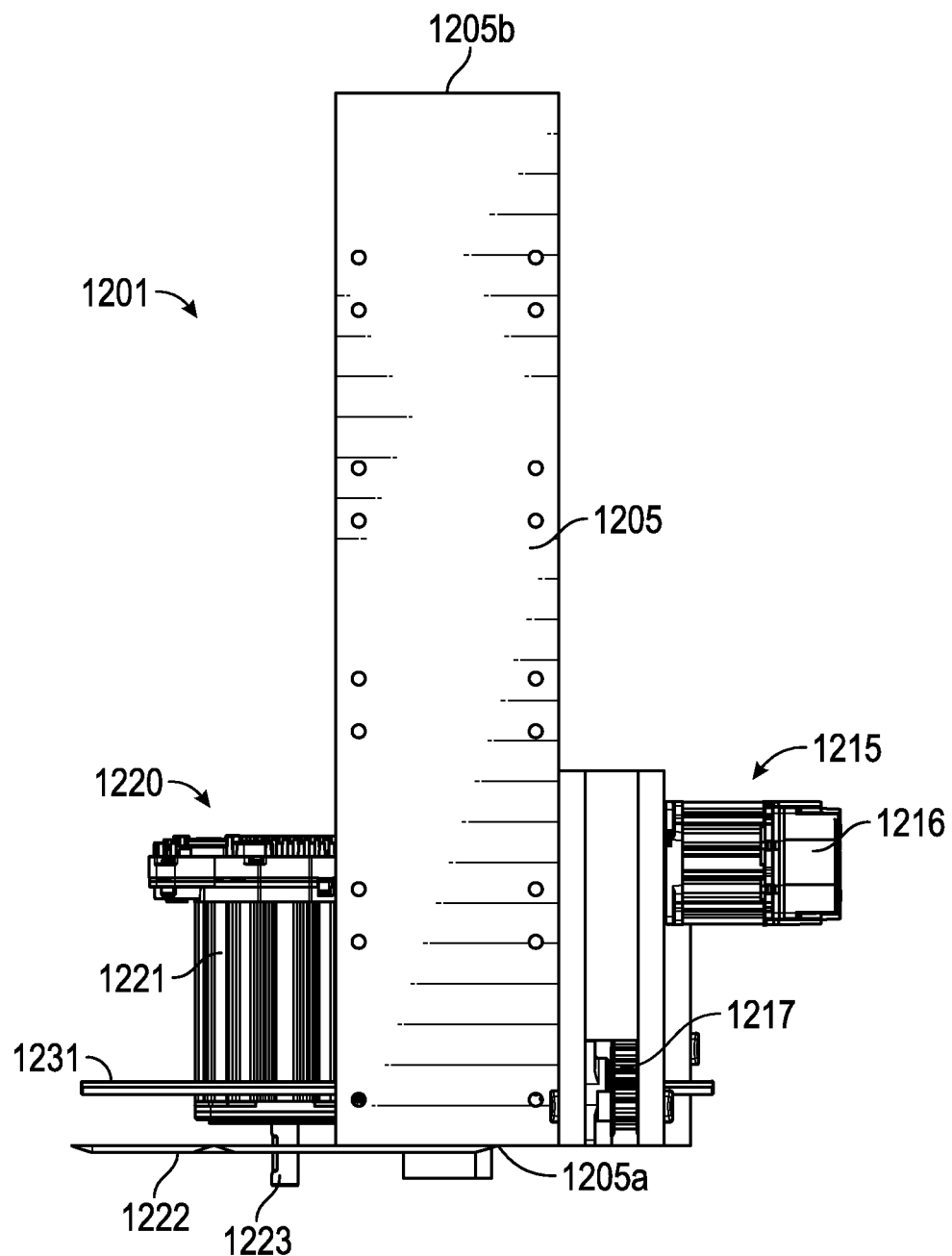
FIG. 20B is a front view of a bulk topping slicer.
Figure 21B:
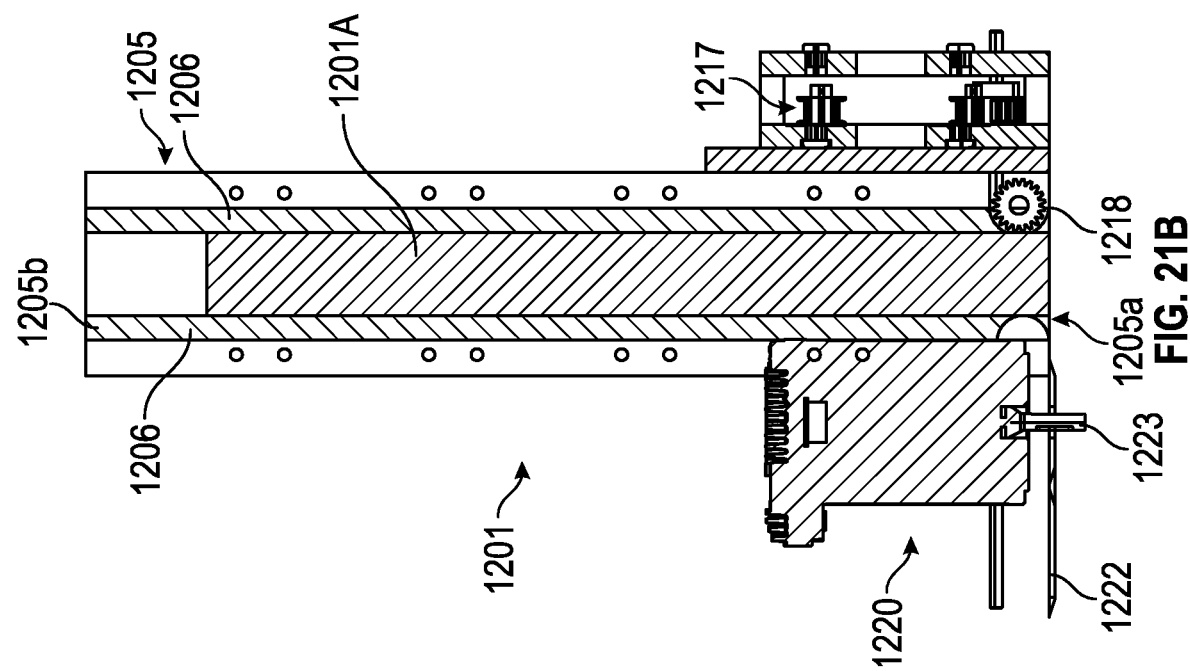
FIG. 21B is a cross-sectional view taken along the line 21B-21B of FIG. 21A.
Figure 21A:
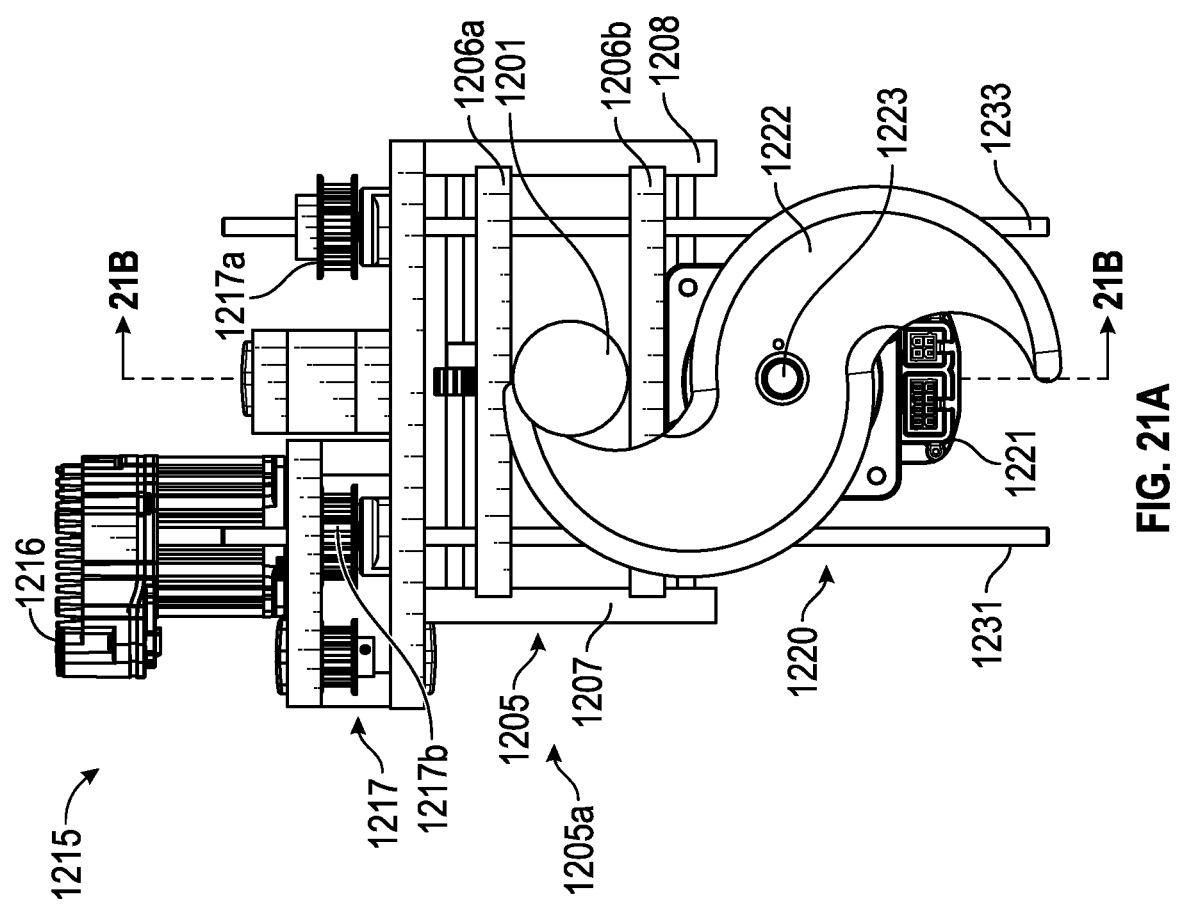
FIG. 21A is a bottom view of the bulk topping slicer.

FIG. 17A shows an embodiment of the sauce dispenser station 1100. The sauce dispenser station 1100 can include one or more sauce dispensers 1101-1104. The sauce dispenser station 1100 can be used in conjunction with the pan drive system 600 and the two-piece pizza pan 400. A pressed dough (not shown) can be located within the removable ring 440 of the two-piece pizza pan 400. The pan drive system 600 can advance the two-piece pizza pan 400 underneath a respective one of the sauce dispensers 1101-1104. Optionally all of the one or more sauce dispensers 1101-1104 can be mounted on a single frame 1150. The sauce can then be dispensed onto the dough.

FIGS. 17B-19C show the sauce dispenser 1101. The sauce dispenser 1101 can include a nozzle 1116 coupled with a reservoir cylinder 1115 and an actuator 1105. The actuator 1105 can include a shaft 1110. The shaft 1110 can be extendable from the actuator 1105. The shaft 1110 can be coupled with a piston 1111 within the cylinder 1115. The piston 1111 can be located within the cylinder 1115. The cylinder 1115 can be filled with a sauce to be dispensed through the nozzle 1116. Actuation of the nozzle 1116 can extend the shaft 1110 and the piston 1111 to dispense the sauce through the nozzle 1116. Optionally the cylinder 1115 can be coupled (e.g. via hose) with a supply of sauce. The retraction of the piston 1111 upwards within the cylinder 1115 can draw more sauce into the cylinder 1115 through a one-way valve thus the piston 111 coupled with the hose.

The sauce dispenser 1101 can include a rotary brush assembly. The rotary brush assembly can include a brush 1130. The brush 1130 can be extendable from the frame 1150 via an extension assembly 1120. The extension assembly 1120 can include an actuator coupled with the frame 1150. A shaft 1122 can be extendable from the actuator. The shaft 1122 can be coupled with a lower bracket 1123. The lower bracket 1123 can be coupled with a motor 1140. The motor 1140 can be movable with the shaft 1122. The motor 1140 can be coupled with a rotatable shaft 1131 attached with the brush 1130 through a coupling 1142. The lower bracket 1123 can include one or more bearings for supporting the rotatable shaft 1131.

The brush 1130 can include a first blade member 1132 and/or a second blade member 1134. The first blade member 1132 can extend in a first direction from a brush member 1135 of the brush 1130. The second blade 1134 can extend in a generally opposite direction from the first blade member 1132. The first blade member 1132 can be located on a first side of the rotatable shaft 1131 and the second blade member 1134 can be located on an opposite side of the rotatable shaft 1131. The blade members 1132, 1134 can include any of a plurality of bristles, wire, silicone or rubber blades, or other cleanable materials. Alternatively, the brush 1130 can comprise an air brush.

In operation, the shaft 1122 of the extension assembly 1120 can extend to contact the brush 1130 with the dispensed sauce on a pizza. The motor 1140 can then rotate the brush 1130 about the rotatable shaft 1131 to dispense the sauce evenly across the dough via rotation. This arrangement allows for the quick spreading of sauce on a dough. Each different sauce can include its own dispenser and/or brush 1130 to prevent cross-contamination of the sauces.

FIGS. 20A-21B show a bulk topping station 1200, which can be an implementation of the bulk topping dispenser component 135. The bulk topping station 1200 can include a slicer assembly 1201 configured for slicing a bulk topping block 1201A (e.g., meat or cheese). The bulk topping station 1200 can include the pan drive system 600 for positioning the two-piece pizza pan 400 beneath the slicer assembly

1201. The two-piece pizza pan 400 can be moved along the x and y-directions by the pan drive system 600 as the slicer assembly 1201 cuts and drops slices onto the two-piece pizza pan 400.

The slicer assembly 1201 can include a hopper 1205 configured to receive the bulk topping block 1201A. The hopper 1205 can include a lower end 1205a and an upper end 1205b. One or more wall can extend between the lower and upper ends 1205a, 1205b to at least partially enclose an interior space. The upper end 1205b can be open into the interior space. The bulk topping block 1201A can be insertable within the hopper 1205 at the upper end 1205b. The hopper 1205 can include one or more inner walls 1206. The inner walls 1206 can be adjustable to match the size of the bulk topping block 1201A. The inner walls 1206 can abut the bulk topping block 1201A. The inner walls 1206 can be oriented perpendicularly to one or more outer walls 1207, 1208.

Figure 22B:
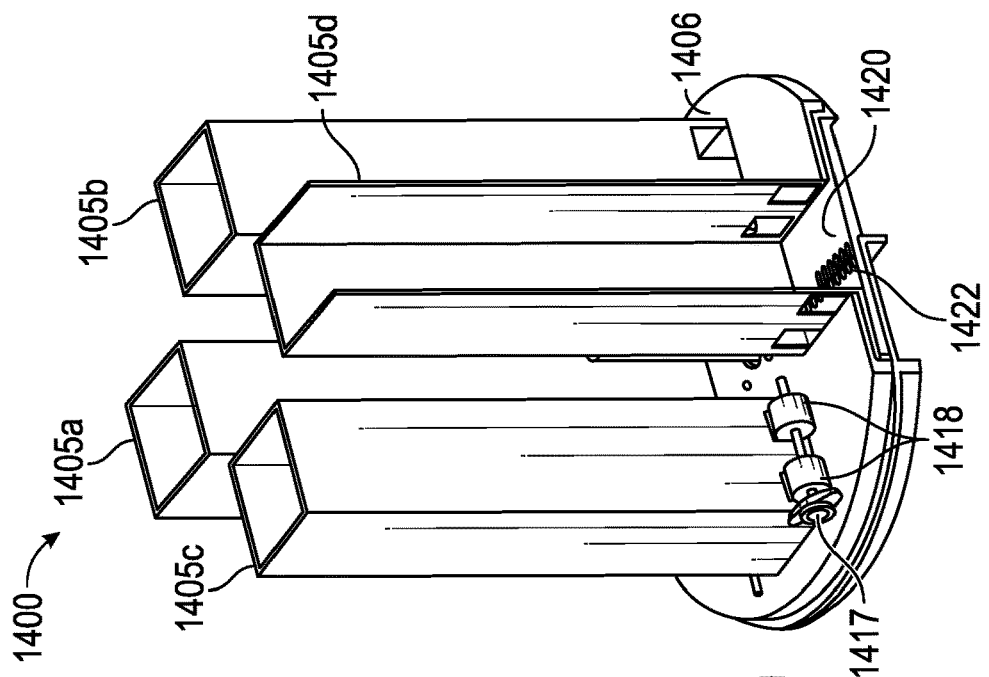
FIG. 22B is another alternative example of a bulk topping station including a cheese grater and cheese hoppers.

The hopper 1205 can also include an advance system 1215. The advance system 1215 can advance the bulk topping block 1201A towards the lower end 1205a of the hopper. The advance system 1215 can include a motor 1216. The motor 1216 can be coupled with a transmission 1217. The transmission 1217 can include one or more belts, gears, sprockets or other mechanisms. The transmission 1217 can couple with one or more drive wheels 1217a, 1217b. The drive wheels 1217a, 1217b can be coupled with one or more respective shafts 1231, 1233. The shafts 1231, 1233 can be used in conjunction with an engagement member (e.g., a belt or sprocket) (not shown) that engages with sides of the bulk topping block 1201A. Rotation of the drive wheels 1217a, 1217b and respective shafts 1231, 1233 can advance the advance the bulk topping block 1201A towards the lower end 1205a. The advance system 1215 can also include an encoder sensor 1218. The encoder sensor 1218 can include a sprocket that engages with the side of the bulk topping block 1201A. The encoder sensor 1218 can provide feedback as to the location of the bulk topping block 1201a within the hopper 1205 to monitor the performance of the slicer assembly 1201. As an alternative the advance system 1215 can rely alone on the force of gravity to advance the bulk topping block 1201A within the hopper 1205. Another alternative advancement system is shown in FIG. 22C.

The slicer assembly 1201 can include a blade assembly 1220. The blade assembly 1220 can be coupled at the lower end 1205a of the hopper 1205. The blade assembly 1220 include a blade 1222. The blade 1222 can include one or more sharpened ends for slicing the bulk topping block 1201A. The blade 1222 can be mounted on a rotating shaft 1223. The rotating shaft 1223 can be coupled with a motor 1221. The motor 1221 can rotate the rotating shaft along with the blade 1222 during operation of the advance system 1215. The blade 1222 can be aligned along the lower end 1205a of the hopper 1205. As the bulk topping block 1201A is advanced out of the hopper 1205, the extended portion can be sliced by the blade 1222. The slicer assembly 1201 can be coupled with one or more of the outer walls 1207, 1208 of the hopper 1205.

One advantage of the bulk topping station 1200 is that the position of the bulk topping block 1201A (e.g., stick of meat or a block of cheese) can be tracked (e.g., using the encoder sensor 1218). By tracking advancement of the bulk topping block, the hopper 1205 can be replenished before exhaustion. The bulk topping station 1200 can include multiple other bulk topping blocks that can be automatically moved into position to replace the exhausted bulk topping block or can contain multiple types of the bulk topping to increase variety and ordering options. In certain example, the bulk topping station 1200 can include additional bulk topping blocks in storage in a refrigeration section located above the hopper 1205. One of the additional bulk topping blocks can be dispensed by actuating a door or other dispensing mechanism. The additional bulk topping block can be released into the hopper 1205. The bulk topping station 1200 can accordingly continue operation.

Another advantage of using bulk toppings for meats and cheeses is that the amount and/or dimensions of the dispensed portions of the block can be precisely controlled. By controlling the advancement of a meat bulk topping block, for example, and/or controlling the rotation of the blade 1222, the thickness of individual meat slices can be specified. The thickness can also be specified by a user placing an order in the system.

Another advantage of the bulk topping station 1200 is the controlled positioning of the slices on the pizza using the pan drive system 600. For example, an order can include different meats or cheeses on one-half of the pizza, or sliced meats can be placed in a defined pattern including but not limited to, letters, symbols, numbers, and shapes. The bulk topping station 1200 also avoids several problems with dispensing pre-shredded cheeses. A pre-shredded cheese in storage will stick together into clumps that can clog dispensing systems and must be mechanically separated. Alternatively, the pre-shredded cheese can be coated with cellulose or other moisture blocking substance. Pre-shredded cheese also mold more quickly than block cheeses.

Figure 22A:
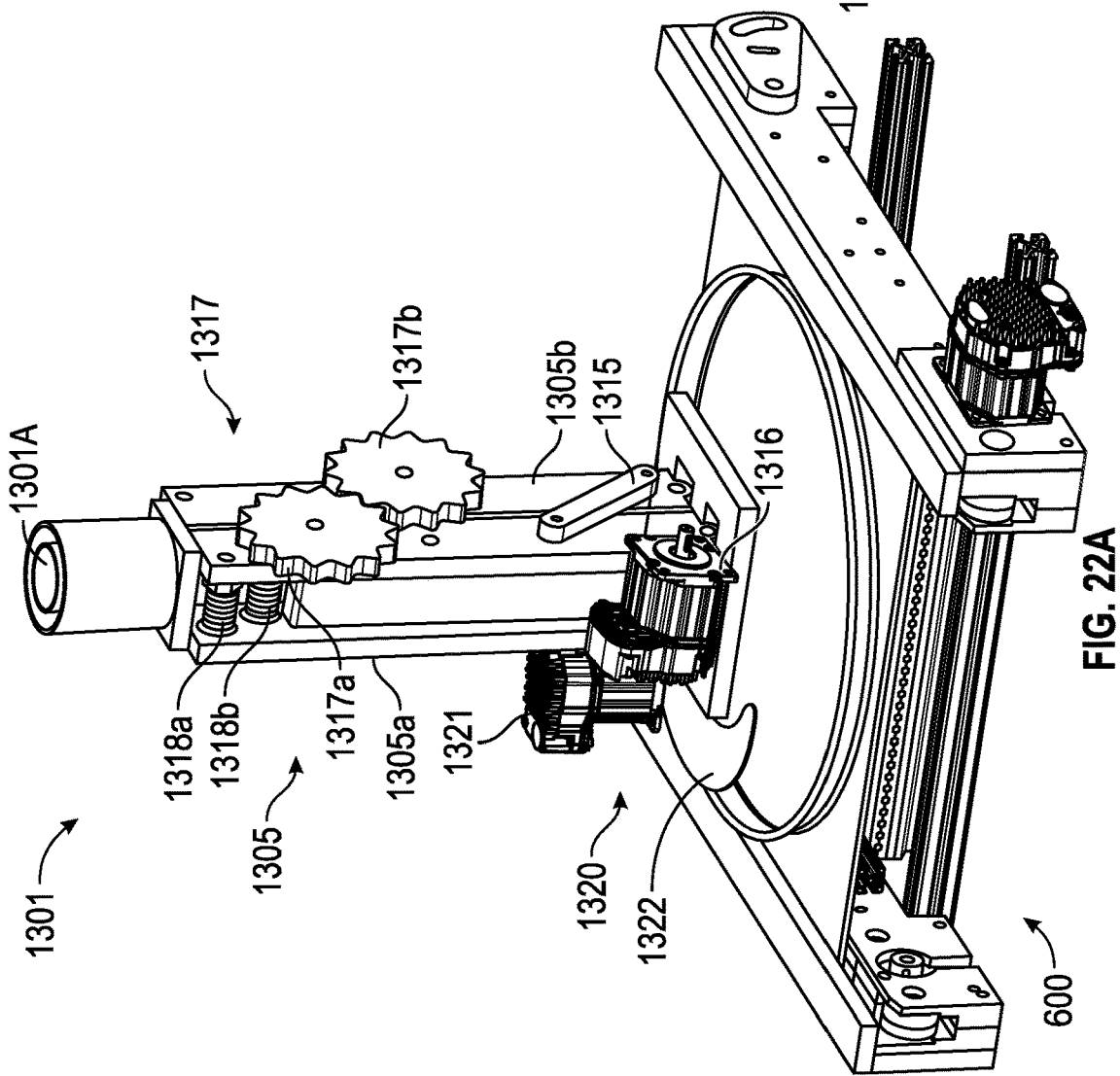
FIG. 22A is an alternative example of a bulk topping station including a driven hopper.
Figure 22C:
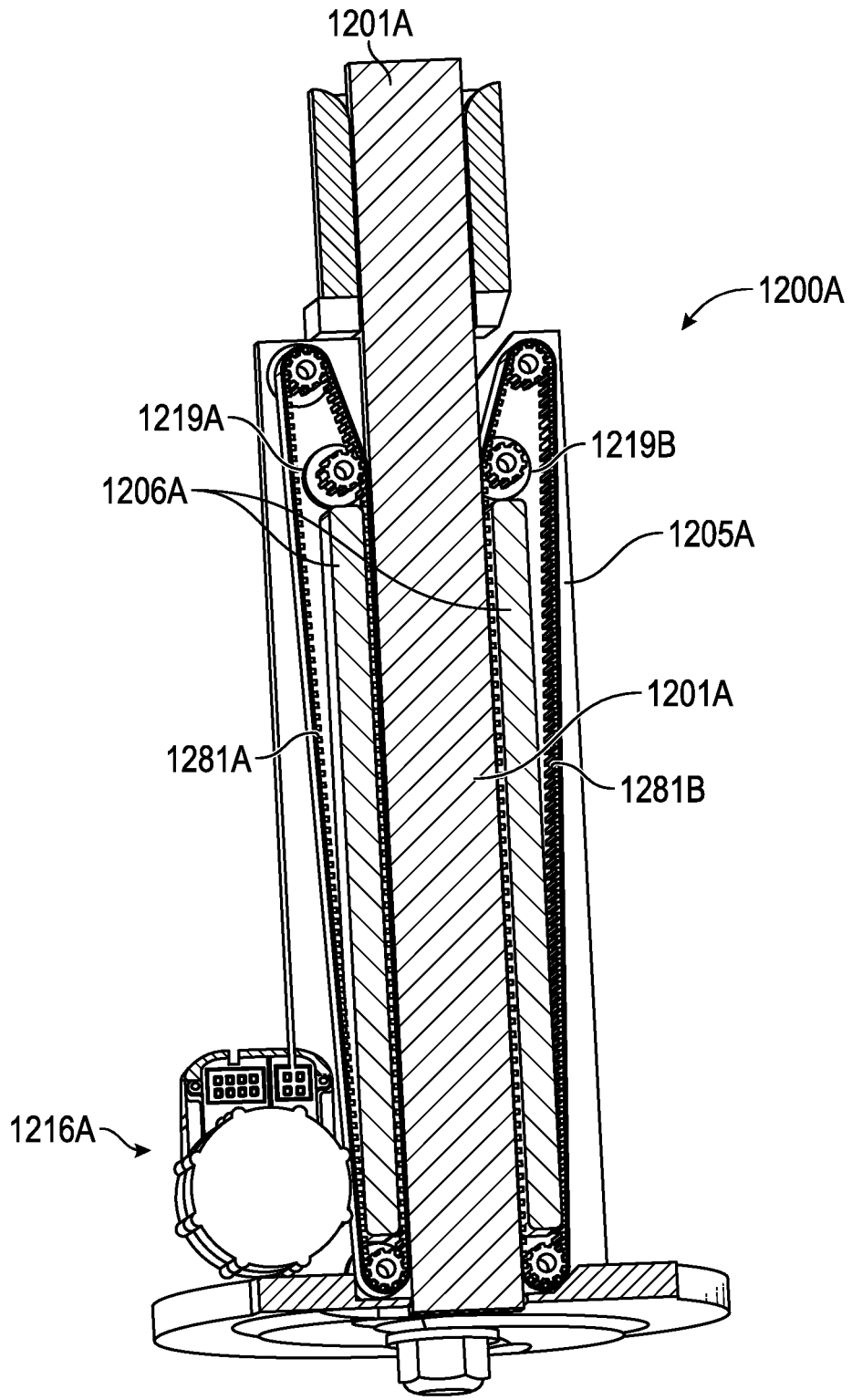
FIG. 22C is an alternative example of a bulk topping station including a belt-driven hopper system.

FIG. 22A shows a bulk topping station 1300, which can be another implementation of the bulk topping dispenser component 135. The bulk topping station 1300 can include a slicer system 1301 for slicing a bulk topping block 1301A. The two-piece pizza pan 400 can be advanced beneath the slicer system 1301 by the pan drive system 600.

The slicer system 1301 can include a hopper 1305. An upper end of the hopper 1305 can be cylindrically shaped. The hopper 1305 can be sized to receive the block 1301A. The hopper 1305 can include a first half 1305a and a second half 1305b. The second half 1305b can be coupled with the first half 1305a by one or more pivot link members 1315 (e.g., forming a four-bar mechanism).

The first half 1305a can include an advancement belt coupled with idler gears 1318a, 1318b. A transmission 1317, including sprockets 1317a, 1317b, couple the advancement belt with a drive motor 1316. The advancement belt can move the block 1301A towards a blade assembly 1320 to slice the bulk topping block 1301A. The second half 1305b can be biased towards the first half 1305a to engage the block 1301A into the advancement belt. The blade assembly 1320 can include a blade motor 1321 coupled with a slicing blade 1322. The blade assembly 1320 can be positioned at a lower end of the hopper 1305.

FIG. 22B shows a bulk topping station 1400, which can be another implementation of the bulk topping dispenser component 135. The bulk topping station 1400 can include one or more hoppers 1405a-d. Each of the hoppers 1405a-d can include sidewalls for supporting a bulk topping block (not shown) and an upper opening for inserting the bulk topping block into the respective hopper. The hoppers 1405a-d can be mounted on a base 1406. Each of the hoppers 1405a-d can include one or more wheels or sprockets (or belts) 1418 coupled with a drive shaft 1417. The drive shaft 1417 can be mounted on the base 1406. The sprockets 1418 can engage with the side of the bulk topping block through one or more apertures in the outer walls of the respective hopper. Optionally, the respective hoppers can include multiple drive shafts 1417 and/or sprockets 1418 at intervals along a height of the respective hoppers for engaging with and advancing the bulk topping block.

The base 1406 can include rotatable member 1420. The rotatable member 1420 can be rotatable with respect to the base 1406. The base 1406 can include one or more holes aligned with the lower ends of the respective hoppers through which a lower end of the bulk topping blocks can be inserted. The rotatable member 1420 can include a grater 142 can cut or shred the lower ends of the bulk topping block as the bulk topping blocks are advanced through the base 1406.

FIG. 22C shows a first bulk topping station 1200A, which can be another implementation of the bulk topping station 1200. The first bulk topping station 1200A can include a hopper 1205A for receiving a bulk topping block 1201A. The hopper 1205A can include inner walls 1206A. The inner walls 1206A can position the bulk topping block 1201A and/or support advancement belts 1281A, 1281B. The advancement belts 1281A, 1281B can be positioned between the inner walls 1206A and the bulk topping block 1201A. The advancement belts 1281A, 1281B can be engaged with one or more respective drive wheels and idler wheels 1219A, 1219B. By advancement of the advancement belts 1281A, 1281B by a motor 1216A, the bulk topping block 1201A can be advanced into a blade system.

Figure 23A:
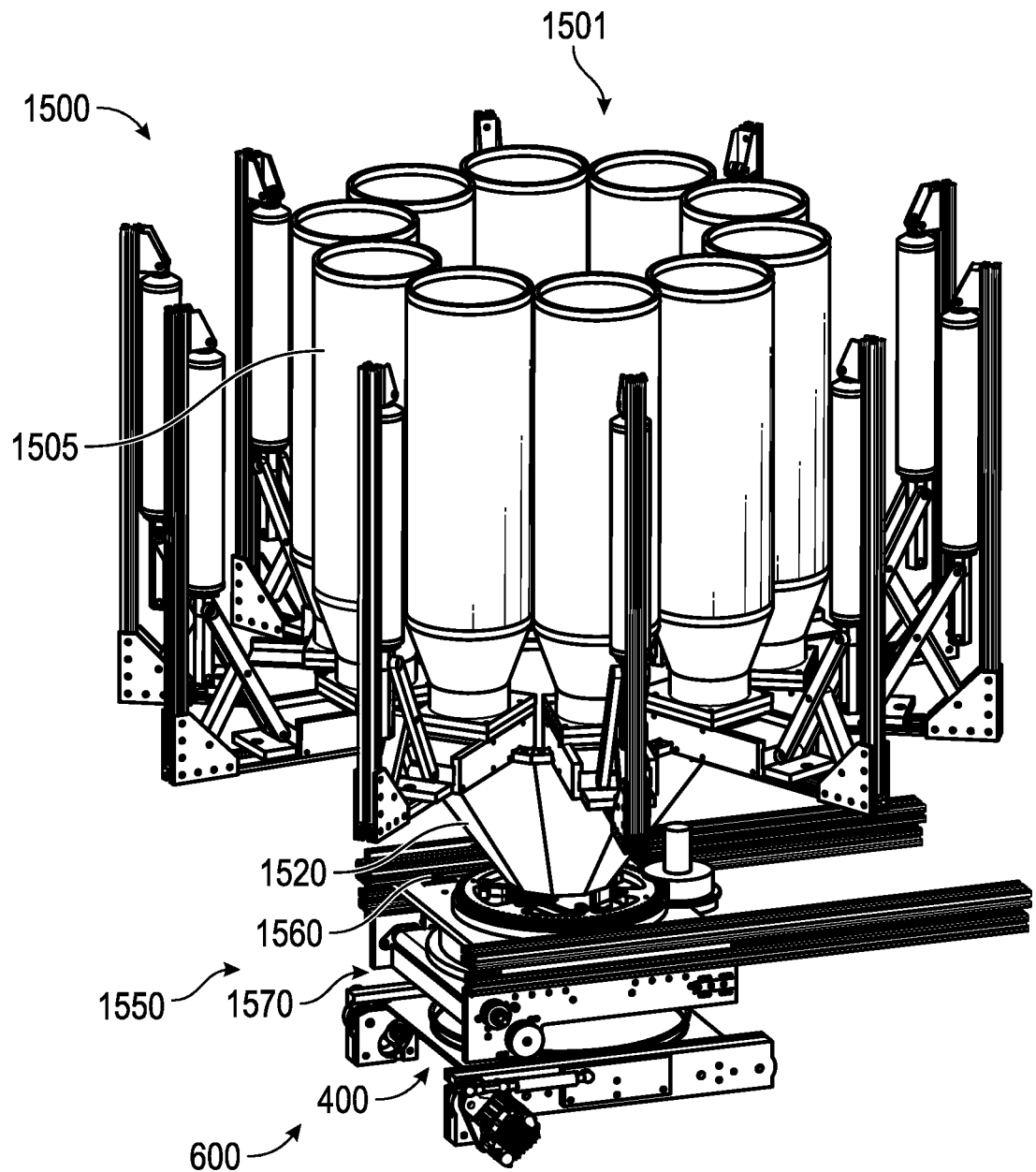
FIG. 23A is a perspective view of a loose topping station.
Figure 23B:
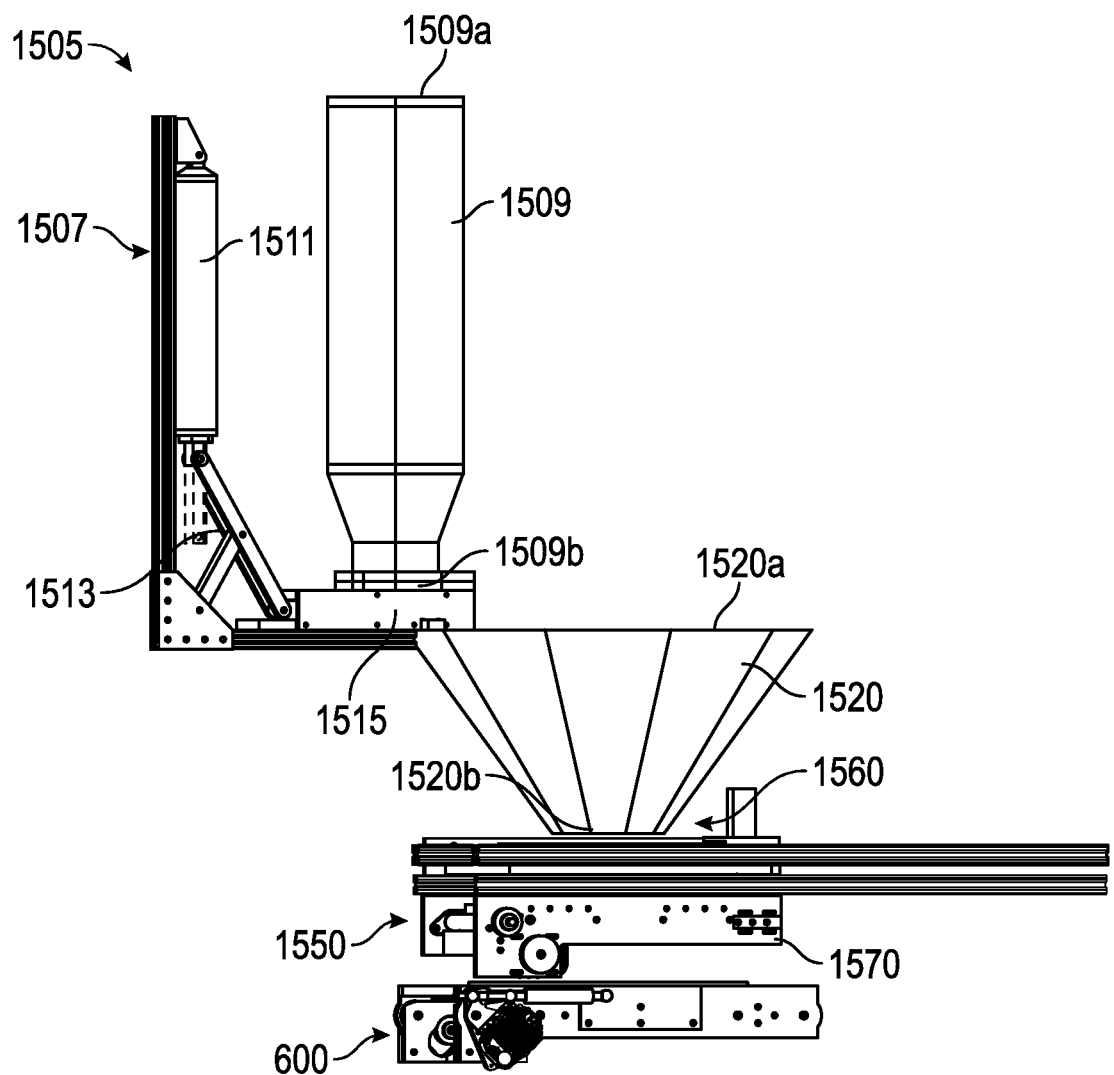
FIG. 23B is a side view of the loose topping station with several components removed.

FIG. 23A illustrates a loose topping station 1500, which can be an implementation of the loose topping dispenser component 140. The loose topping station 1500 can generally function to distribute one or more loose toppings onto the pizza dough. The pizza dough can be positioned by the pan drive system 600. The loose topping station 1500 can include a dispenser system 1501 for dispensing one or more loose toppings. The dispenser system 1501 can include a dispenser unit 1505 of a plurality of structurally and/or functionally identical or similar dispenser units.

The dispenser unit 1505 can include a loose topping hopper 1509. The loose topping hopper 1509 can include an upper end 1509a and a lower end 1509b. A sidewall can extend form the upper end 1509a to the lower end 1509b to form a receptacle. The upper end 1509a can include an opening into the loose topping hopper 1509. The lower end 1509b can include an opening for distributing contents of the loose topping hopper 1509. The lower end 1509b can include an opening actuator assembly 1507. The hopper 1509 can include an agitator therein to prevent clumping of the loose toppings.

The opening actuator assembly 1507 can include a distributer block 1515. The distributer block 1515 can be coupled with a linkage 1513. The linkage 1513 can include one or more link members. One end of the linkage 1513 can be coupled with the distributer block 1515. An opposite end of the linkage 1513 can be coupled what an actuator 1511. The actuator 1511 can include a movable shaft coupled with the linkage 1513. Extension and retraction of the shaft of the actuator 1511 can open and close the opening of the lower end 1509b by movement of the distributer block 1515. The actuator 1511 can be mounted vertically or horizontally, depending on space considerations.

The distributer block 1515 can include an inner cavity. The inner cavity can house a pre-determined amount of loose toppings. The cavity of the distributer block 1515 can be open on a top and bottom into the cavity. In a first position, the upper opening of the distributer block 1515 can align with the opening of the lower end 1509b of the loose topping hopper 1509. One or more loose toppings can be received within the cavity. In a second position, the bottom opening of the distributer block 1515 can allow the contents of the cavity to be dispensed. In this manner, a pre-determined amount of loose topping can be distributed.

The dispenser system 1501 can include a funnel 1520. The dispenser unit 1505 can be located above an upper end 1520a of the funnel 1520. The plurality of dispensers units can be arranged around the upper end 1520a of the funnel 1520 (e.g., in a circular fashion). A lower end 1520b of the funnel 1520 can be spaced below the upper end 1520a. An opening at the lower end 1520b can have a smaller diameter than an opening at the upper end 1520a.

The dispenser system 1501 can include a mix and distribute assembly 1550. The mix and distribute assembly 1550 can be located beneath the lower end 1520b of the funnel 1520. The mix and distribute assembly 1550 can include a mixing system 1560 and a distribution belt 1570. The distribution belt 1570 can be located below the mixing system 1560. The pan drive system 600 can locate the two-piece pizza pan 400 beneath the distribution belt 1570.

Figure 24A:
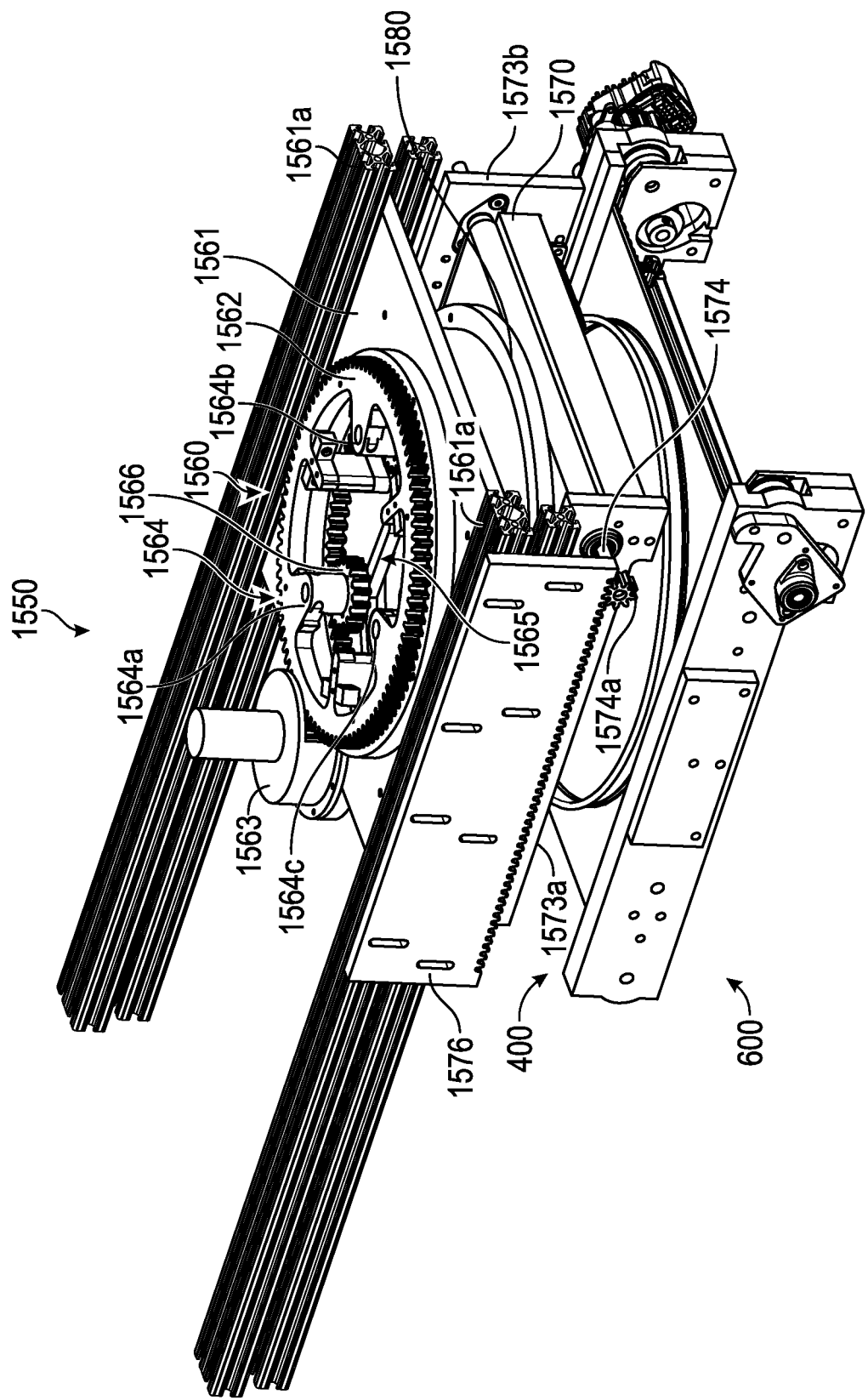
FIG. 24A is a perspective view of a mixing and distribution system of the loose topping station.
Figure 24B:
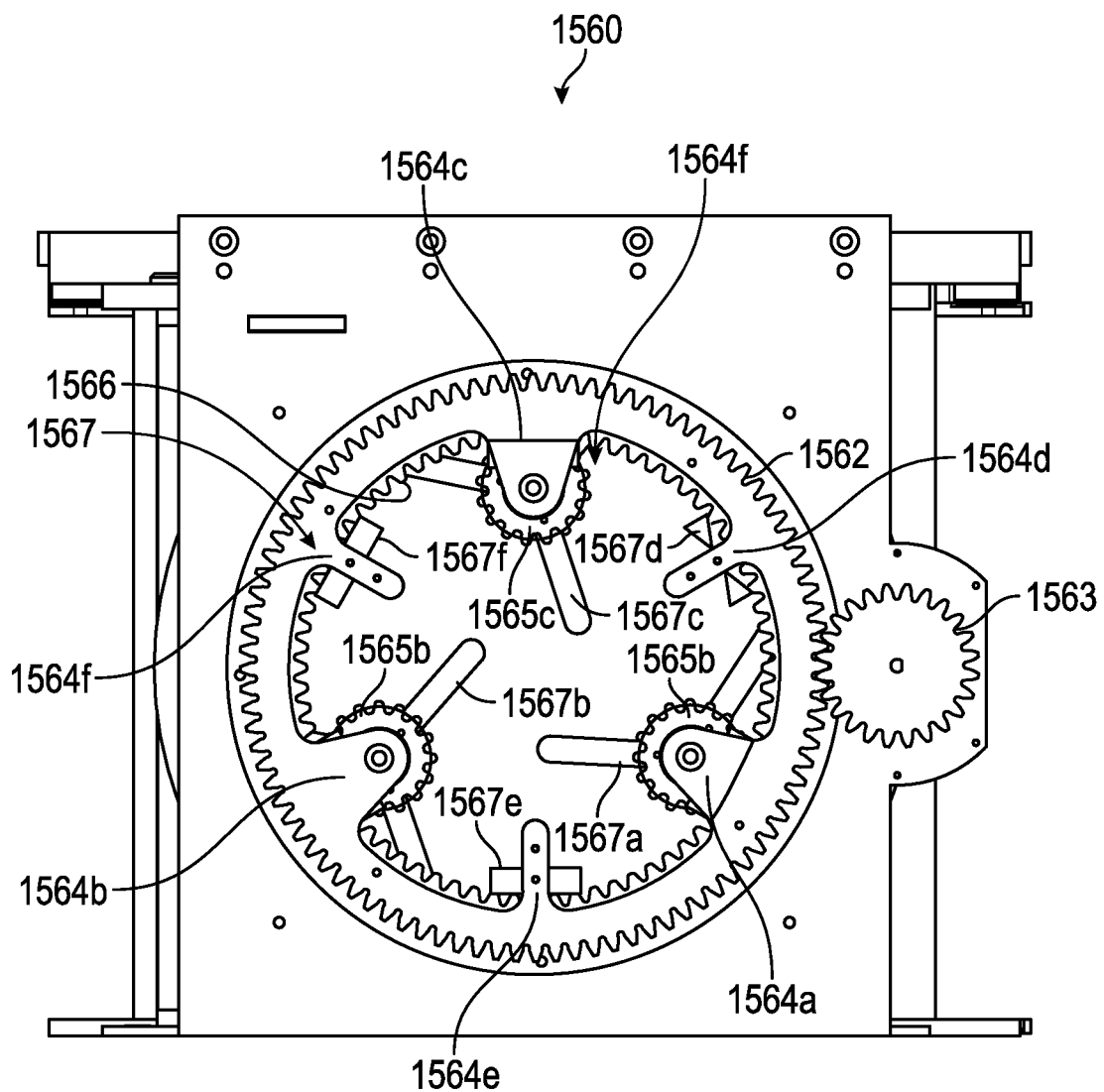
FIG. 24B is a top view of the mixing and distribution system.

FIGS. 24A-B show further detail of the mix and distribute assembly 1550. The mix and distribute assembly 1550 can include a base plate 1561. The mixing system 1560 can be mounted on the base plate 1561. The base plate 1561 can be mounted a pair of mounting rails 1561a. The distribution belt 1570 can be mounted on the mounting rails 1561a.

The mixing system 1560 can include a sprocket 1562. The sprocket 1562 can be rotatably attached with the base plate 1561. The sprocket 1562 can be oriented generally horizontally on the base plate 1561. The sprocket 1562 can be coupled with a motor 1563 for rotating the sprocket 1562 with respect to the base plate 1561. The sprocket 1562 can include an opening through a center thereof. The sprocket 1562 can include one or more extensions 1564 protruding radially inwardly into the opening from an outer annular rim. The extensions 1564 can include first extensions 1564a-c and/or second extensions 1564d-f, although any other number of extensions are contemplated herein.

The mixing system 1560 can include one or more planetary gears 1565. Each of the planetary gears 1565a-c can be rotatably mounted on a respective one of the first extensions 1564a-c. The planetary gears 1565 can be mounted on the respective first extensions 1564a-c. The planetary gears 1565 can engage with a rim gear 1566. The rim gear 1566 can be fixed with respect to the base plate 1561. The rim gear 1566 can be mounted beneath the sprocket 1562. Rotation of the sprocket 1562 can engage the planetary gears 1565 with the rim gear 1566 and cause rotation thereof with respect to the first extensions.

The mixing system 1560 can include one or more stationary brushes 1567. Each of the stationary brushes 1567d-f can be rotatably mounted on a respective one of the second extensions 1564d-f. The stationary brushes 1567 can be mounted on a lower side of the respective second extensions. The stationary brushes 1567 can include one or more bristles or blades extending from the second extensions. The bristles can include silicon, rubber or other cleanable materials. The bristles can extend downwardly from the extension members and into contact with an upper surface of the distribution belt 1570.

The mixing system 1560 can include one or more rotatable brushes. The rotatable brushes can each include an upper member 1567a-c having one or more arms and one or more bristles or blades 1568a-c extending from the upper member. The bristles can include silicon, rubber or other cleanable materials. The bristles 1568a-c can extend downwardly from the extension members and into contact with the upper surface of the distribution belt 1570. The rotatable brushes 1565*a-c* be mounted on a respective one of the planetary gears 1564*a-c* and rotatable therewith.

The mixing system 1560 can include a shield 1580. The shield 1580 can be located below the base plate 1561. The shield 1580 can include a generally cylindrical outer wall member (guard) 1581. The outer wall member can include a sidewall extending generally vertically. An upper end of the outer wall member 1581 can be coupled with the base plate 1561. A lower end of the outer wall member 1581 can be adjacent to and/or in contact with the upper surface of the distribution belt 1570. A lower end of the outer wall member 1581 can include an outer circumferential member.

The distribution belt 1570 can include a movable belt 1571. The movable belt 1571 can define the upper surface of the distribution belt 1570. The movable belt 1571 can be positioned below the opening of the sprocket 1562 and/or the shield 1580. The movable belt 1571 can include two side rails 1573*a-b*. The two side rails 1573*a-b* can be slidably mounted on the mounting rails 1561*a*. A first end of the movable belt 1571 can be mounted on a drive axle 1574. The drive axle 1574 can be journaled in a first end of the two side rails 1573*a-b*. A second end of the movable belt 1571 can be mounted on a second axle 1575. The second axle 1575 can be journaled in a second end of the two side rails 1573*a-b*. The drive axle 1574 can be coupled with a motor for rotating and advancing the movable belt 1571.

One of the two side rails 1561*a* can include a rack 1576 fixed therewith. One end of the drive axle 1574 can include a sprocket 1574*a* that engages with the rack 1576. Rotation of the drive axle 1574 can cause the movable belt 1571 and the two side rails 1573 to slide along the mounting rails 1561*a*. Depending on the direction of rotation of the drive axle 1574, the movable belt 1571 can be advanced or retracted along a first direction relative to the shield 1580.

Figure 25A:
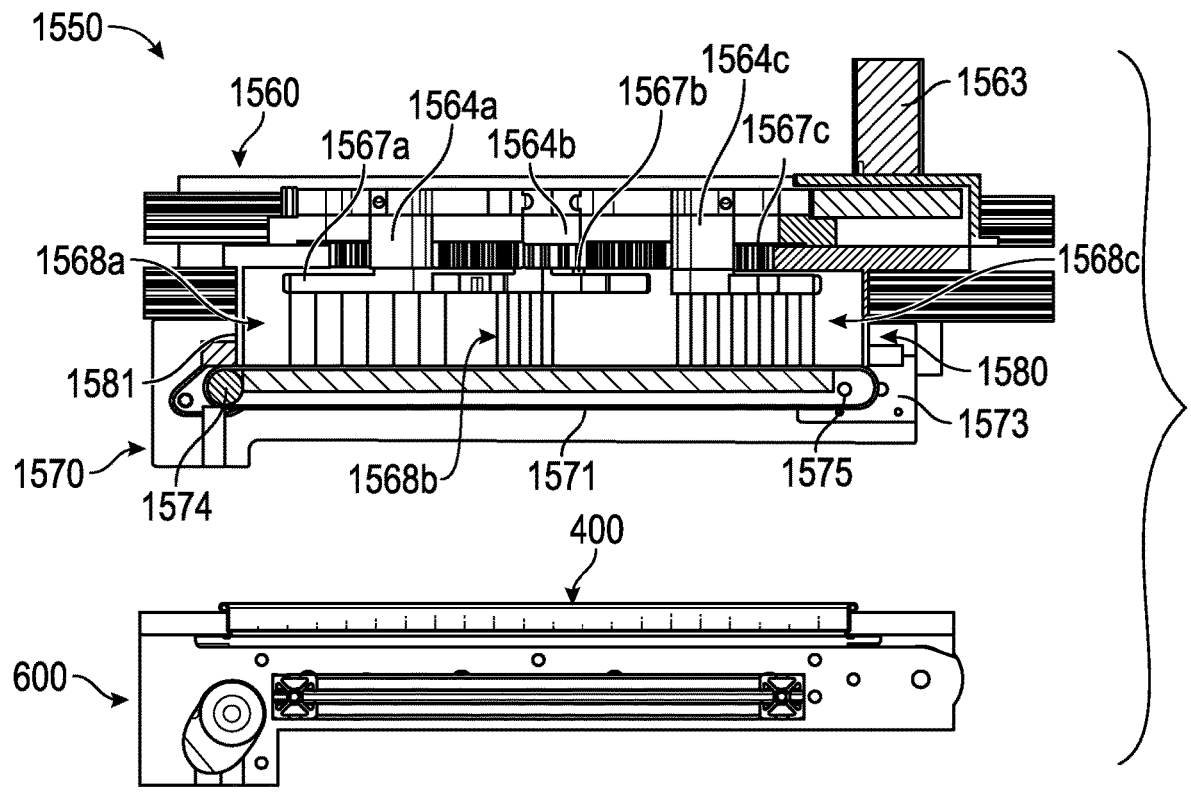
FIG. 25A is a cross-sectional view of the mixing and distribution system in a mixing configuration.
Figure 25B:
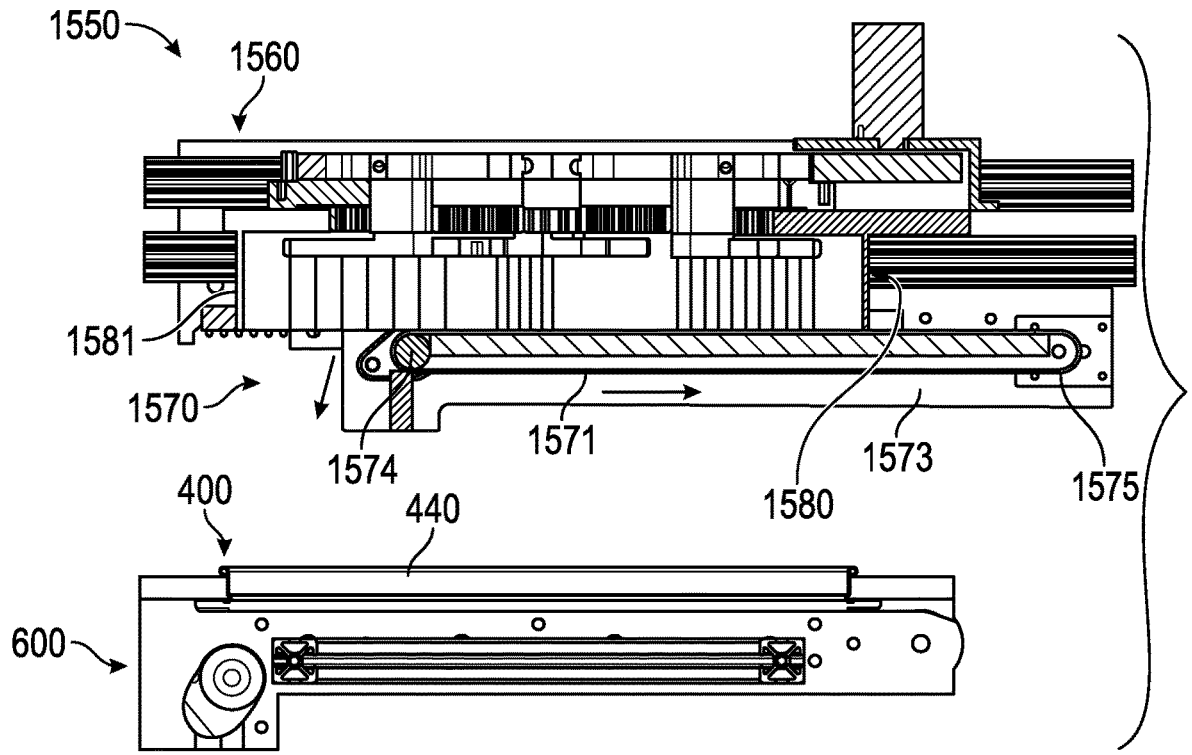
FIG. 25B is a cross-sectional view of the mixing and distribution system in a distributing configuration.

FIGS. 25A-B show operation of the mix and distribute assembly 1550. In a first configuration (FIG. 25A), the movable belt 1571 can be aligned beneath the shield 1580. A diameter of the shield 1580 can be less than a width of the movable belt 1571. The movable belt 1571 can enclose a bottom rim of the shield 1580. Loose toppings can be dispensed from the dispenser unit 1505 and/or one or more of the other dispenser units of the dispenser system 1501. The dispensed loose topping can be funneled into the mixing system 1560. The loose toppings can pass through the opening of the sprocket 1562 and land on the upper surface of the movable belt 1571. The motor 1563 can rotate the sprocket 1562 and thereby rotate the planetary gears 1565 and the rotating brushes 1568. The stationary brushes 1567 can also rotate with the sprocket 1562. Both types of brushes can contact the dispensed loose toppings to distribute them over the movable belt 1571. The distribution can be essentially even. In certain implementations, the mix and distribute assembly 1550 can include an optical inspection system to inspect the distribution of the loose toppings.

The pan drive system 600 can locate the two-piece pizza pan 400 directly underneath the movable belt 1571. The removable ring 440 can be aligned with the shield 1580. A first end of the removable ring 440 can align with the first end of the movable belt 1571. A second end of the removable ring 440 can align with the second end of the movable belt 1571. The movable belt 1571 and/or the shield 1580 can have a diameter (or other width) that corresponds to the diameter of the two-piece pizza pan 400. Alternatively, the shield 1580 can have a slightly smaller diameter that can concentrate the loose toppings on the two-piece pizza pan 400 away from the edges of the pizza to account for an outer crust.

After the loose toppings are distributed on the movable belt 1571, the movable belt 1571 can be advanced into a second configuration, as shown in FIG. 25B. As the movable belt 1571 advances, the two side rails 1573 can move along the mounting rails 1561*a*. The belt 1571 can advance in a first direction and the side rails 1573 can advance in the opposite direction. The belt 1571 can advance in a first direction at the same speed as the side rails 1573 can advance in the opposite direction. The loose toppings contained on the movable belt 1571 can be dropped onto the two-piece pizza pan 400. The loose toppings contained on the movable belt 1571 can drop directly vertically downwards onto the two-piece pizza pan 400. As the movable belt 1571 retracts, the loose toppings can be dispersed across the two-piece pizza pan 400 from the first end towards the second end (e.g., of the removable ring 440). The retraction and advancement of the movable belt 1571 can be continued until all of the dispensed loose toppings have been dropped onto the two-piece pizza pan 400.

In another implementation, the loose toppings can be dropped on either a front half or a rear half of the pizza. To dispense the loose topping on the front half, the first and second ends of the removable ring 440 can be aligned with the first and second ends of the movable belt 1571. As the movable belt 1571 is advanced to drop the loose toppings and the two side rails 1573 are retracted, the pan drive system 600 can move the pan drive system 600 in the same direction as the two side rails 1573, but at half the speed of the two side rails 1573. As the two side rails 1573 reach the full retraction position, a middle of the pan can be aligned with the first end of the movable belt 1571. Thus, the loose toppings are dropped only on the front half of the pan. To dispense the loose topping on the rear half, the middle section of the two-piece pizza pan 400 can be aligned with the first end of the movable belt 1571. As the movable belt 1571 is advanced to drop loose toppings (e.g., a newly distributed set of topping) and the two side rails 1573 are retracted, the pan drive system 600 can move the pan drive system 600 in the same direction as the two side rails, but at half the speed of the two side rails 1573. As the two side rails 1573 reach the full retraction position, the second end of the pan can be aligned with the first end of the movable belt 1571. Thus, the loose toppings are dropped only on the second half of the pan.

In an alternative arrangement, the movable belt 1571 can be stationary on the mounting rails 1561*a*. The shield 1580 can be movable out of contact with the upper surface of the movable belt 1571. The pan drive system 600 can then advance the two-piece pizza pan 400 as the movable belt 1571 is advanced to drop the toppings on the two-piece pizza pan 400.

Figure 25C:
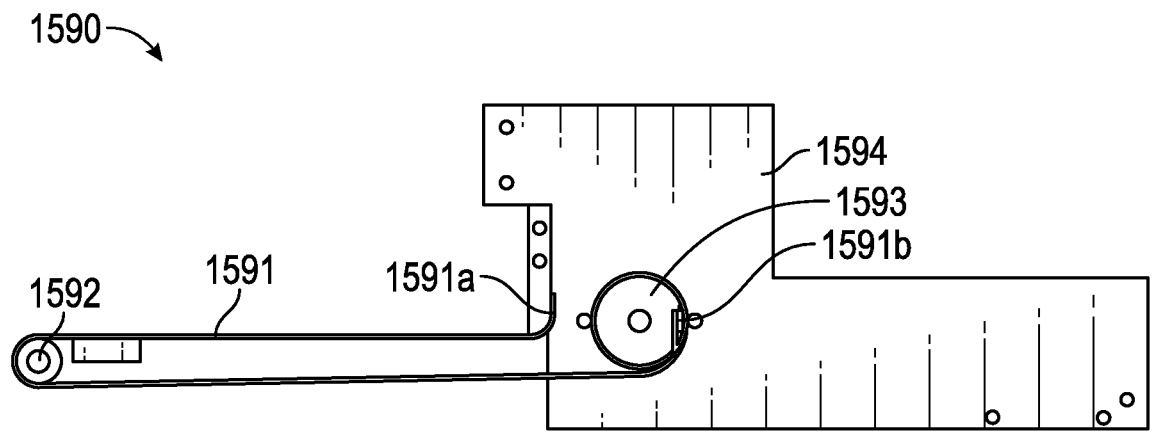
FIG. 25C is a cross-sectional view of an alternative distribution belt in an extended configuration.
Figure 25D:
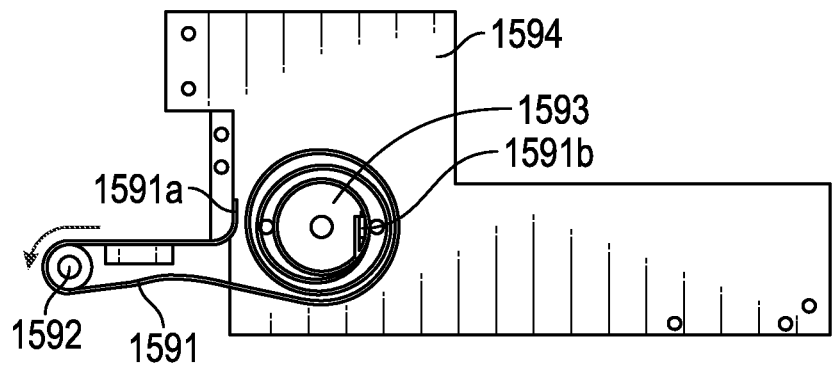
FIG. 25D is a cross-sectional view of the alternative distribution belt in a retracted configuration.

FIG. 25C shown another embodiment of a distribution belt 1590, which can include a belt 1591 and a frame member 1594. A first end 1591*a* of the belt 1591 can be coupled with the frame 1594. A second end 1591*b* of the belt 1591 can be coupled with a mandrel 1593. The second end 1591*b* can be retractable on the mandrel 1593 by rotation thereof. An outer end of the belt 1591 can be supported on a roller 1592. The roller 1592 can be biased outwardly to tighten and support the belt 1591 (e.g., by a gas spring). Retraction of the belt 1591 on the mandrel 1593 can retract the roller 1592 and drop any loose topping on the belt 1591. The loose toppings can fall onto a pizza pan below the distribution belt 1590. The belt 1591 can be returned to the extended configuration by reversing of the mandrel 1593 and action of the biasing mechanism or gas strut.

Figure 26A:
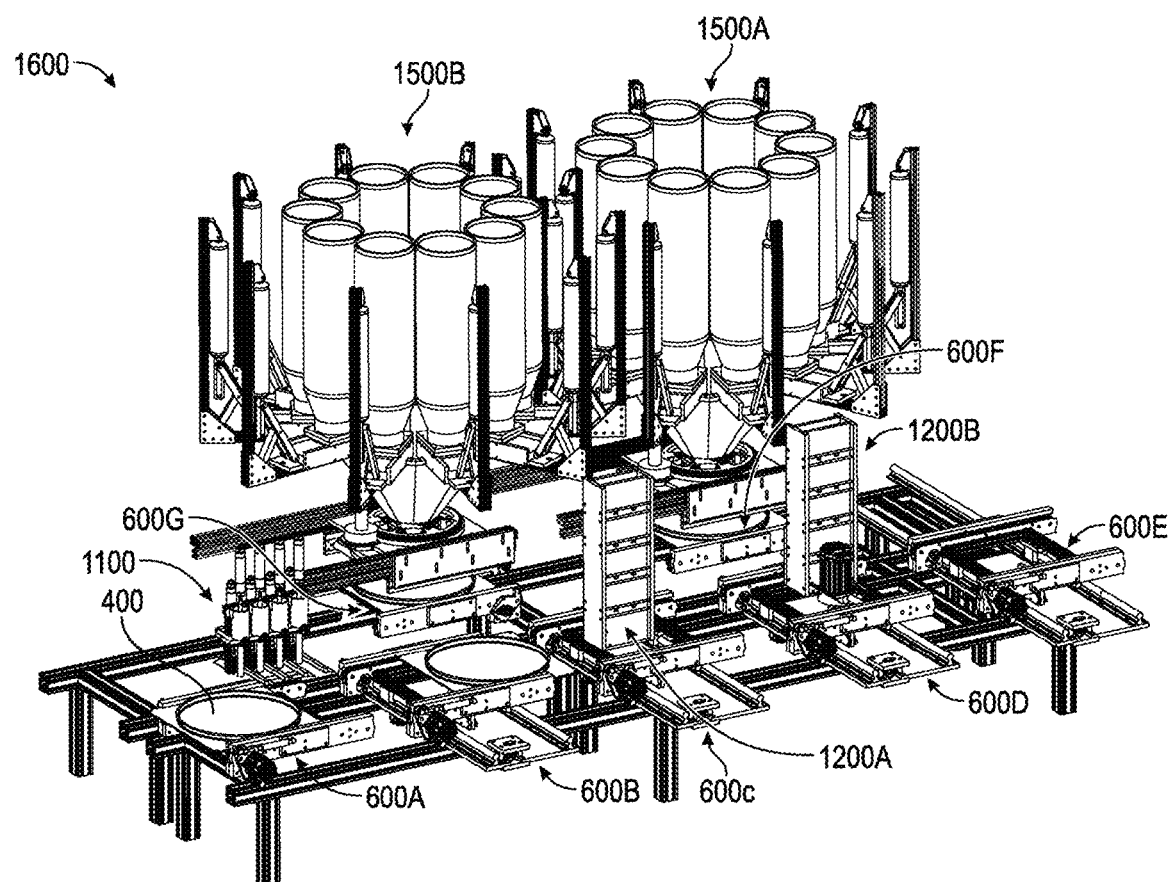
FIG. 26A is a perspective view of a topping line.

FIG. 26A illustrates a topping line 1600 of an automated pizza-making system according to one layout. The topping line 1600 can add sauce, cheese, sliced meats, and/or loose toppings onto a dough on a two-piece pizza pan 400. The two-piece pizza pan 400 can be conveyed through the topping line 1600 using the pan drive system 600. The pan drive system 600 can be configured to convey the two-piece pizza pan 400 along an x direction or along an x or y-direction, depending on the requirements of the station. The topping line 1600 can include the sauce dispenser station 1100, one or more bulk topping stations 1200A-B, and/or one or more loose topping stations 1500A-B.

The sauce dispenser station 1100 can be used in conjunction with a first pan drive system 600A that conveys the two-piece pizza pan 400 in the x-direction. The first pan drive system 600A can pass the two-piece pizza pan 400 to a second pan drive system 600B. The second pan drive system 600B can pass the two-piece pizza pan 400 to a third pan drive system 600C at the first bulk topping station 1200A. In other implementations, the length of the rails in the first pan drive system 600A can be elongated to reach the first bulk topping station 1200A. The first bulk topping station 1200A can comprise a cheese grater. The third pan drive system 600C can include both x and y-direction rails. The third pan drive system 600C can pass the two-piece pizza pan 400 to a fourth pan drive system 600D at the second bulk topping station 1200B. The fourth pan drive system 600D can include both x and y-direction rails. The fourth pan drive system 600D can pass the two-piece pizza pan 400 to a fifth pan drive system 600E. The fifth pan drive system 600E can include both x and y-direction rails. The sauce dispensing station and the first and second bulk topping stations 1200A, 1200B can be aligned along a first side of the topping line 1600. The y-direction rails can be elongate, to allow turning the pizza pan from the first side to a second side of the topping line 1600. The second side of the topping line 1600 can include the first and/or second loose topping stations 1500A, 1500B. The fifth pan drive system 600E can pass the pizza pan to a sixth pan drive system 600F at the first loose topping station 1500A. The sixth pan drive system 600F can pass the pizza pan to a seventh pan drive system 600G at the second loose topping station 1500B.

Figure 26B:
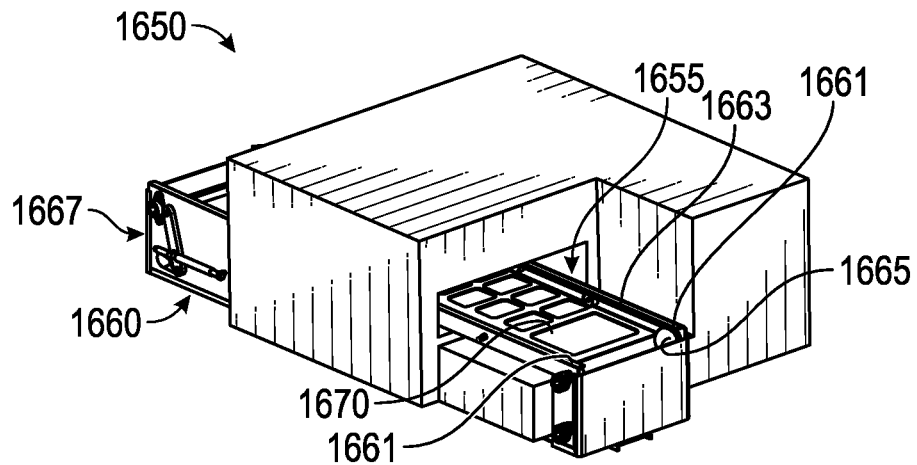
FIG. 26B shows a perspective view of an oven.

FIG. 26B shows an oven 1650. The oven 1650 can be an implementation of the oven component 150 of the system 100. The oven 150 can include a pan drive 1660, like the pan drive 600. The pan drive 1660 can include rails 1661. The rails 1661 can include metal timing belts 1663 (e.g., stainless steel) for conveying pizza pans 400 received within pan slots. A tensioner 1667 can provide tension to the timing belts 1663. The oven 1650 can include one or more inductive heating units 1670. The inductive heating units 1670 can be located before an entrance 1655 into the oven 1650. The inductive heating units 1670 can pre-heat the pizza pans 400 before entering the oven 1650 to speed up cooking.

Figure 27:
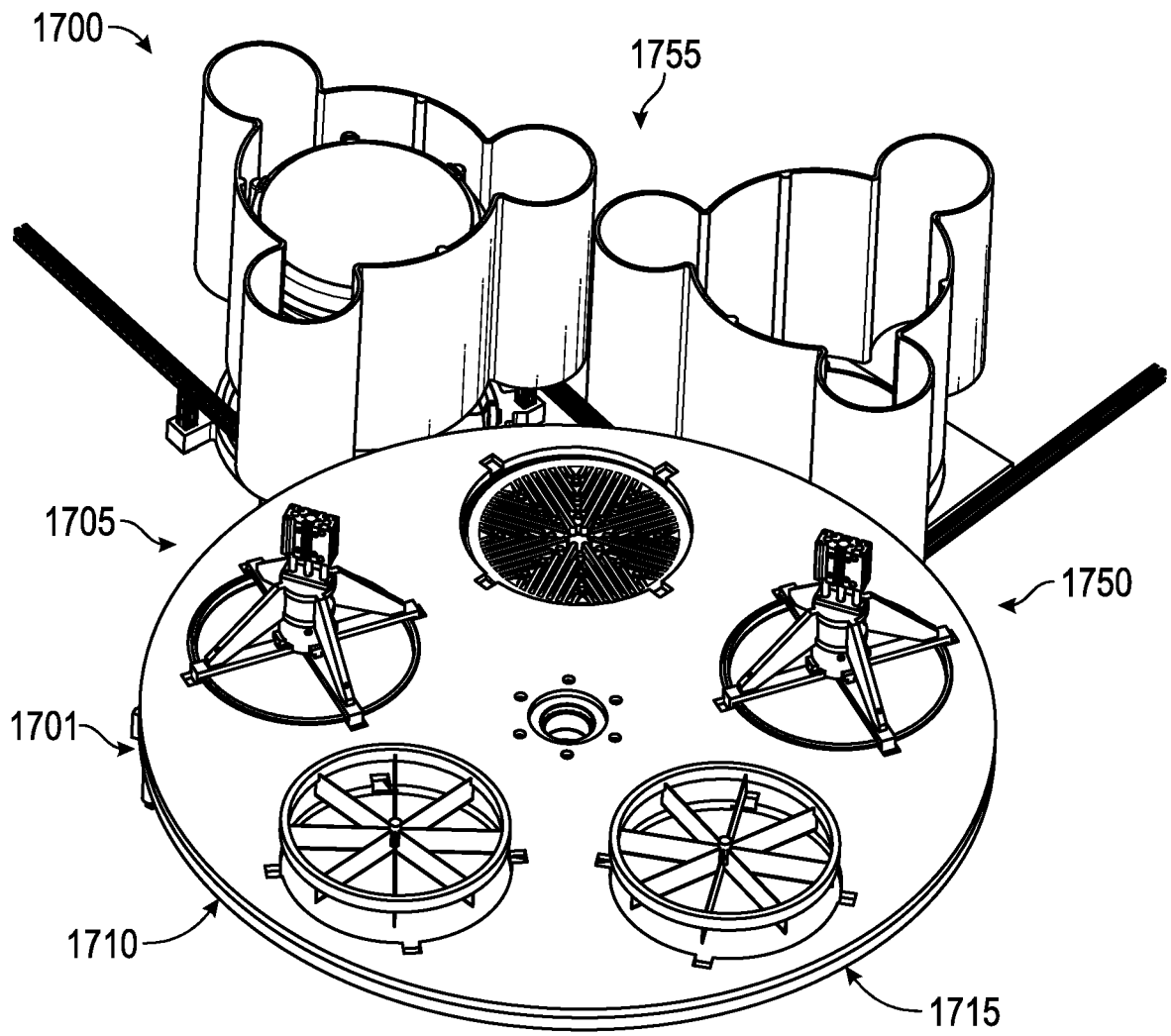
FIG. 27 is a perspective view of a finish system for slicing and boxing a pizza.

FIG. 27 shows a finish dial 1700, which can be an implementation of the finish system component 155. The finish dial 1700 can receive cooked pizzas from the oven and perform additional steps to process the pizzas. The finish dial 1700 can include one or more stations for processing the pizza (e.g., after cooking in the oven). The stations of the finish dial 1700 can include a ring removal station 1705, one or more slicing stations 1710, 1715, a glaze station 1750, and/or a boxing station 1755. In one implementation, the stations can progress from the ring removal station 1705, to the first slicing station 1710, to the second slicing station 1715, to the glaze station 1750 and finally to the boxing station 1755.

The finish dial 1700 can include a rotary dial 1701. The stations of the finish dial 1700 can be arranged around a circumference of the rotary dial 1701. The rotary dial 1701 can function to transport pizzas between the stations of the finish dial 1700. The rotary dial 1701 can include an upper dial member 1801, a lower dial member, and/or a rotational assembly 1810.

Figure 28:
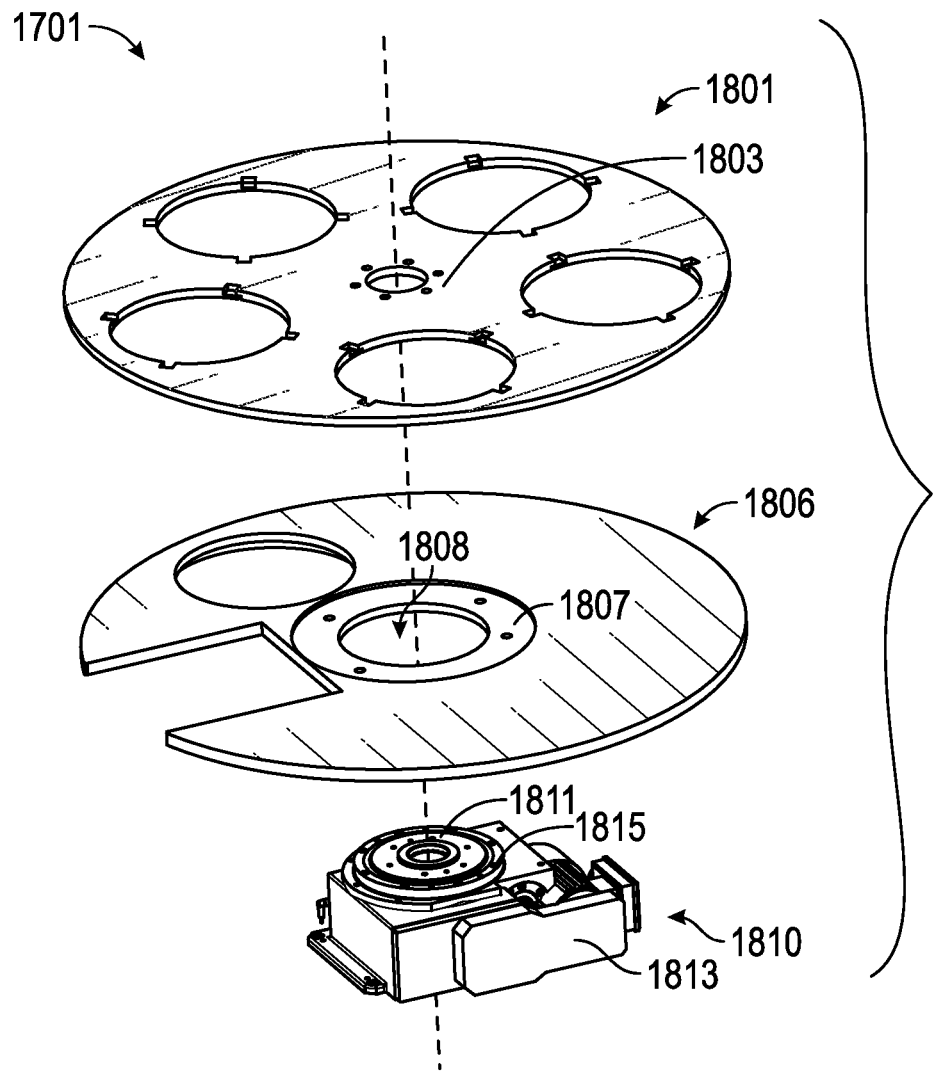
FIG. 28 is an exploded view of a dial system of the finish system.
Figure 29B:
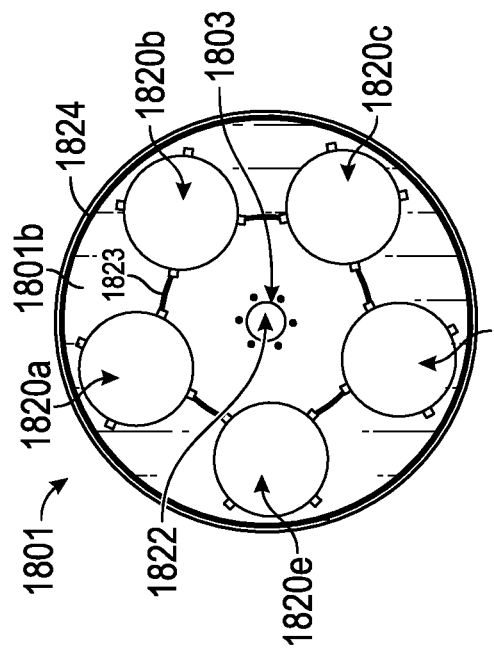
FIG. 29B shows a bottom view of the upper dial member.
Figure 29A:
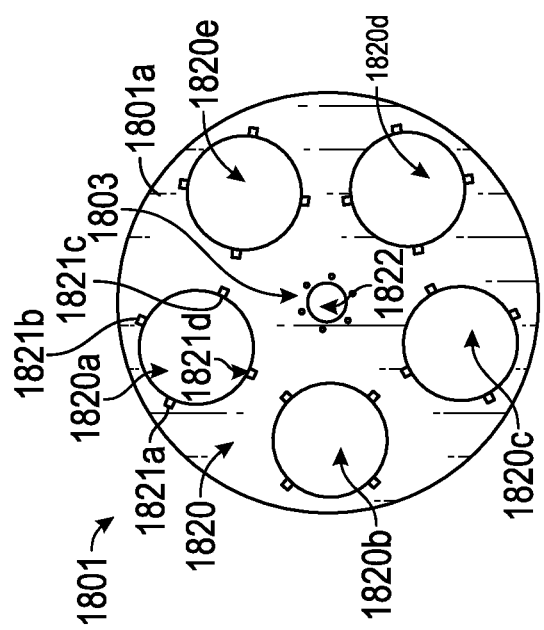
FIG. 29A shows a top view of an upper dial member.

As shown in FIGS. 28-29B, the upper dial member 1801 can be shaped as a flat disc. The upper dial member 1801 can include an upper surface 1801a and a lower surface 1801b. An outer periphery of the upper dial member 1801 can be circular. An inner portion of the upper dial member can include a central mount 1803. The central mount 1803 can include a central aperture 1822 and/or one or more apertures for receiving mechanical fasteners.

The upper dial member 1801 can include one or more openings 1820. The openings 1820 can include openings 1820a-e. The openings 1820 can be spaced at even intervals around the periphery of the upper dial member 1801. The openings 1820 can extend all the way through the upper dial member 1801. The openings 1820 can have a circular shape. Each of the openings 1820 can have the same diameter shape. The diameter can be based on the size of the pizzas processed using the finish dial 1700. The number of openings can correspond to the number of stations of the finish dial 1700.

The openings 1820 can each include a plurality of cutout portions 1821 in the periphery of the circular shapes. Each of the openings 1820 can include cutout portions 1821a-d. The cutout portions 1821 can extend from the upper surface 1801a to the lower surface 1801b. In other implementations, the cutout portions 1821 can extend only partially through the upper surface 1801a of the upper dial member 1801. The cutout portions 1821 can be located around an outer periphery of each of the openings 1820. The cutout portions 1821 can be located at evenly spaced intervals around the openings 1820.

The lower surface 1801b can include a first groove 1823. The first groove 1823 can extend partially into the lower surface 1801b of the upper dial member 1801. The first groove 1823 can be located between the central mount 1803 and an outer circumferential edge of the upper dial member 1801. The lower surface 1801b can include a second groove 1824. The second groove 1824 can extend partially into lower surface 1801b of the upper dial member 1801. The second groove 1824 can be located at or adjacent to outer circumferential edge of the upper dial member 1801. The first and/or second grooves 1823, 1824 can be configured for receiving one or more bearings therein. The first groove 1823 can extend through one or more of the openings 1820.

Figure 30B:
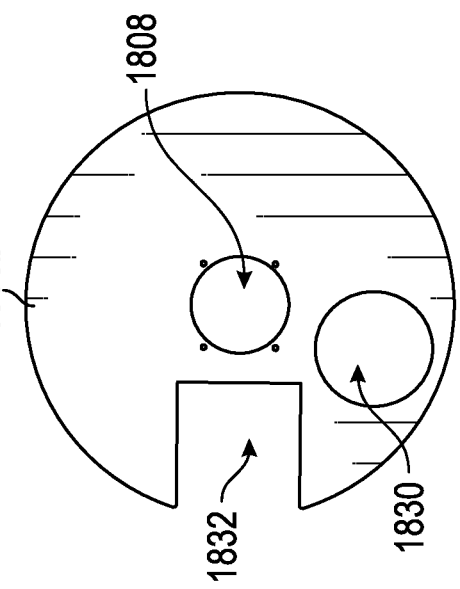
FIG. 30B shows a bottom view of the lower dial member.
Figure 30A:
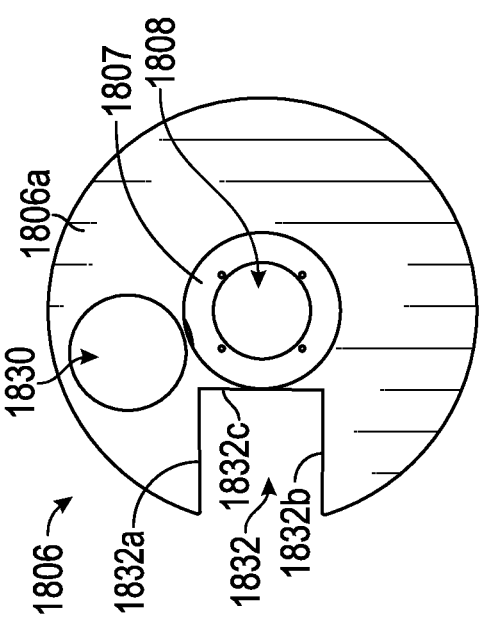
FIG. 30A shows a top view of a lower dial member.

As shown in FIGS. 28 and 30A-30B, the lower dial member 1806 can be shaped as a flat disc. The lower dial member 1806 can include an upper surface 1806a and a lower surface 1806b. The upper surface 1806a can be generally planar. The lower surface 1806b can be generally planar. An outer periphery of the lower dial member 1806 can be circular. The diameters of the upper and lower dial members 1801, 1806 can be equivalent. The lower dial member 1806 can include a recessed portion 1807. The recessed portion 1807 can be centered on the lower dial member 1806. The recessed portion 1807 can include a surface lower than an upper surface of the lower dial member 1806. The lower dial member 1806 can include a central aperture 1808. The recessed portion 1807 can include one or more apertures for receiving mechanical fasteners. The apertures can be spaced around the central aperture 1808, such as within the recessed portion 1807.

The lower dial member 1806 can include a slot 1832. The slot 1832 can be located at the ring removal station 1705. The slot 1832 can include a cutout region of the outer circumferential periphery of the lower dial member 1806. The slot 1832 can include straight sides 1832a, 1832b disposed opposite each other and separated by the third straight side 1832c. The first and seconds straight sides 1832a, 1832b can be perpendicular with the third straight side 1832c.

The lower dial member 1806 can include an opening 1830. The opening 1830 can be located at the boxing station 1755. The opening 1830 can extend all the way through the lower dial member 1806 from the upper surface 1806a to the lower surface 1806b.

The rotary dial 1701 can include the rotational assembly 1810. The rotational assembly 1810 can include a fixed support 1815 and/or a rotary support 1811. The rotary support 1811 can be coupled with a motor of the rotational assembly 1810 and/or a transmission 1813. The rotary support 1811 can include an upper planar member. The upper planar member can include a plurality of apertures for receiving mechanical fasteners. The rotary support 1811 can include a central shaft.

The fixed support 1815 can be coupled with a housing of the rotational assembly 1810. The fixed support 1815 can be disposed around and/or below the rotary support 1811. The fixed support 1815 can include an upper planar surface. The upper planar surface can include one or more apertures for receiving mechanical fasteners. The apertures can be disposed around a circumference of the upper planar member. The lower dial member 1806 can be coupled with the fixed support 1815.

In an assembled configuration, the upper dial member 1801 can be mounted on the rotary support 1811. The shaft can be received within the central aperture 1822 of the central mount 1803. One or more fasteners can couple the upper dial member 1801 with the rotary support 1811 using the apertures provided. The lower dial member 1806 can be coupled with the fixed support 1815. The central aperture 1808 can be disposed around the rotary support 1811. One or more fasteners can couple the lower dial member 1808b with the fixed support 1815 using the apertures provided. The upper dial member 1801 can rest on the lower dial member 1806. The first and/or second grooves 1823, 1824 can include therein bearings for supporting rotation of the upper dial member 1801 with respect to the lower dial member 1806. The recessed portion 1807 can prevent interference between the fasteners and the upper dial member 1801.

In operation the upper dial member 1801 can be rotatable with respect to the lower dial member 1806. The openings 1820 can rotate sequentially over the opening 1830 and the slot 1832 in the lower dial member 1806. In certain implementations, the upper surface 1806a on the lower dial member 1806 can include a coating. The coating can include a polymer, metal or other resilient substance. The coating can function as a cutting surface.

The spacing between the lower surface 1801b and the upper surface 1801a can be between the range of 0.0 inches to 0.125 inches. This tight fit can facilitate the transport pizzas contained in the openings 1820 across the upper surface during rotation of the upper dial member 1801. The rotation of the upper dial member 1801 can advance cooked pizzas through the stations of the finish dial 1700.

In an alternative embodiment, the finish dial can advance linearly between stations. For example, an upper member including an opening can be slidable over a lower member to move a pizza between stations.

FIG. 31A-31D shows a lift 1900. The lift 1900 can comprise a movable pizza support. The lift 1900 can be used at the ring removal station 1705. The lift 1900 can include a lift surface 1905. The lift surface 1905 can include a generally planar portion. The lift surface 1905 can be mounted on a frame 1910. The frame 1910 can include an upper rim 1909. The upper rim 1909 can extend around three sides of the lift surface 1905. A front side 1908 of the frame 1910 can be open to the lift surface 1905. The frame 1910 can support the lift surface 1905. The lift surface 1905 and/or the upper rim 1909 can be generally rectangular or square shaped corresponding to the size and shape of the two-piece pizza pan 400. The upper rim 1909 can extend above the lift surface 1905.

The frame 1910 can be coupled with one or more lift actuators 1920. The lift actuators 1920 can include lift actuators 1920a-d spaced around a periphery of the frame 1910. The lift actuators 1920 can be aligned at corners of the lift surface 1905. Each of the lift actuators 1920 can include a shaft 1925 and a cylinder 1924. The cylinder 1924 can be an electric or pneumatic cylinder for extending or retracting the shaft 1925. A tip 1926 of the shaft 1925 can include a pointed end. The tip 1926 can also include a support member 1927. The support member 1927 can form a support surface adjacent the tip 1926. The lift actuators 1920 can be coupled with the frame 1910. The shafts 1925 can be extendible through the frame 1910.

Figure 31C:
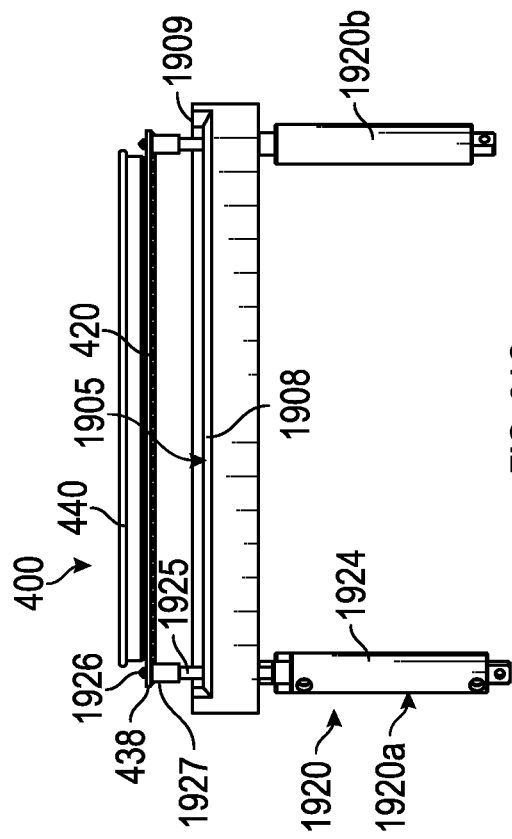
FIG. 31C shows the lift system with a pizza pan in a raised configuration.
Figure 31D:
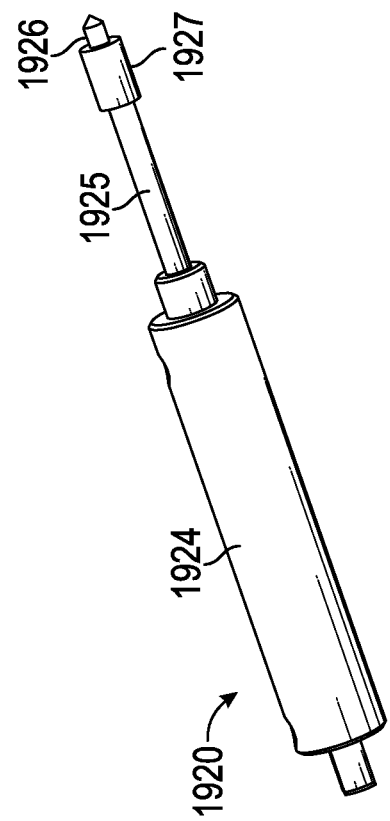
FIG. 31D shows detail view of a lift cylinder of the lift system.
Figure 31A:
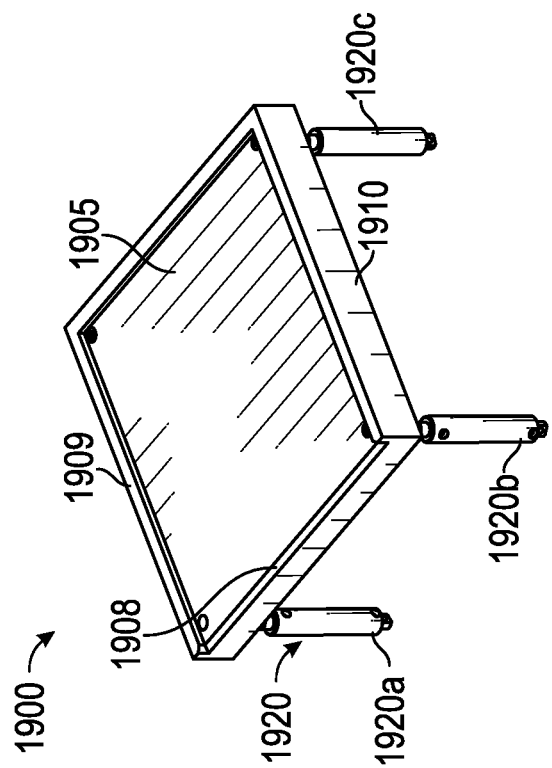
FIG. 31A is a perspective view of a lift system of the finish system.
Figure 31B:
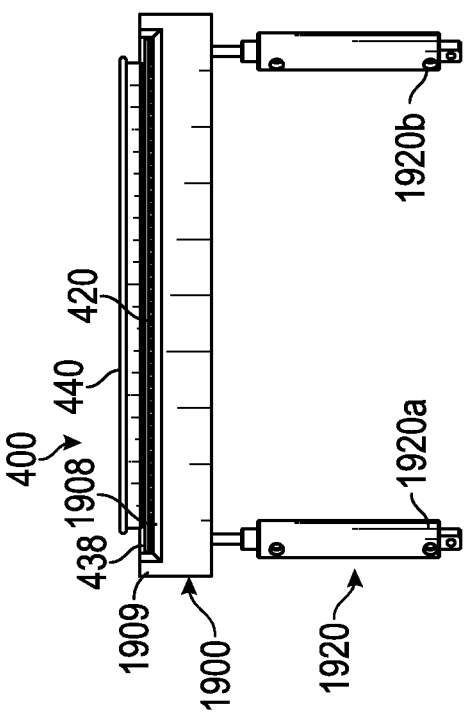
FIG. 31B shows the lift system with a pizza pan in a lowered configuration.

As shown in FIGS. 31B-C, the two-piece pizza pan 400 can be slid into place on the lift surface 1905. Corners of the two-piece pizza pan 400 can be aligned with the tips 1926 of the lift actuators 1920. The corners of the pizza pan can include apertures that receive therein the tips 1926. The shaft tips 1926 can be aligned at the corners 438 of the two-piece pizza pan 400. A lower surface 420b of the base 420 of the two-piece pizza pan 400 can rest on the support member 1927. The lift actuators 1920 can lift the two-piece pizza pan 400 from the lift surface 1905 in a coordinated fashion. The lift actuators 1920 can maintain the two-piece pizza pan 400 in a level configuration. Alternatively, the lift actuators 1920 can lift a portion of the lift surface 1905 carrying the two-piece pizza pan 400. In another alternative, only a single lift actuator 1920 is operated to lift the two-piece pizza pan 400 in a level manner.

As shown further below, the lift 1900 can be used at the ring removal station 1705 of the finish dial 1700. The lift 1900 can be coupled with the lower dial member 1806. The lift 1900 can be received within and/or aligned with the slot 1832 of the lower dial member 1806.

Figure 32A:
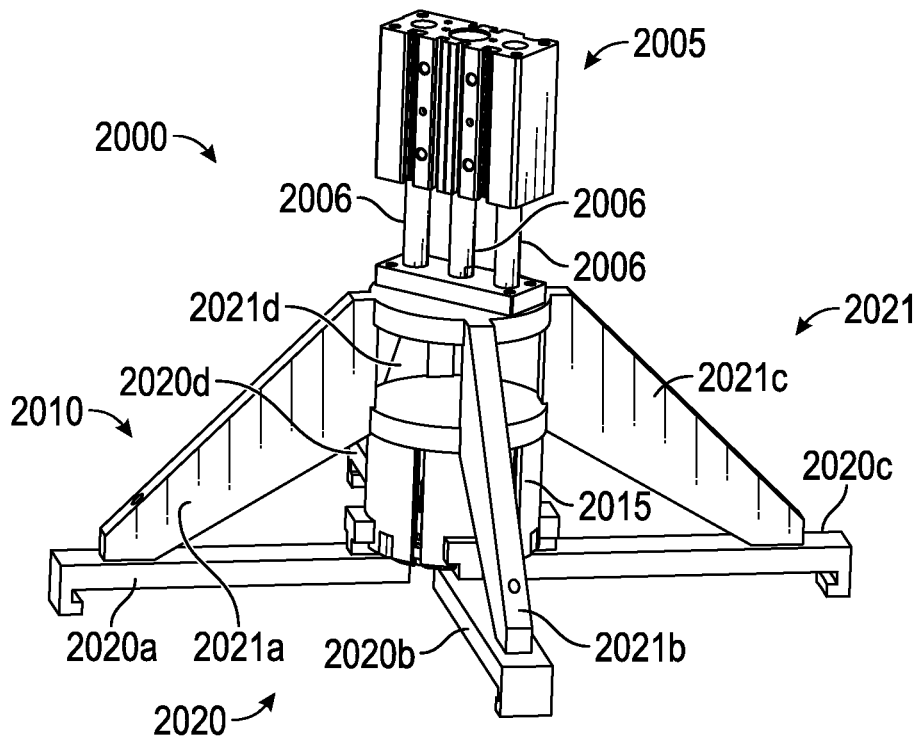
FIG. 32A is a perspective view of a ring removal system.
Figure 32B:
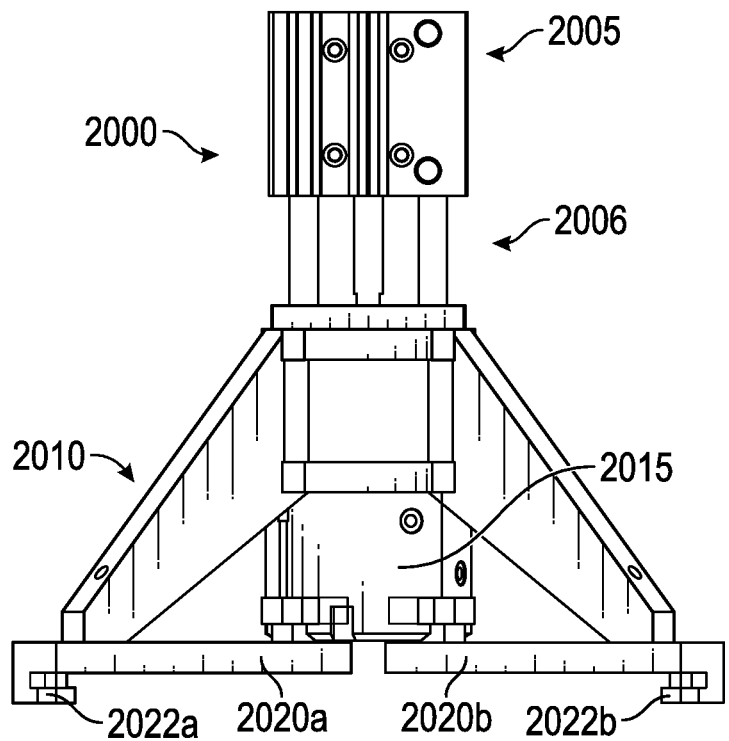
FIG. 32B is a side view of the ring removal system.

In FIG. 32A shows a lift actuator 2000, which can be an implementation of the pan removal component 157. The lift actuator 2000 can include an actuator 2005. The actuator 2005 can be coupled with one or more shafts 2006. The actuator 2005 can raise and lower the shafts 2006 (e.g., pneumatically).

The lift actuator 2000 can include one or more support wings 2021. The support wings 2021 can include support wings 2021a-2021d. The support wings 2021 can extend radially outward from a central portion of the lift actuator 2000. The support wings 2021 can be coupled with a central actuator 2015. The central actuator 2015 can be located along a central axis of the lift actuator 2000.

Figure 32C:
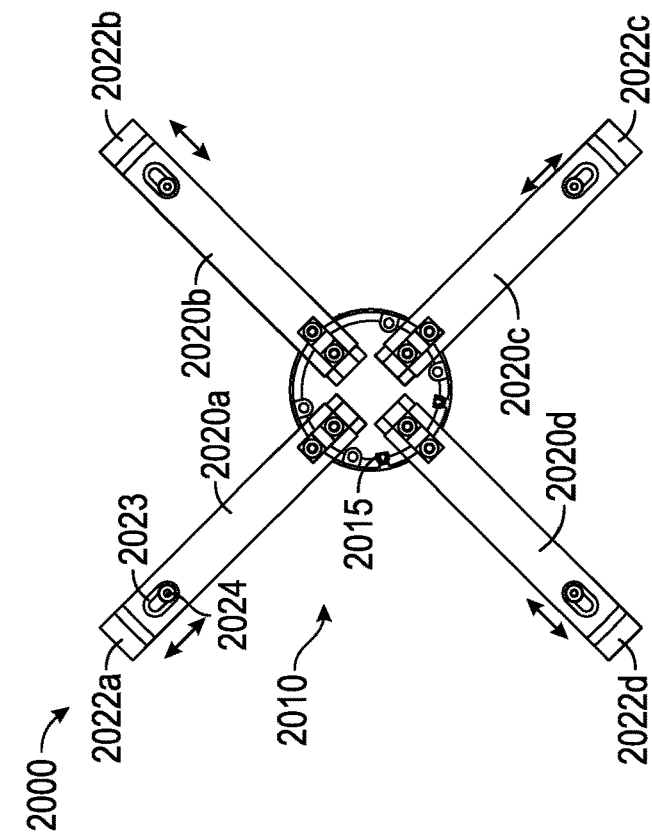
FIG. 32C is a bottom view of the ring removal system.

The lift actuator 2000 can comprise a plurality of grip members 2020. The grip members 2020a-2020b can be slideably coupled with respective support wings 2021a-2021d. An inner end of each of the grip members 2020 can be coupled with the central actuator 2015. Outer ends of the lift actuators 2000 can be coupled with the support wings 2021 via a sliding arrangement. The sliding arrangement can include a slot 2023 and a pin 2024. The pin 2024 can be disposed within the slot 2023 and coupled with an end of the support wings 2021. FIG. 32C shows the direction of motion of the grip members 2020, as operated by the central actuator 2015.

The grip members 2020 can each include an outer shelf 2022. The outer shelves 2022 can include the outer shelves 2022a-2022b. The outer shelves 2022 can include a generally horizontal shelf portion. The generally horizontal shelf portion can be spaced by a lateral portion away from the outer ends of the grip members 2020.

In operation, the lift actuator 2000 can be actuated downward along the shafts or by extension of the shafts 2006. The grip members 2020 can be retracted radially inwardly using the central actuator 2015. The grip members 2020 can then be raised using the actuator 2005 by retraction of the shafts 2006. In this manner the removable ring 440 of the two-piece pizza pan 400 can be removed from the base 420, as described further below.

Figure 33A:
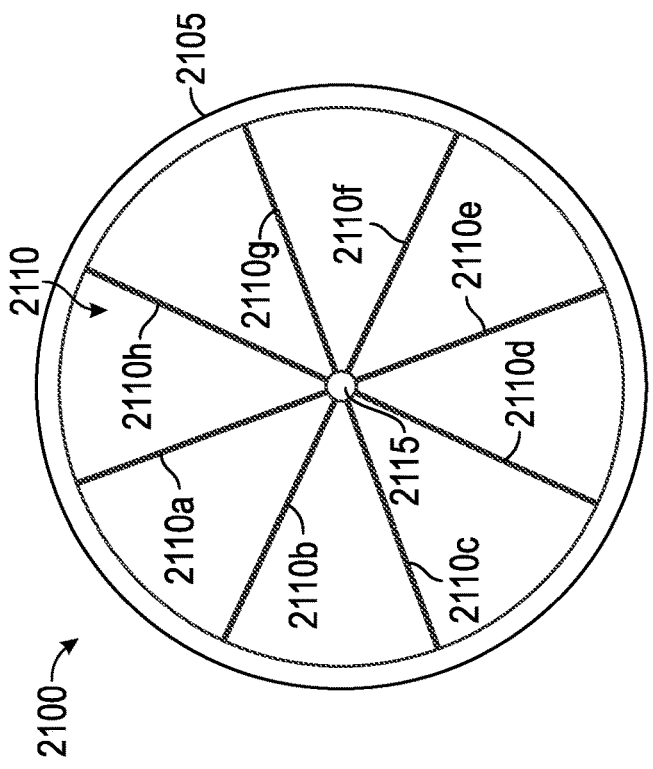
FIG. 33A shows a top view of a slicer.
Figure 33B:
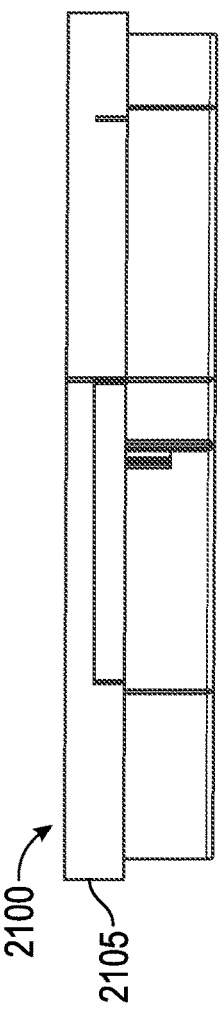
FIG. 33B shows a side view of the slicer.

FIGS. 33A-B show a pizza slicer 2100. The pizza slicer 2100 can be a portion of the slicing stations 1710, 1715. The pizza slicer 2100 can include an outer rim 2105. The outer rim 2105 can extend around an outer periphery on the pizza slicer 2100. A pizza slicer 2100 can include a plurality of blades 2110. The blades 2110 can include blades 2110a-2110h. The blades 2110 can be arranged to extend radially from a central post 2115. The central post 2115 can be coupled with an actuator for raising and lowering the pizza slicer 2100 to cut pizza located beneath. The number and spacing of the blades 2110 can depend on the type of pizza and the desired size of the slices thereof. Alternatively, the slicing stations 1710, 1715 can include an actuator configured to be adjustable to slice different sizes of slices (e.g., a single actuatable blade).

FIG. 34A-35C show operation of the finish dial 1700. As shown further in FIG. 34A, the cooked pizza on the two-piece pizza pan 400 can be delivered using a pan drive system 600 to the ring removal station 1705. The ring removal station 1705 can include the lift 1900 and the slot 1832. The two-piece pizza pan 400 can be advanced onto the lift surface 1905, as shown in FIG. 34B.

Figure 34A:
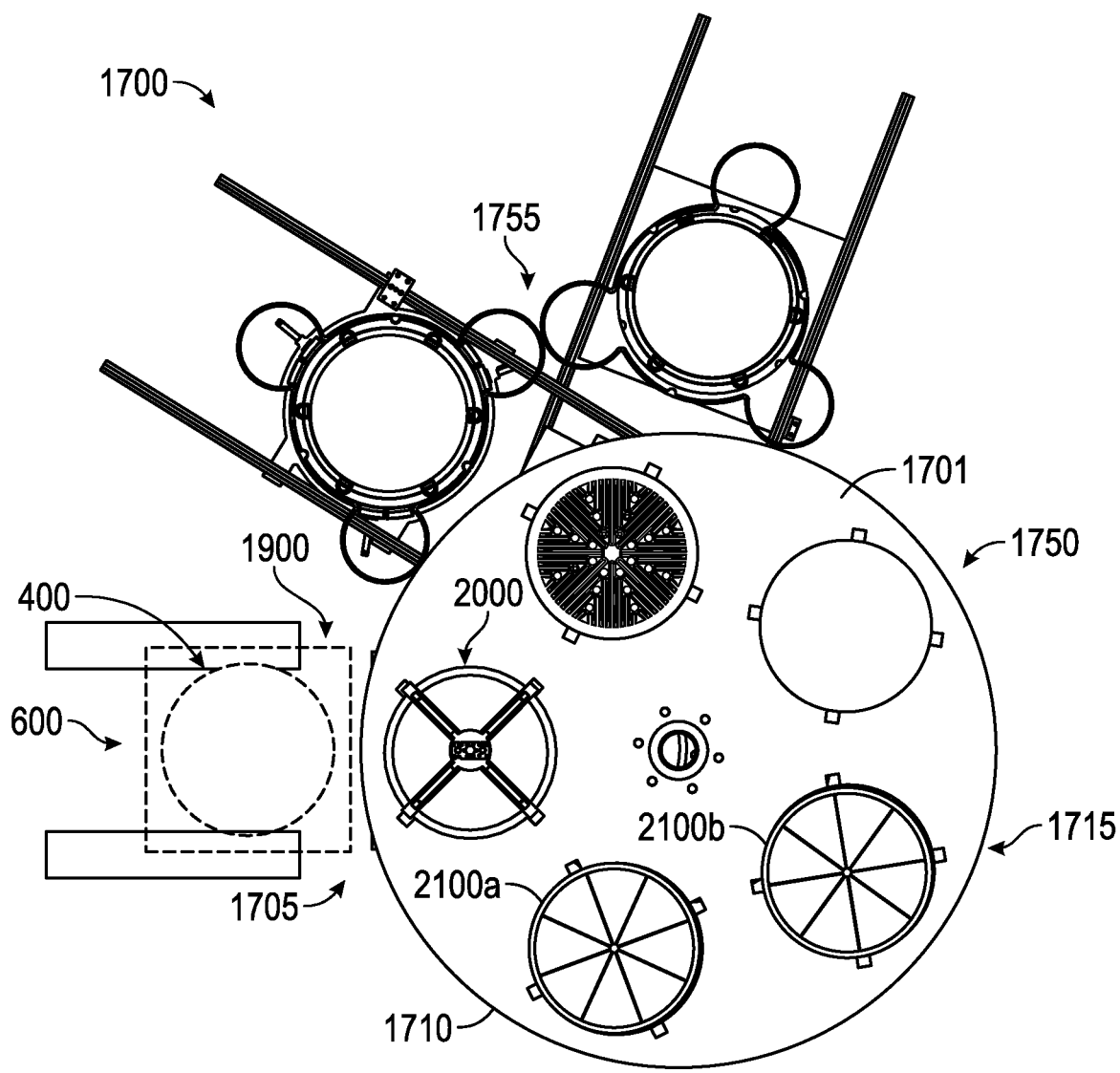
FIG. 34A shows a top view of the finish system.
Figure 34B:
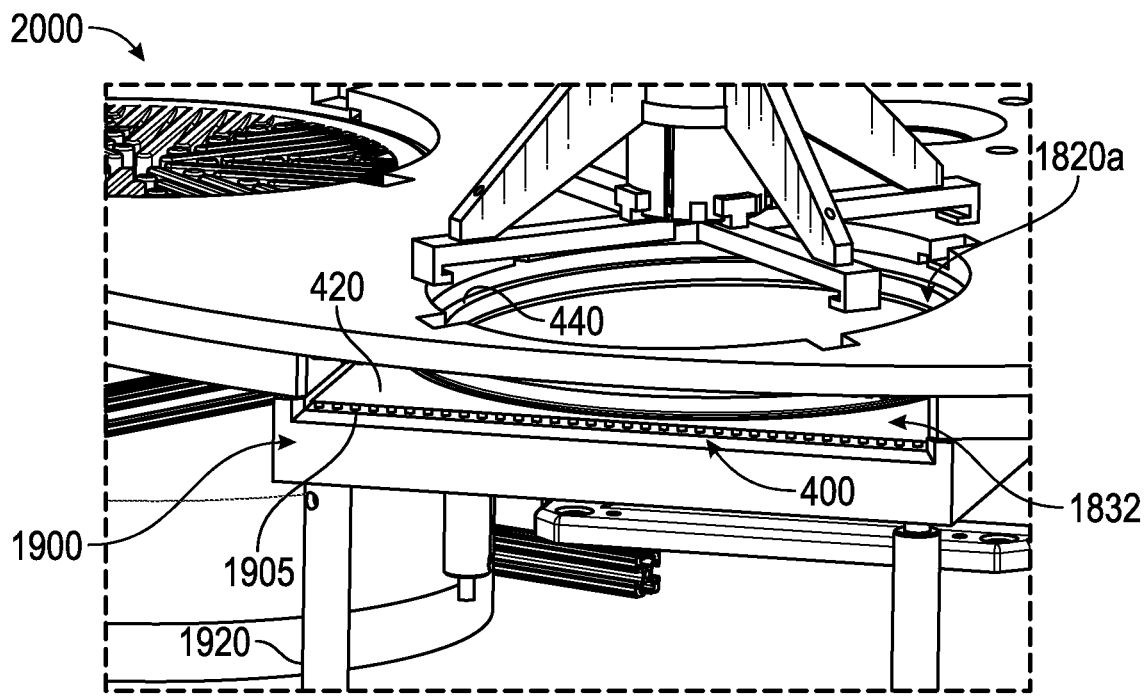
FIGS. 34B-C show lifting a pizza pan into position at a ring removal station.
Figure 34C:
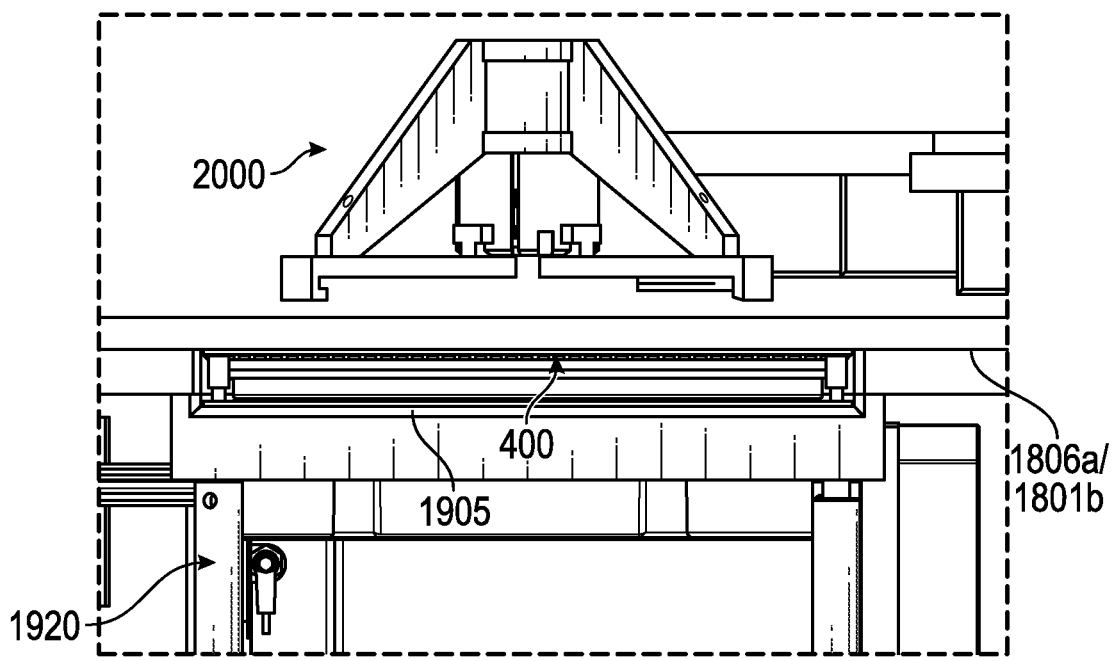
Figure 36:
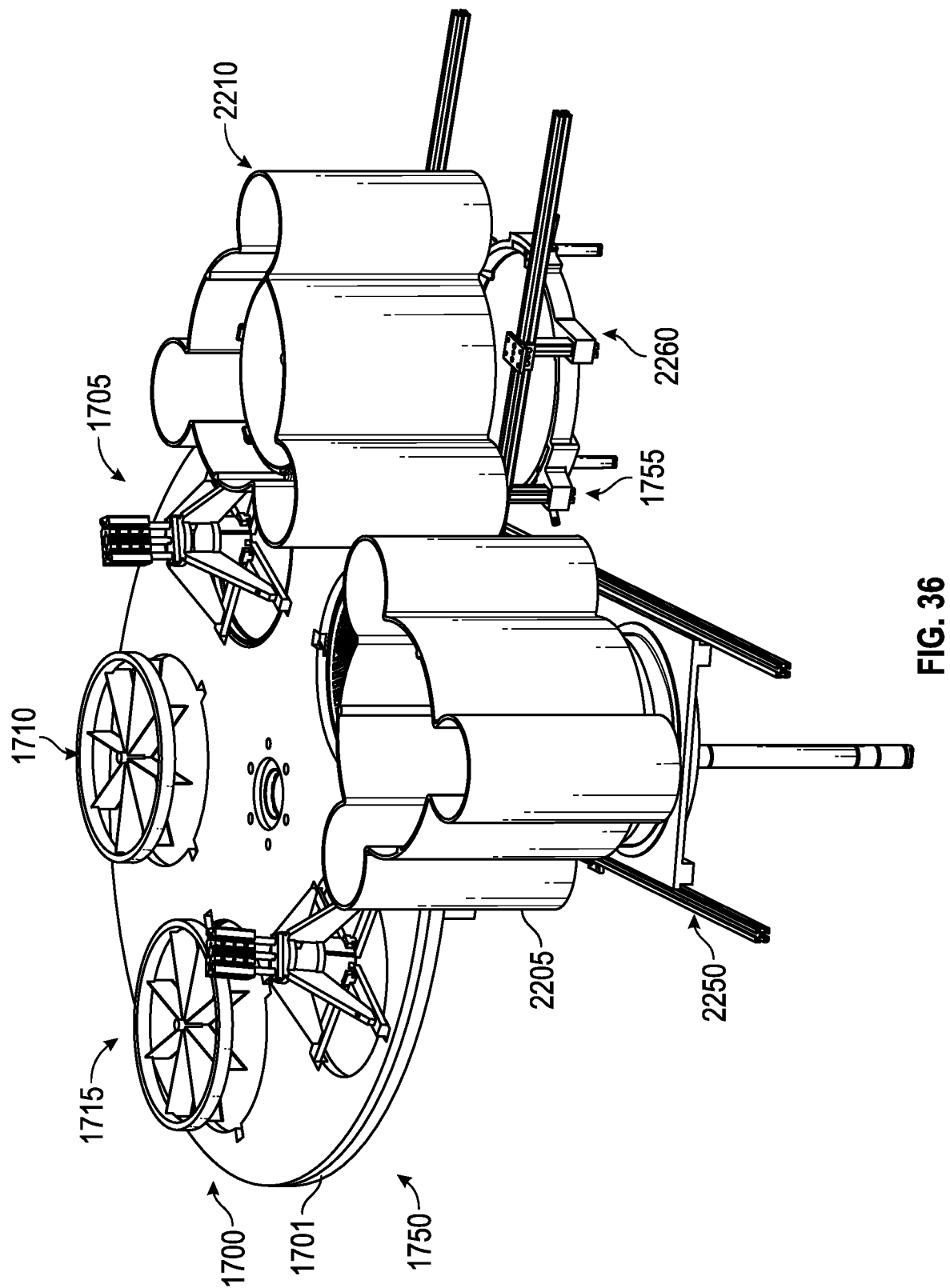
FIG. 36 shows a boxing station of the finish system.

In FIG. 34C the lift actuators 1920 can lift the two-piece pizza pan 400 upwards from the lift surface 1905. The upper surface 420a of the base 420 can be lifted into alignment with the upper surface 1806a of the lower dial member 1806. The removable ring 440 can be aligned with the openings 1820 of the upper dial member 1801. The openings 1820 can be sized to receive the removable ring 1440. The ring removal actuator 2000 can be aligned with the openings 1820.

In FIG. 35A, the grip member 2020 of the ring removal actuator 2000 are extend outwardly by the central actuator 2015. The grip members 2020 are lowered towards the upper dial member 1801. The outer ends of the grip members 2020 can be received within the cutout portions 1821 of the openings 1820. The cutout portions 1821 can provide space to allow the ends of the grip members 2020 to be placed around the upper rim 441 of the removable ring 440.

In FIG. 35B, the grip members 2020 of the ring removal actuator 2000 are retracted inwardly by the central actuator 2015 to grip the removable ring 440. The removable ring 440 is then removed from the base 420 by retracting the actuator 2005.

After the removable ring 440 is removed from the base 420, the base 420 can be level with the upper surface 1806a. The upper dial member 1801 can then be rotated with the pizza located within the openings 1820. The inner sides of the openings 1820 can engage with the pizza during the rotation. The pizza can be slid off of the base 420 and moved onto the upper surface 1806a. The rotation can move the pizza towards the next adjacent station on the finish dial 1700.

After the pizza is removed, the lift 1900 can lower the base 420. The base 420 can then be ejected from the lift 1900. The lift 1900 can include another actuator (not shown) for pushing the base 420 off of the lift surface 1905. Optionally, the removable ring 440 can also be placed back onto the base 420 by the ring removal actuator 2000 and the two-piece pizza pan 400 can be ejected from the lift 1900. The two-piece pizza pan 400 can be returned back into the system such as by using the pan drive system 600.

From the ring removal station 1705, the cooked pizza can be slid by rotation of the upper dial member 1801 to the first slicing station 1710. The first slicing station 1710 can include a first slicer 2100A. At the first slicing station 1710, the first slicer 2100A can be actuated downwards to slice the pizza. The pizza can be sliced against the upper surface 1806a. The upper surface 1806a can include a replaceable component or coating (e.g., plastic) to prevent undue dulling of the first slicer 2100A.

From the first slicing station 1710, the pizza can be moved to the second slicing station 1715 (including a second slicer 2100B) by further rotation of the upper dial member 1801. The pizza can optionally be sliced at either the first or second slicing stations 1710, 1715. The first and second slicing stations 1710, 1715 can be designed for different pizzas or pizza configurations (e.g., number or size or slice, vegetarian v. non-vegetarian pizzas). Keeping the first and second slicing stations 1710, 1715 separate can be beneficial to prevent cross-contamination of pizzas by using the same slicing mechanism.

From the second slicing station 1715, further rotation of the upper dial member 1801 can transport the pizza to the glaze station 1750. The glaze station 1750 can include one or more sauce dispensers, similar to the sauce dispenser station 1000 described above or another type. At the glaze station 1750, the pizza can receive one or more glazes or sauces sprayed over the top of the cooked pizza.

From the glaze station 1750, the upper dial member 1801 can rotate the pizza to the boxing station 1755. The boxing station 1755 can operate to place the finished pizza into a container for delivery to a customer.

The boxing station 1755 can include a box bottom delivery system 2250. The box bottom delivery system 2250 can operate to place a box bottom beneath a pizza. The box bottom delivery system 2250 can include a box bottom hopper 2205. The box bottom hopper 2205 can distribute a box bottom.

The boxing station 1755 can include a box lid delivery system 2260. The box lid delivery system 2260 can operate to place a box lid on a box bottom with a pizza contained therein. The box lid delivery system 2260 can include a lid hopper 2210. The lid hopper 2210 can dispense a box lid for assembly with the box bottom about the finished pizza.

FIGS. 37A-C show the box bottom hopper 2205 (which can include components similar to the box lid hopper 2210). The box bottom hopper 2205 can include a central region

2206. The central region 2206 can include an outer cylindrical wall. The outer cylindrical wall can include an outer periphery that is larger than the size of box bottoms 2400 contained therein. The central region can include one or more inner protrusions 2208a-c. The box lids 2300 can be stacked together within the central region 2206. The lid hopper 2210 can comprise one or more outer portions 2207a-c. The outer portions 2207 can house a dispensing mechanism 2209 for dispensing one or more of the box bottoms 2400.

The dispensing mechanism 2209 can include variable pitch screws 2209a-c. The variable pitch screws 2209a-c can be linked together through a common drive system. The variable pitch screws 2209a-c can rotate at the same rate. The variable pitch screws 2209a-c can be housed in the respective outer portions 2207a-c. The variable pitch screws 2209 can each include a thread 2211 having a pitch diameter. The pitch diameter can be variable between an upper portion 2211a and a lower portion 2211b of the screws 2209a-c.

A stack of box bottoms 2400 can be received between the variable pitch screws 2209a-c. The threads of the variable pitch screws 2209a-c can engage with the box bottoms. As the variable pitch screws 2209a-c rotate, the box bottoms can be lowered towards the lower portion 2211b until the lowermost box bottom is dispensed. The rotation can be continued, at intervals to distribute the box bottoms. The screw pitch of the lower portion 2211b can be a minimum stack height for the dispensing mechanism 2209 to function properly.

Figure 38A:
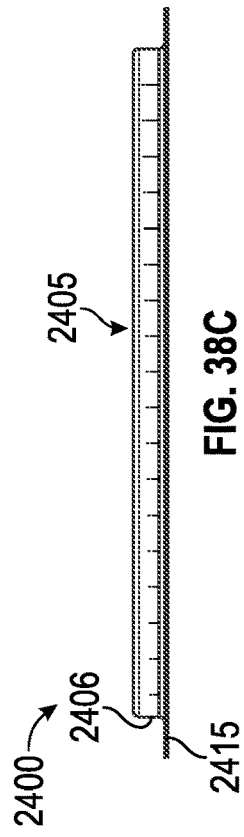
FIG. 38A shows a side view of a box lid.
Figure 38B:
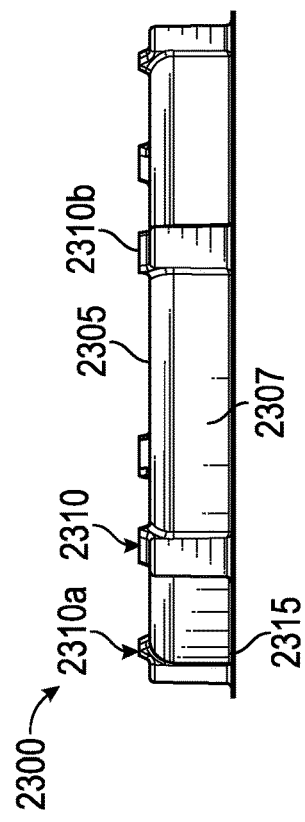
FIG. 38B shows a top view of the box lid.

FIGS. 38A-B show the box lid 2300. The box lid 2300 can be formed out of a wood pulp material (e.g., paper), plastic or other suitable material. The box lid 2300 can include an upper domed portion 2305. The upper domed portion 2305 can include an outer circumferential wall 2307. A lower flange 2315 can be coupled with a lower edge of the wall 2307. The lower flange 2315 can extend around an outer periphery of the central dome 2305. The lower flange 2315 can extend radially outwardly. The lower flange 2315 can be perpendicular to a wall 2307 of the upper domed portion 2305. The lower flange 2315 can include one or more recesses 2316. The recesses 2316 can include recesses 2316a-c. The recesses 2316 can be spaced at intervals around the lower flange 2315. The box lid 2300 can comprise one or more reinforcement ribs 2310. The reinforcement ribs 2310 can include outwardly protruding ribs 2310a-2310f. The reinforcement ribs 2310 can be spaced at intervals around an outer circumference of the upper domed portion 2305. The reinforcement ribs 2310 can be on the wall 2307, the lower flange 2315, and/or the upper domed portion 2305. The reinforcement ribs on the lid can extend upward to engage with the bottom of a pizza stacked on top of the box to make carrying multiple pizzas easier.

Figure 38C:
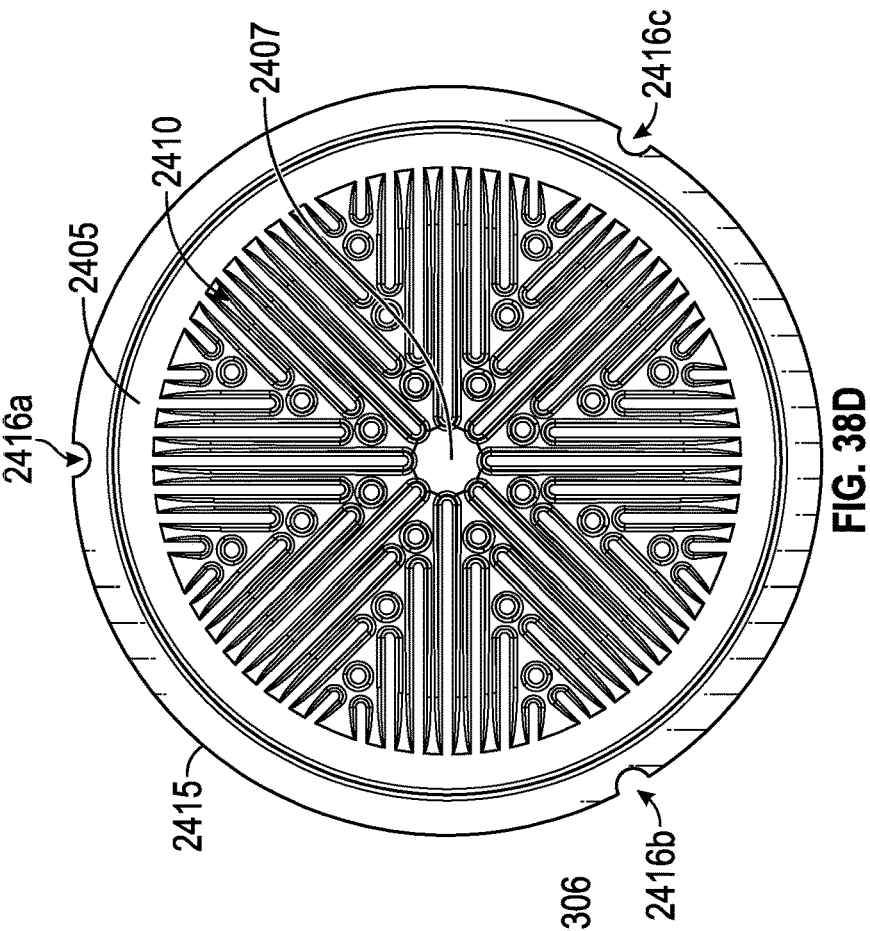
FIG. 38C shows a side view of a box bottom.
Figure 38D:
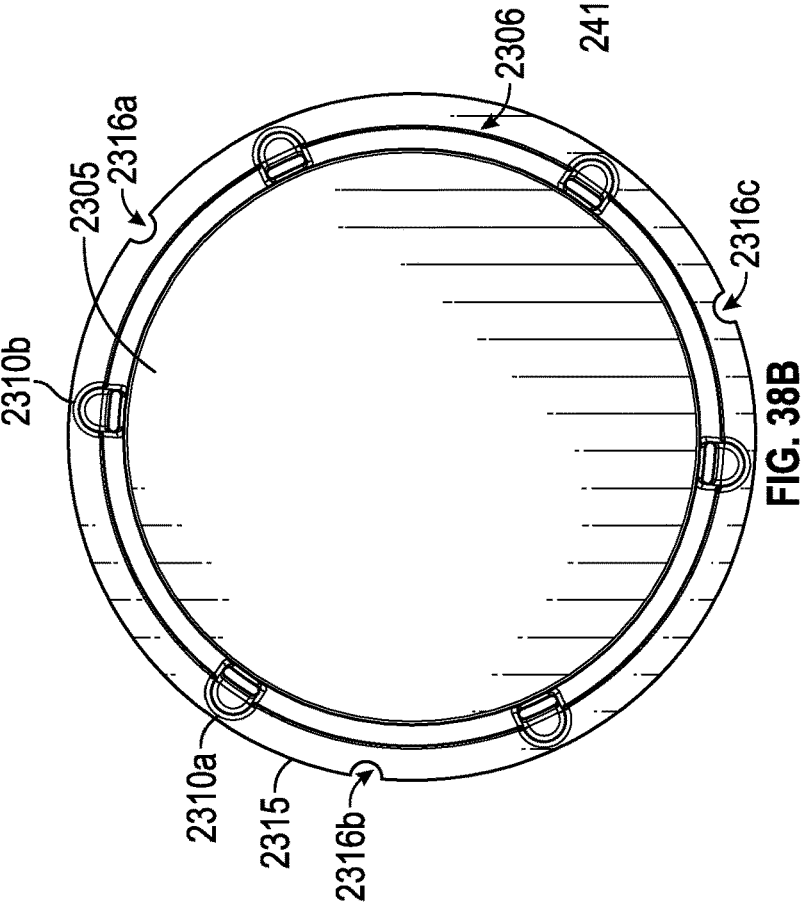
FIG. 38D shows a top view of the box bottom.

FIGS. 38C-D show the box bottom 2400. The box bottom 2400 can be formed out of a wood pulp material (e.g., paper), plastic or other suitable material. The box bottom 2400 can be generally disc shaped. The box bottom 2400 can include a support surface 2405. The support surface 2405 can include an upper surface. The upper surface of the support surface 2405 can comprise a plurality of ridges and grooves. The ridges and grooves can facilitate the passage of air beneath a pizza when placed on the support surface 2405. The ridges and grooves can facilitate cooling of the pizza. The ridges and grooves can prevent the lower portion of the cooked dough from getting soggy. The support surface 2405 can include a support 2407. The support 2407 can be centered on the support surface 2405. The support 2407 can extend level with the lower flange 2415. The ridges and grooves of the support surface 2405 can coupled at a radially inner end with the support 2407. The ridges and grooves of the support surface 2405 can taper radially outwardly towards the sidewall 2406. Accordingly an underside of the support surface 2405 can be generally concave.

The support surface 2405 can include a sidewall 2406. The sidewall 2406 can extend around an outer periphery of the support surface 2405. A lower flange 2415 can be coupled with a lower end of the sidewall 2406. The lower flange 2415 can extend generally transversely to the sidewall 2406. The lower flange 2415 can include one or more recesses 2416. The recesses 2416 can include recesses 2416a-c. The recesses 2416 can be spaced at intervals around the lower flange 2415.

Figure 39A:
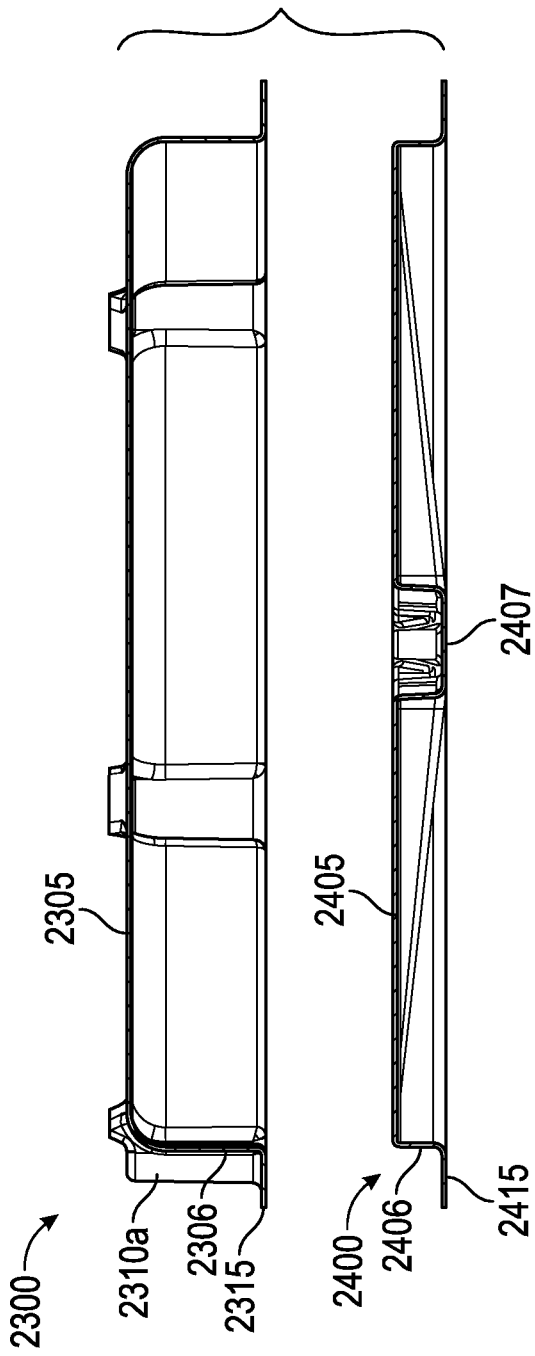
FIG. 39A shows a cross-sectional view of the box lid and the box bottom in a separated configuration.
Figure 39B:
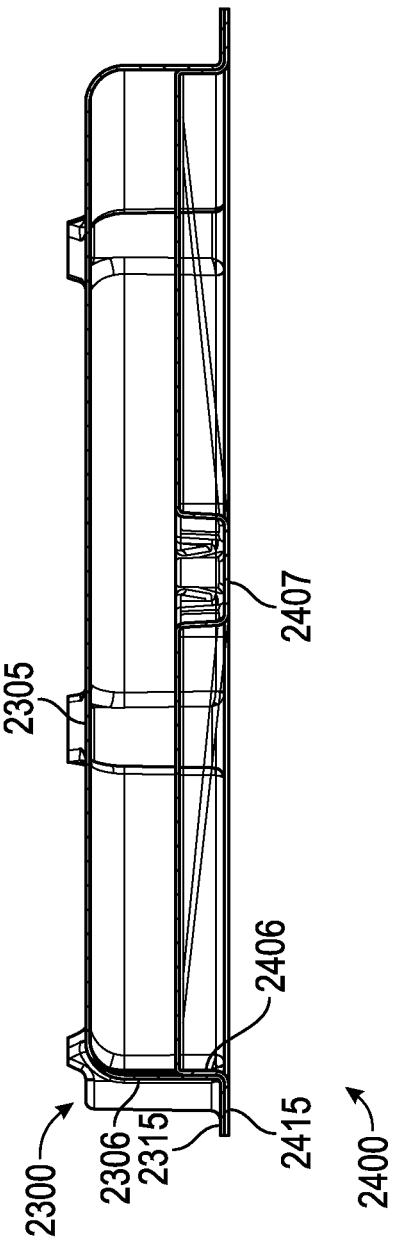
FIG. 39B shows a cross-sectional view of the box lid and the box bottom in an assembled configuration.

FIGS. 39A-B show assembly of the box lid 2300 with the box bottom 2400. The lower flange 2315 of the box lid 2300 can be assembled flush with the lower flange 2415 of the box bottom 2400. An inner portion of the sidewall 2306 of the box lid 2300 can abut the sidewall 2406 of the box bottom 2400. Diameters of the sidewall 2306 and the sidewall 2406 can be selected to provide an interference fit therebetween to coupled together the box bottom 2400 with the box lid 2300.

Figure 40:
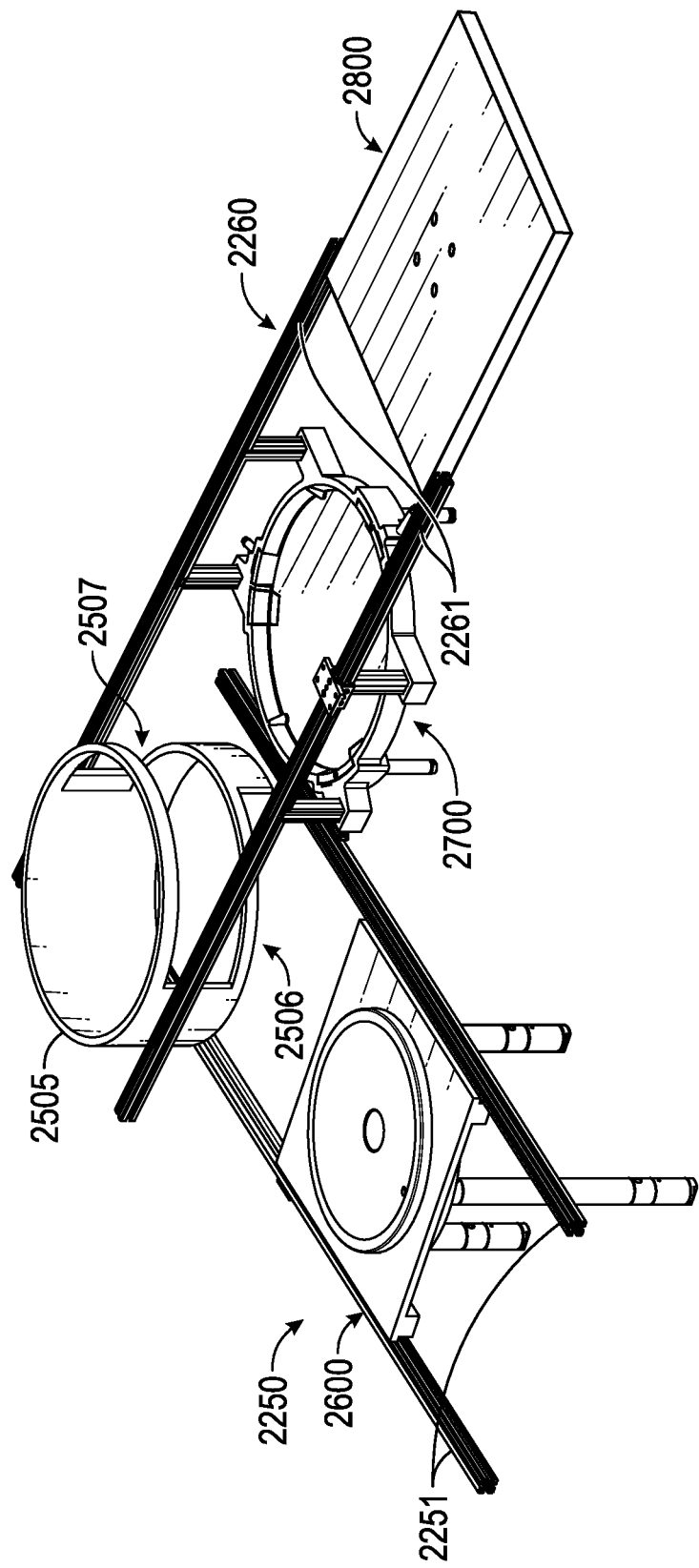
FIG. 40 shows a box lid positioning system and a box bottom positioning system of the boxing station.

FIG. 40 shows further detail of the boxing station 1755. The boxing station 1755 can include an alignment sleeve 2505. The alignment sleeve 2505 can include an upper rim that is mountable around the opening 1830 of the lower dial member 1806. The alignment sleeve 2505 can include a first slot 2506 and/or a second slot 2507. The box bottom delivery system 2250 can include an elevator (movable pizza support) 2600. The elevator 2600 can be movably mounted on pair of rails 2251. The rails 2251 can be aligned with the first slot 2506. The elevator 2600 can be moved into the alignment sleeve 2505 along the rails 2251 (e.g., through the first slot 2506).

The box lid delivery system 2260 can include a box lid catch 2700. The box lid catch 2700 can be mounted on rails 2261. The box lid delivery system 2260 can include a shuttle 2800. The shuttle 2800 can be movable along the rails 2261 or along another pair of rails (not shown). The rails 2261 can align with the box lid catch 2700 and/or the alignment sleeve 2505. The shuttle 2800 can be moved into the alignment sleeve 2505 along the rails 2261 (e.g., through the second slot 2507). The shuttle 2800 can be moved into alignment with the elevator 2600.

Figure 41A:
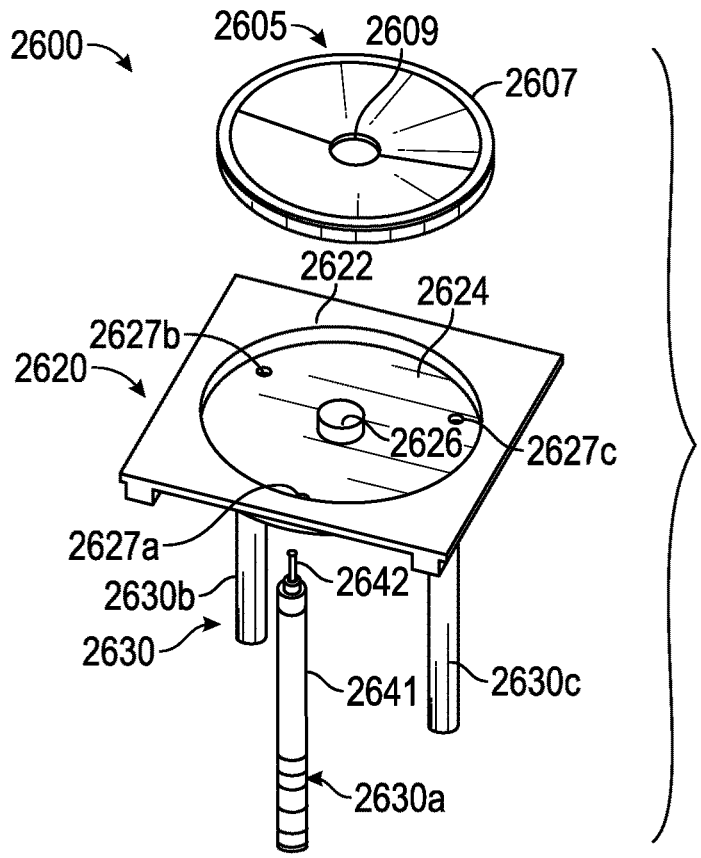
FIG. 41A shows an exploded view of an elevator of the box bottom positioning system.

FIG. 41A shows the elevator 2600. The elevator 2600 can include an elevator platform 2605. The elevator platform 2605 can include an outer rim 2607. The outer rim 2607 can be circular. The elevator platform 2605 can include a central aperture 2609. The central aperture 2609 can be located at a center of the outer rim 2607.

The elevator 2600 can include a base 2620. The base 2620 can include a central recess 2624. The central recess 2624 can be sized to receive the elevator platform 2605. The central recess 2624 can include a central member 2626. The central member 2626 can be aligned with the central aperture 2609 of the elevator platform 2605. One or more apertures 2627, such as apertures 2627a-c, can be disposed within the lower surface of the central recess 2624. The base 2620 can be coupled with the rails 2651. The base 2620 can be movable on the rails through a conveyance system (e.g., timing belts, linear actuators, worm drives, etc.).

Figure 41B:
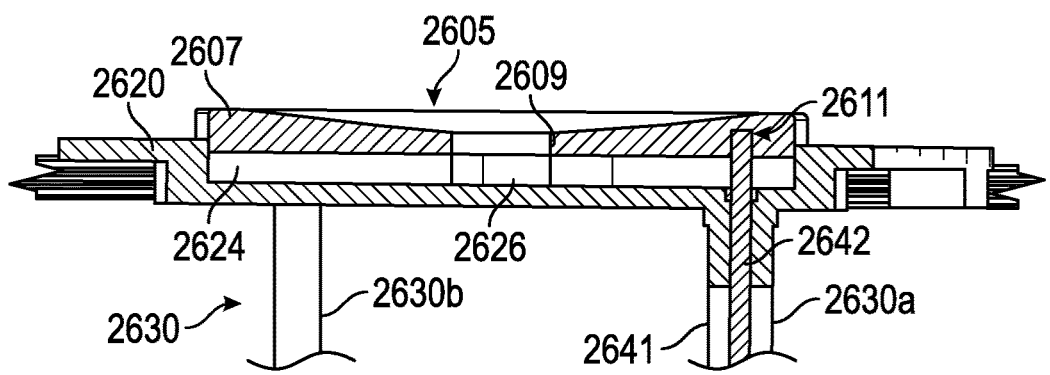
FIG. 41B shows a cross-sectional view of the elevator in a raised configuration.
Figure 41C:
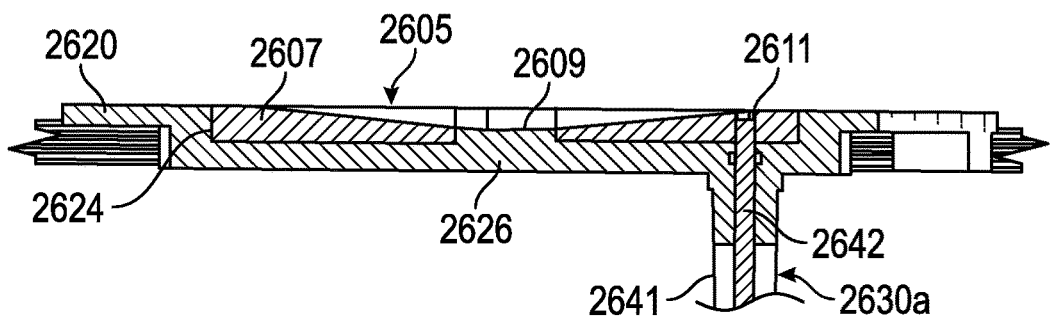
FIG. 41C shows a cross-sectional view of the elevator in a lowered configuration.
Figure 43A:
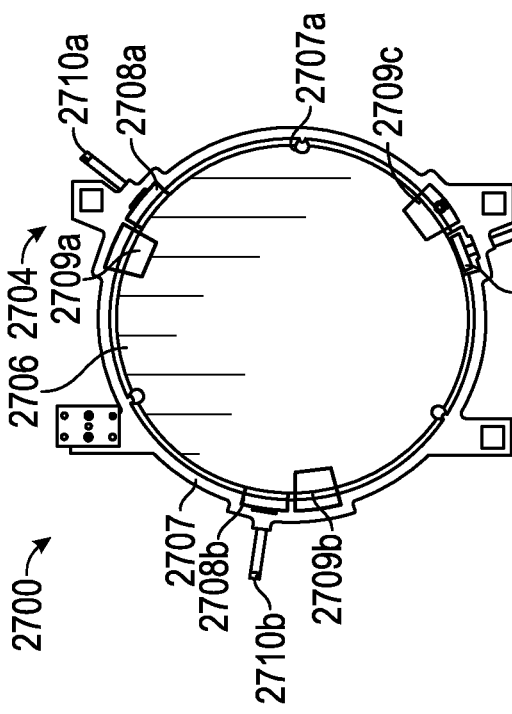
FIG. 43A shows a top view of the box lid catch tray.
Figure 43B:
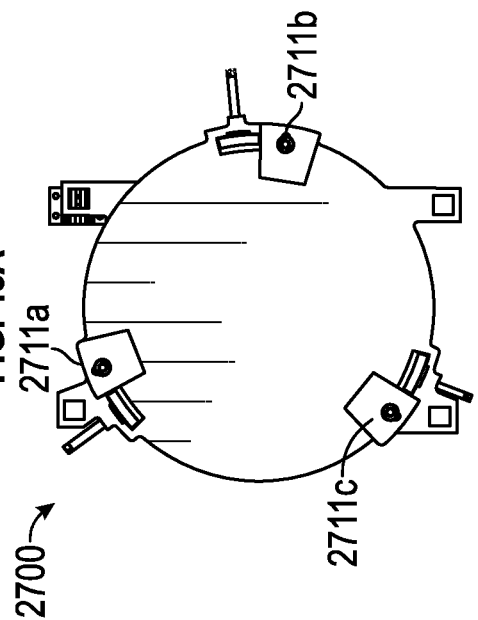
FIG. 43B shows a bottom view of the box lid catch tray.
Figure 42A:
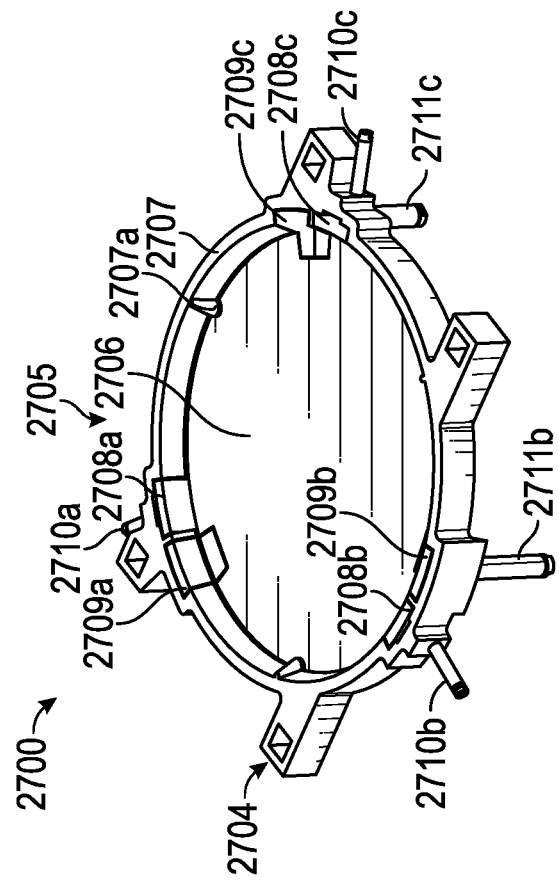
FIG. 42A shows a perspective view of a box lid catch tray of the box lid positioning system.
Figure 42B:
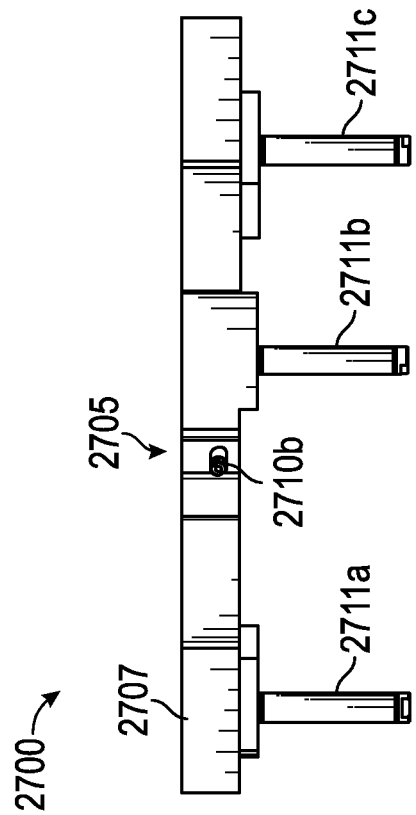
FIG. 42B shows a side view of the box lid catch tray.

The base 2620 can be coupled with one or more lift actuators 2630. The lift actuators 2630 can include lift actuators 2630a-c. The lift actuators 2630 can be mounted at intervals around a lower surface of the central recess 2624. The lift actuators 2630 can include shafts 2642 that are extendable from cylinders 2641. The shafts 2642 can be aligned with and extendable through the apertures 2627. The elevator platform 2605 can include one or more apertures 2611 therein. The lift actuators 2630 can engage with the apertures 2611. The lift actuators 2630 can extend and retract to lift and lower the elevator platform 2605. The shafts of the lift actuators 2630 can lift and lower in a coordinated manner to lift the elevator platform 2605 in a horizontal manner. The central member 2626 can help to maintain the centeredness of the elevator platform 2605 with respect to the base 2620 and the lift actuators 2630. FIG. 41B shows the elevator platform 2605 in a partially elevated manner and FIG. 41C shows the elevator platform 2605 lowered within the central recess 2624.

FIGS. 42A-43B show the box lid catch 2700. The box lid catch 2700 can include a catch surface 2706 for receiving a box lid from the lid hopper 2210. The catch surface 2706 can be surrounded by a rim 2707. The rim 2707 can have a diameter that is greater than the box lid. The rim 2707 can comprise one or more lift mechanisms 2709. The lift mechanisms 2709 can include lift mechanisms 2079a-c. The lift mechanisms 2709 can be paired with a respective lift actuator 2711. The lift actuators 2711 can include lift actuators 2711a-c. The lift mechanisms 2709 can each include a lower lift surface that is level with the catch surface 2706. A portion of the lift mechanisms 2709 can be built into the rim 2707. The lower lift surface can engage an underside of the box lid 2300 when placed on the catch surface 2706 for lifting the box lid 2300 (when actuated by the lift actuators 2711).

The rim 2707 can include centering mechanisms 2708. The centering mechanisms 2708 can include centering mechanisms 2708a-c. The centering mechanisms 2708 can extend radially inwardly from the rim 2707 to center the box lid 2300 on the catch surface 2706. A portion of the centering mechanisms 2708 can be built into the rim 2707. The centered placement of the box lid can be important for positioning the box lid 2300 on the box bottom 2400, as described further below. Each of the centering mechanisms can be coupled with an actuator 2710. The actuators 2710 can include actuators 2710a-c.

Figure 44A:
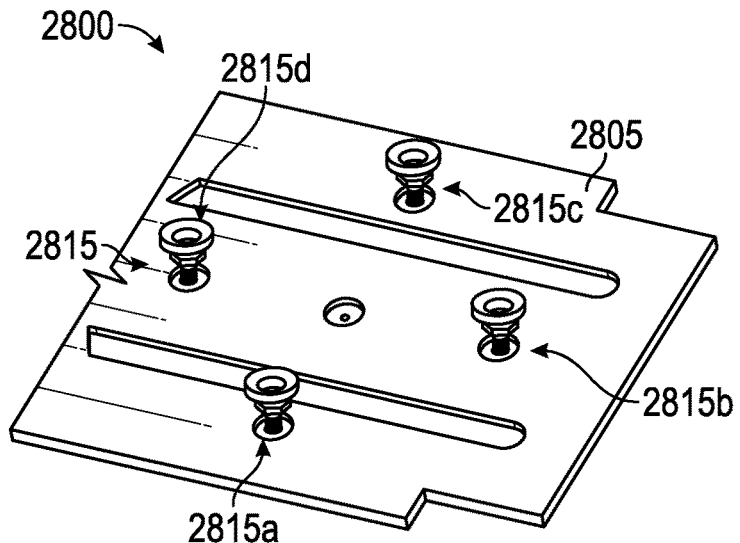
FIG. 44A shows a box lid shuttle of the box lid positioning system.
Figure 44B:
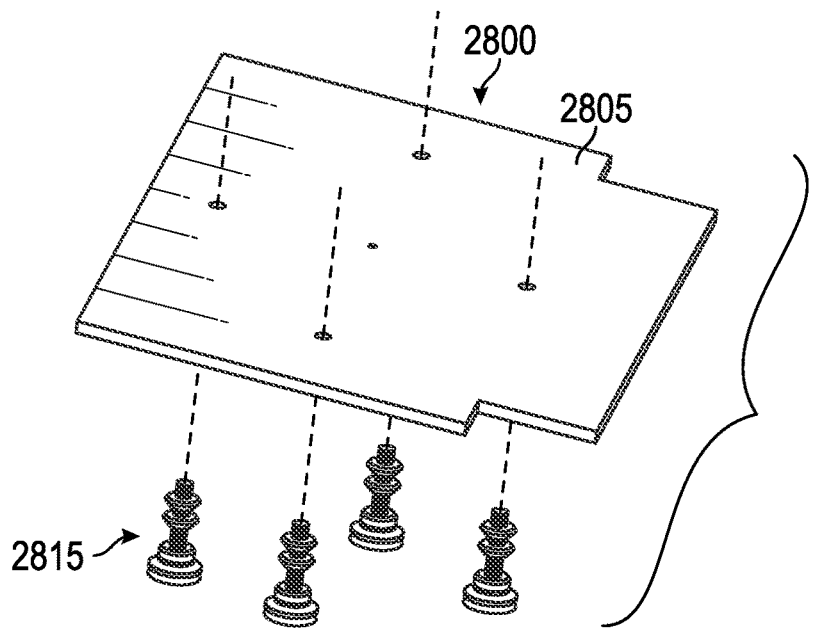
FIG. 44B shows an exploded view of the box lid shuttle including a plurality of vacuum grip members.

FIGS. 44A-B show the shuttle 2800. The shuttle 2800 can include a base 2805. The base 2805 can be generally planar. The shuttle 2800 can include one or more vacuum members 2815. The vacuum members 2815 can include the vacuum members 2815a-d. The vacuum members 2815 can be spaced at intervals around a periphery of the base 2805. The vacuum members 2815 can be coupled with a vacuum source.

Figure 45:
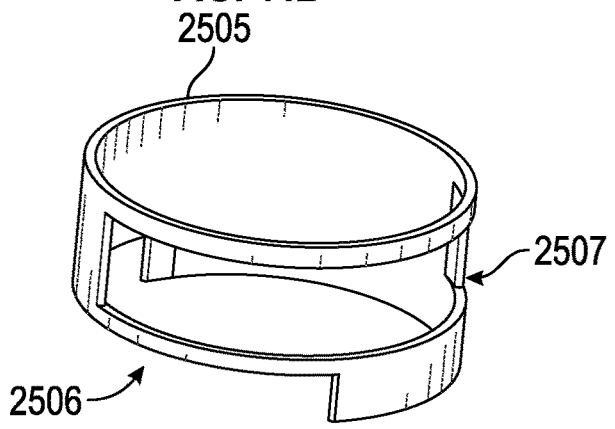
FIG. 45 shows a perspective view of an alignment column of the boxing station.

FIGS. 45A-C show the alignment sleeve 2505. The alignment sleeve 2505 can generally cylindrical open at top and/or bottom ends. The alignment sleeve 2505 can include the first slot 2506 that is generally aligned with the elevator 2600 and the rails 2251 for receiving the box bottom. The second slot 2507 can be aligned with the rails 2261 and generally used to receive the box lid coupled with the shuttle 2800. The alignment sleeve 2505 generally functions to help maintain and align the box lid and box bottom with the opening 1830.

Figure 46A:
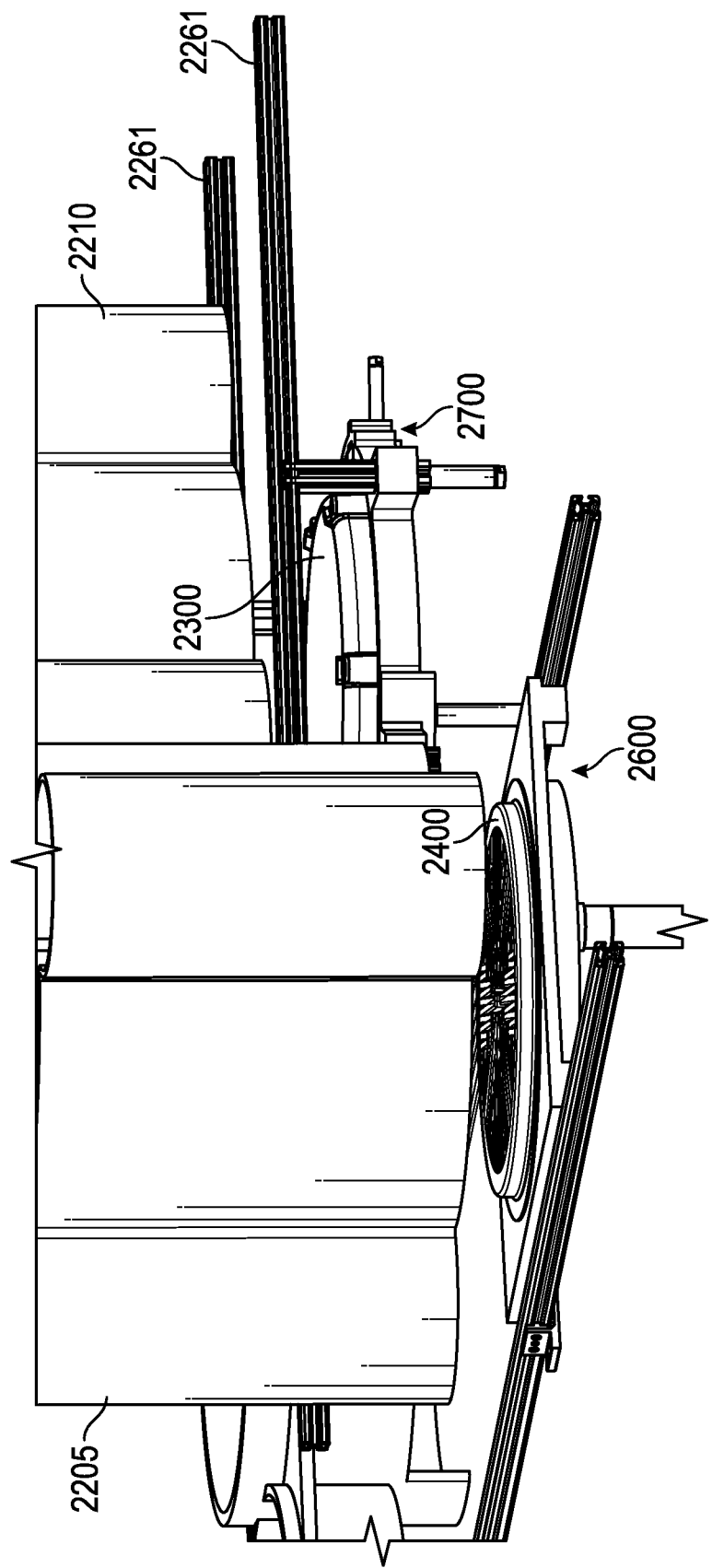
FIG. 46A shows catching a box bottom from a hopper on the elevator of the box bottom positioning system.

Operation of the boxing station 1755 is shown in FIGS. 46A-51. FIG. 46A shows the box bottom 2400 dispensed onto the elevator 2600 from the box bottom hopper 2205. The box bottom 2400 is caught on the elevator platform 2605. An underside of the box bottom 2400 can engage with the upper surface of the elevator platform 2605. The elevator 2600 can then be conveyed along the rails 2251 into the alignment sleeve 2505 (e.g., through the first slot 2506) or otherwise aligned below the opening 1830 of the lower dial member 1806, as shown in FIGS. 46B-47A. As shown in FIGS. 47B-48A, the lift actuators 2630 can lift the elevator platform 2605 and the box bottom 2400 up into the opening 1830. The support surface 2405 of the box bottom 2400 can be aligned with the upper surface 1806a of the lower dial member 1806. The upper dial member 1801 can be rotated to move the finished pizza (within the openings 1820) onto the support surface 2405 of the box bottom 2400 at the boxing station 1755. The elevator 2600 can then be lowered with the box bottom 2400 and the pizza, as shown in FIG. 48B.

Figure 46B:
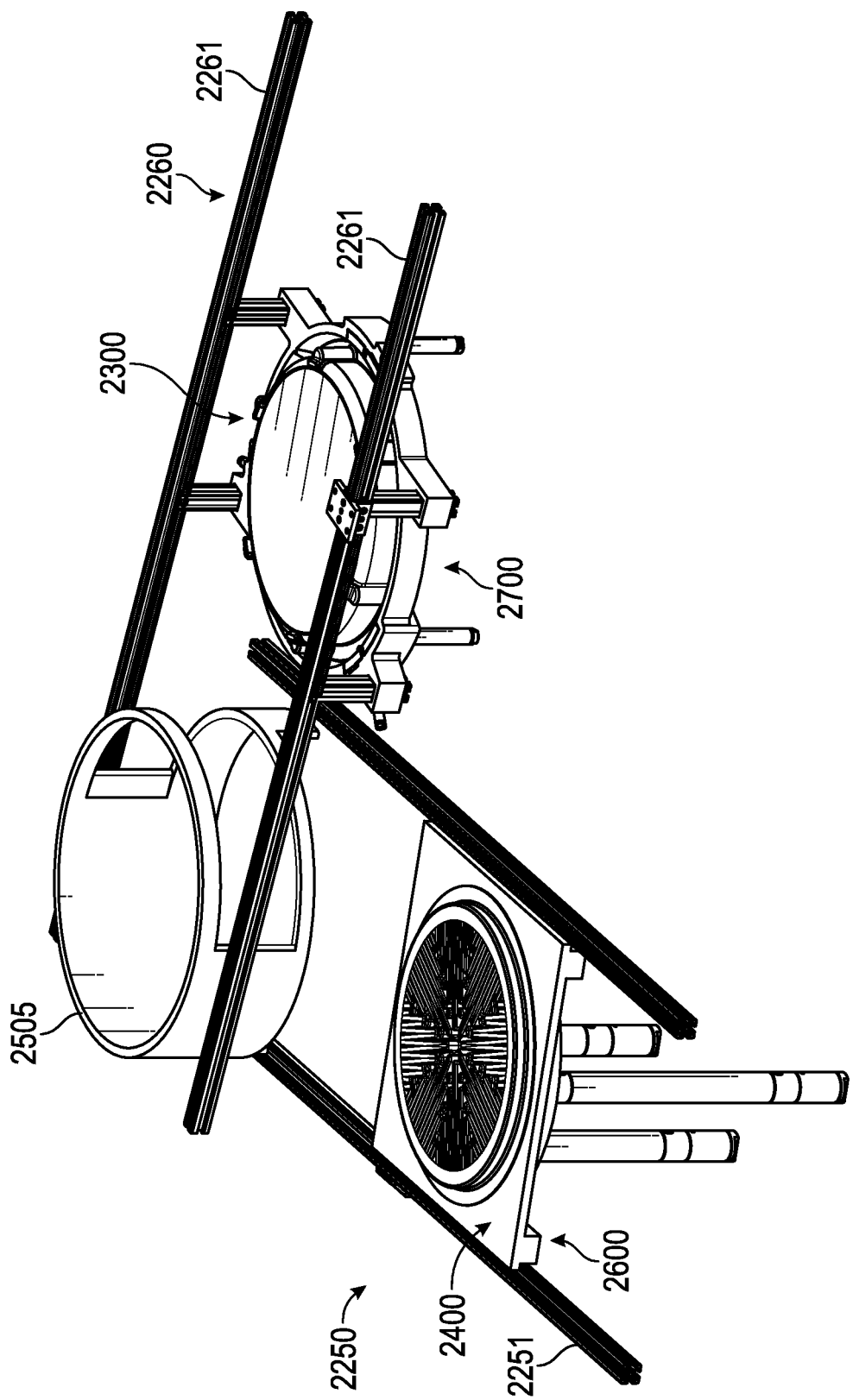
FIG. 46B shows advancing the elevator towards the alignment column.
Figure 47A:
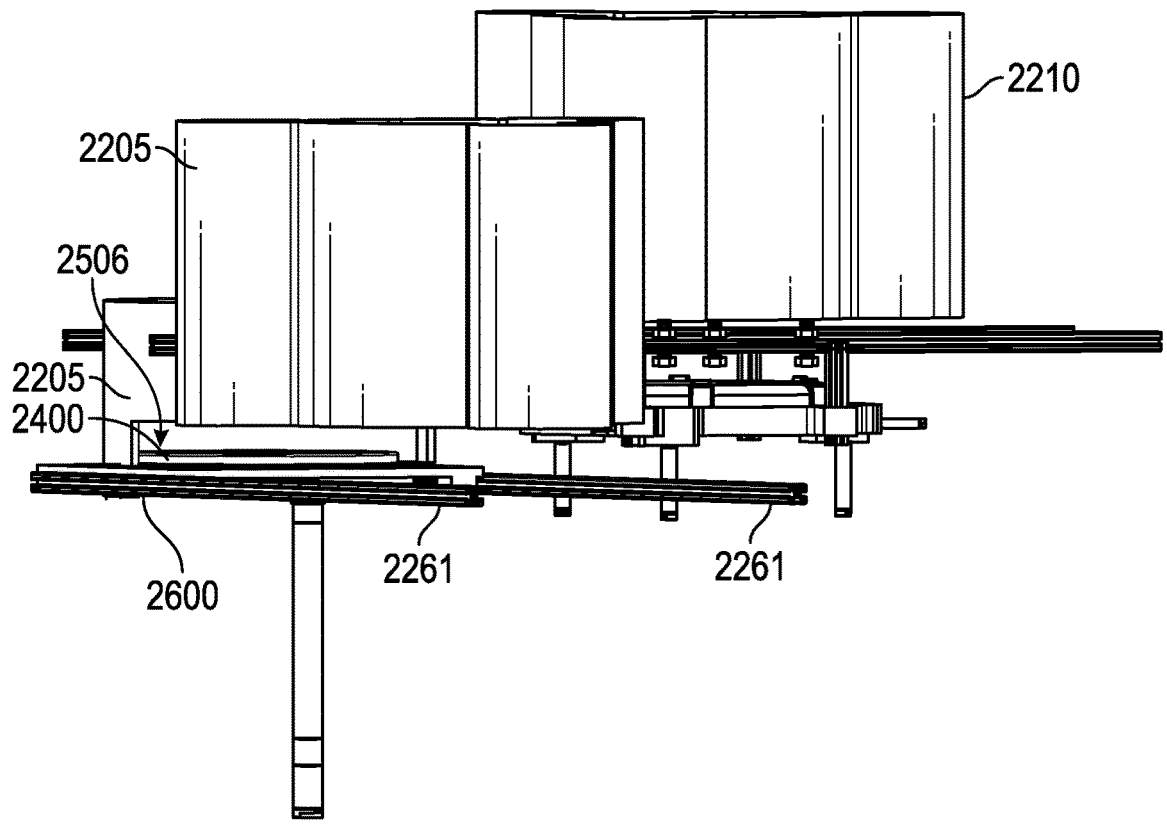
FIGS. 47A-B show lifting a box bottom through the alignment column with the elevator.
Figure 47B:
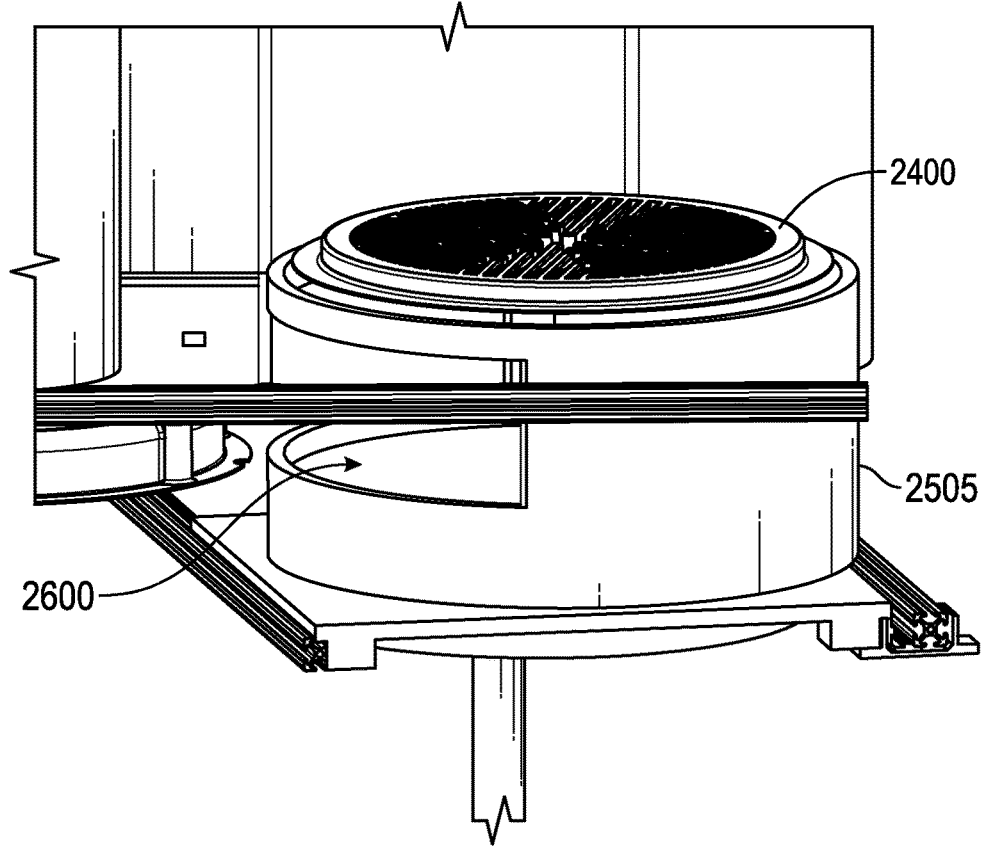
Figure 49A:
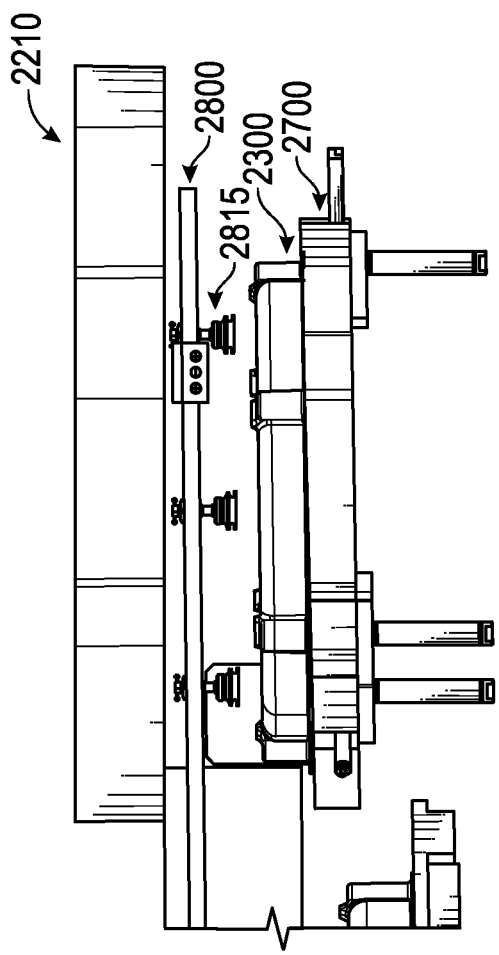
FIG. 49A shows catching a box lid from the hopper in the box lid catch tray.
Figure 49B:
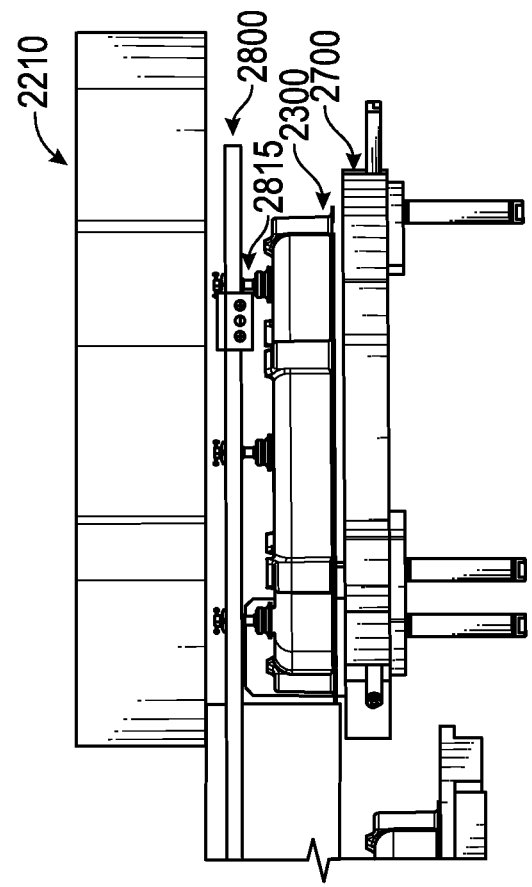
FIG. 49B shows gripping the box lid using the vacuum grippers of the box lid shuttle.
Figure 48A:
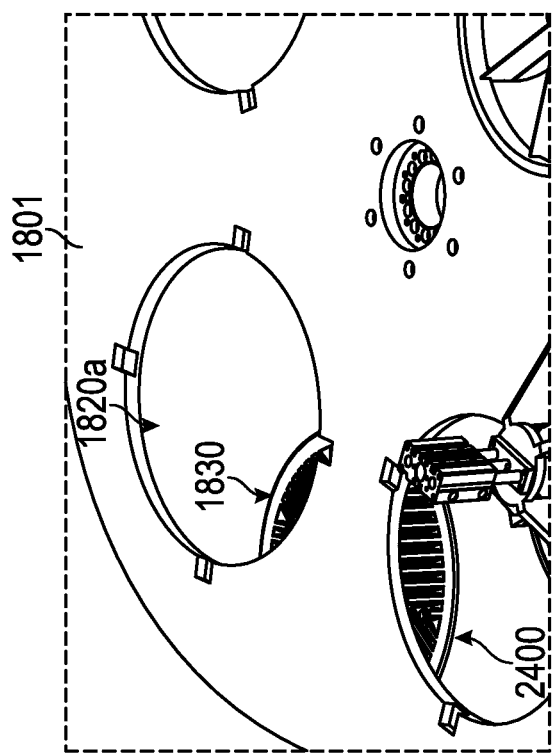
FIG. 48A shows rotating the upper dial member to advance a pizza over the box bottom at the boxing station.
Figure 48B:
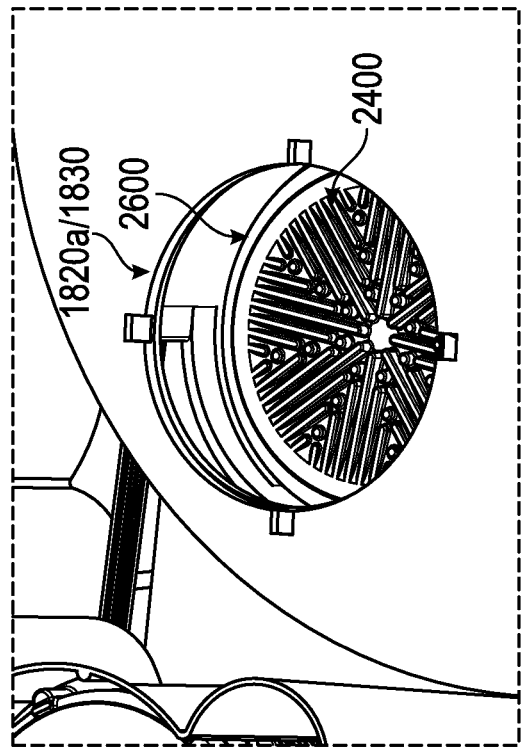
FIG. 48B shows lowering the elevator within the alignment column.

As shown in FIG. 46B, a box lid 2300 can be dispensed onto the box lid catch 2700. The centering mechanisms 2708 can center the box lid 2300 on the catch 2700. The shuttle 2800 can be positioned over the box lid catch 2700. The lift mechanisms 2709 can lift the box lid 2300 into contact with or adjacent the vacuum members 2815 of the shuttle 2800. The vacuum source can be engaged and the vacuum members 2815 can grip the upper domed portion 2305 of the box lid 2300, as shown in FIG. 49B. A bottom of the box lid 2300 can be above an uppermost surface of the box lid catch 2700 (e.g., the rim 2707) to allow the box lid 2300 to clear the box lid catch 2700 when conveyed with the shuttle 2800.

Figure 50A:
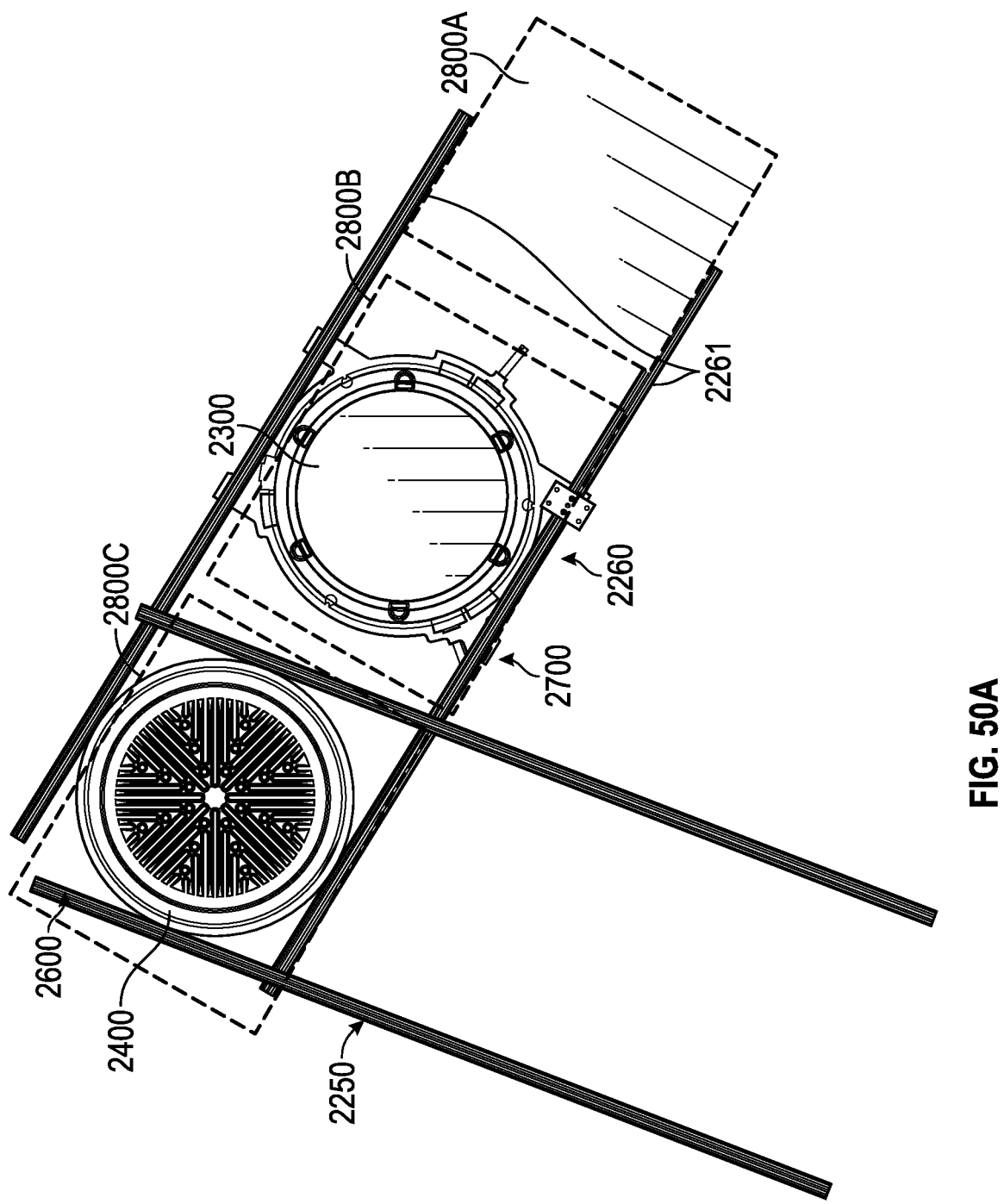
FIGS. 50A-B show positioning a box lid over the box bottom with the box lid shuttle.
Figure 50B:
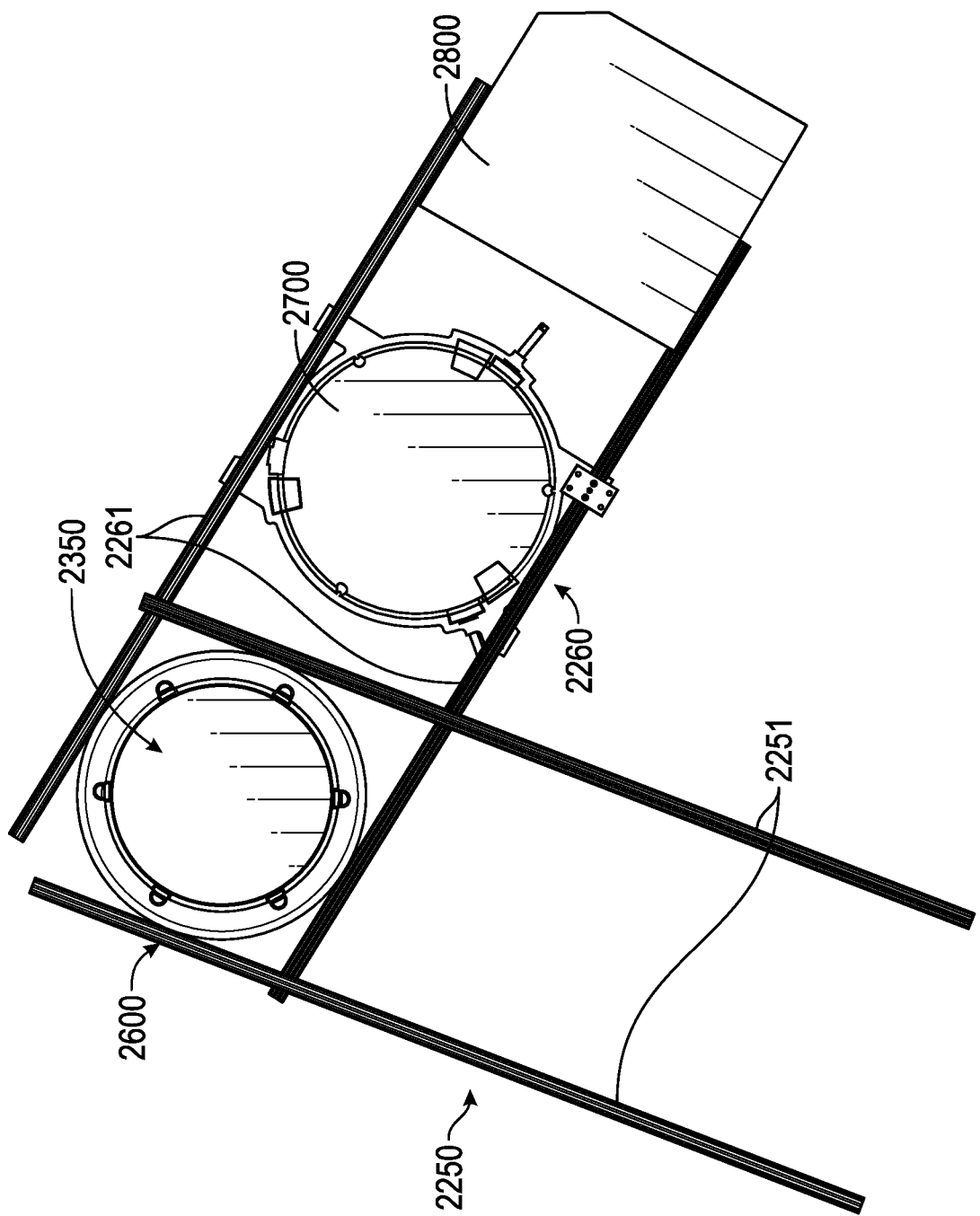

As shown in FIGS. 50A-B, the shuttle 2800 and box lid 2300 can be conveyed along the rails 2261 to align with the box bottom 2400. The rails 2261 can align or cross the rails 2251. Optionally, the shuttle 2800 and box lid 2300 can be aligned with the opening 1830 and/or the sleeve 2505. The box lid 2300 can be positioned over the box bottom 2400 using the shuttle 2800. The positions of the shuttle 2800 along the rails 2261 are shown by represented by the dash line boxes 2800A-C. The positions can include 1) an initial position 2800A; 2) over the box lid catch 2700 position 2800B; and/or 3) over the box bottom 2400 position 2800C.

With the box lid 2300 over the box bottom 2400, the elevator 2600 can lift the box bottom 2200 up into contact with the box lid 2300. The elevator 2600 can securely engage the box bottom 2400 with the box lid 2300 to form the finished box 2350. The support surface 2405 and the pizza can be received within the upper domed portion 2305 of the box lid 2300. The vacuum members 2815 can release the box lid 2300.

Figure 51:
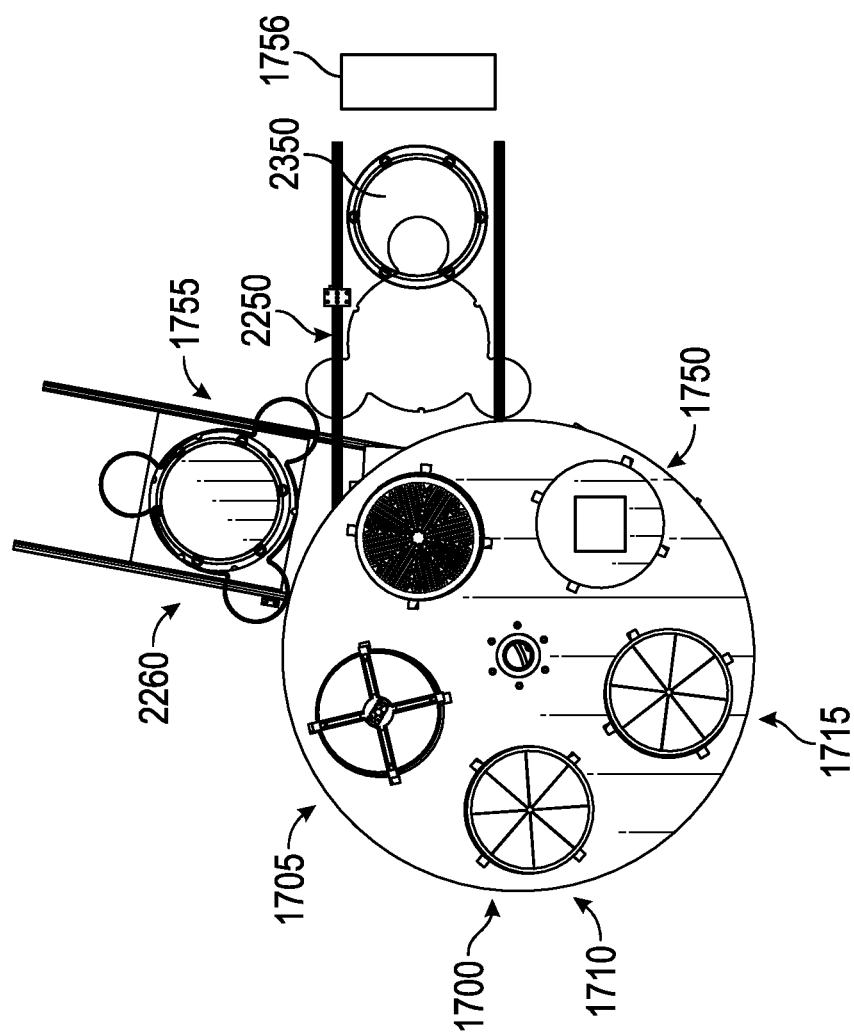
FIG. 51 shows a removing the box pizza from the boxing station.

As shown in FIG. 51, the fully finished box 2350 can then be conveyed along the rails 2251. The finished box 2350 can be ejected using a linear actuator or other mechanism. The finished box 2350 can be ejected into a chute or rack to a customer. When assembled within a vehicle, the chute can lead outside the vehicle to a retrieval station.

In certain implementations, the boxing station 1755 can further include a labeler 1756. The labeler 1756 can be located along the rails 2251. The labeler 1756 can apply a label to the finished box 2350 (e.g., applying sticker or printing) indicating one or more characteristics of the pizza or order being fulfilled.

Figure 52:
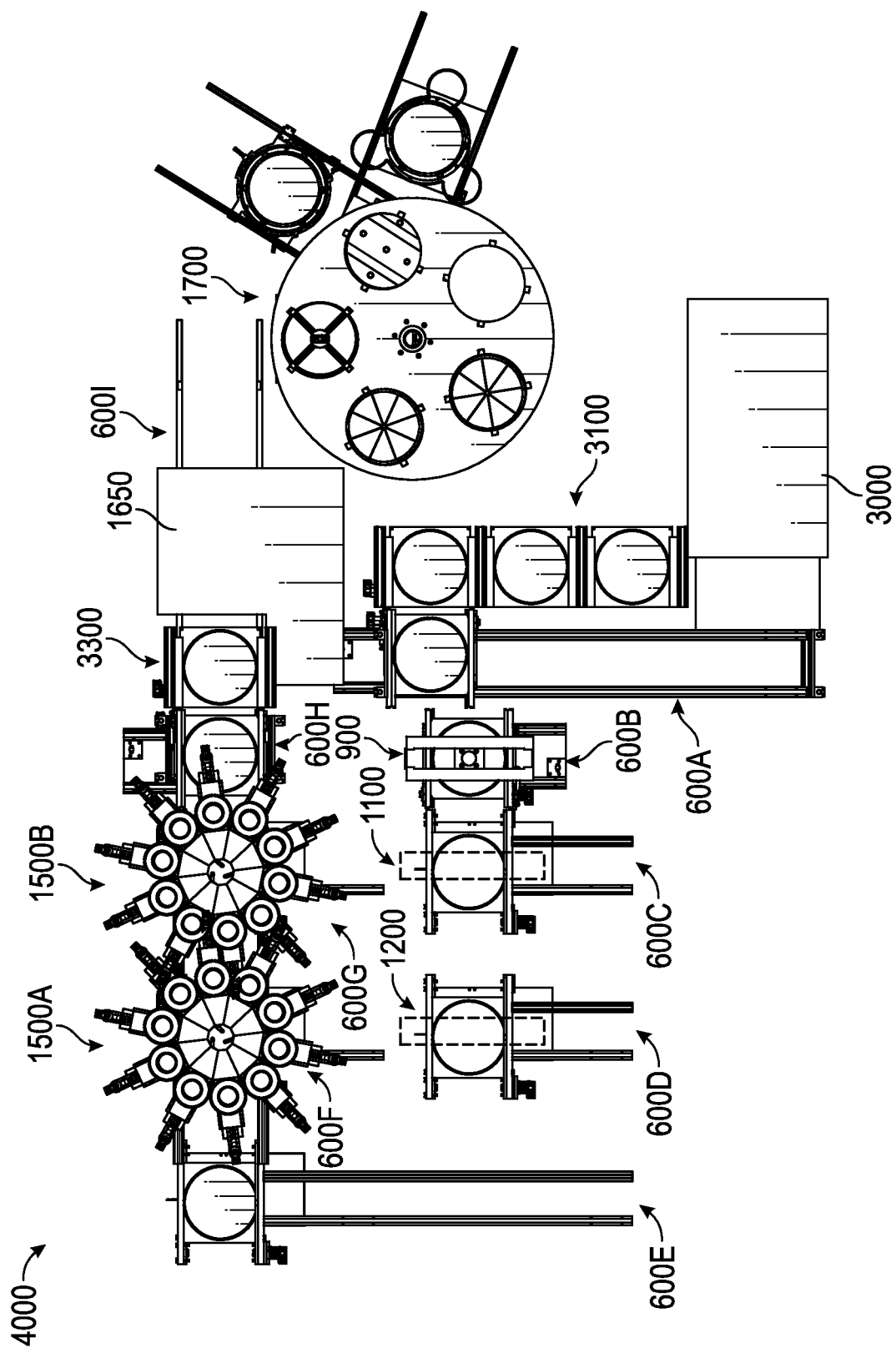
FIG. 52 shows an overview of an automated pizza-making system.

FIG. 52 shows an overall layout of an automated pizza-making system 4000. The system 4000 can include implementations of the components of the automated pizza-making system 100 as described above. The system 4000 can be installed within a vehicle. Pan drive system 600 (e.g., pan drive system 600A-H) can convey pizza pans through the system 4000. The pan drive system 600 can include rails for conveyance in x, y, and/or x directions.

The system 4000 can include a dough divider and rounder 3000. The dough divider and rounder 3000 can be dispense dough onto the two-piece pizza pan 400. The two-piece pizza pan 400 can be positioned in relation to the divider and rounder 3000 by first pan drive system 600A. The first pan drive system 600A can placing the pizza pans on a proofing rack 3100.

The system 4000 can include a dough press station 900. Once dough is sufficiently proofed, the first pan drive system 600A can convey the pan into a dough press station 900. The second pan drive system 600B can receive the pan from the first pan drive system 600A. The dough press station 900 can press the dough flat.

The system 4000 can include a sauce dispenser station 1100. After pressing, the second pan drive system 600B can convey the pan to the sauce dispenser station 1100. The third pan drive system 600C can receive the pan from the second pan drive system 600B. The sauce dispenser station 1000 can apply a sauce to the dough on the pan and/or disperse the sauce.

The system 4000 can include a bulk topping station 1200. After receiving sauce, the third pan drive system 600C can convey the pan to the bulk topping station 1200. The fourth pan drive system 600D can receive the pan from the third pan drive system 600C. The bulk topping station 1200 can dispense cheese or meat slices onto the dough on the pan. Optionally, multiple bulk topping dispensers can be included in the system 4000 for dispensing different ingredients.

The dough divider and rounder 3000, the proofing rack 3100, the dough press station 900, the sauce dispenser station 1100 and/or the bulk topping station 1200 can be located on a first side of the system 4000. The fifth pan drive system 600E can bridge the first side with a second side. The fifth pan drive system 600E can receive the pan from the fourth pan drive system 600D.

The system 4000 can include a first loose topping station 1500A. The sixth pan drive system 600F can receive the pan from the fifth pan drive system 600E. The first loose topping station 1500A can dispense loose toppings onto the dough on the pan. Optionally, a second loose topping station 1500B can be included in the system 4000 for dispensing different ingredients. The seventh pan drive system 600G can receive the pan from the sixth pan drive system 600F at the second loose topping station 1500B.

The system 4000 can include a pre-oven queue 3300. The pre-oven queue 3300 can be used in conjunction with a pan drive system 600H. The pan drive system 600H can be operable in the x and z directions. The pre-oven queue 3300 can be used to store and/or re-order pizzas for cooking and final delivery to a customer. The pre-oven queue 3300 can also be used to await heating of an oven 3200.

The system 4000 can include the oven 3200. The oven 3200 can include pan drive system 600I for conveying the pans through the oven for cooking. The pan drive system 600I can include heat-tolerant components such as steel timing belts. The pan drive system 600I can receive the pans from the pan drive system 600H.

The system 4000 can include the finish dial 1700. After cooking in the oven 3200, the pizzas can be conveyed to the finish dial 1700 on the pan drive system 600I. The pan drive system 600I can convey the pizza pan to the lift 1900. At the finish dial 1700, the pizza can be removed from the pan and conveyed about the finish dial 1700 for ring removal, slicing, glazing boxing, and/or delivery to a customer, as described above.

Certain Terminology

Terms of orientation used herein, such as "top," "bottom," "proximal," "distal," "longitudinal," "lateral," and "end," are used in the context of the illustrated example. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain examples include or do not include, certain features, elements, and/or steps. Thus, such conditional language is not generally intended to imply that features, elements, and/or steps are in any way required for one or more examples.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

The terms "approximately," "about," and "substantially" as used herein represent an amount close to the stated amount that still performs a desired function or achieves a desired result. For example, in some examples, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain examples, as the context may dictate, the term "generally parallel" can refer to something that departs from exactly parallel by less than or equal to 20 degrees. All ranges are inclusive of endpoints.

Several illustrative examples of automated pizza-making system have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one example in this disclosure can be combined or used with (or instead of) any other portion of any of the steps, processes, structures, and/or devices disclosed or illustrated in a different example or flowchart. The examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various examples can be used in all other examples set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures or description herein. For example, various functionalities provided by the illustrated modules can be combined, rearranged, added, or deleted. In some implementations, additional or different processors or modules may perform some or all of the functionalities described with reference to the examples described and illustrated in the figures. Many implementation variations are possible. Any of the features, structures, steps, or processes disclosed in this specification can be included in any example.

In summary, various examples of an automated pizza-making system and related methods have been disclosed. This disclosure extends beyond the specifically disclosed examples to other alternative examples and/or other uses of the examples, as well as to certain modifications and equivalents thereof. Moreover, this disclosure expressly contemplates that various features and aspects of the disclosed examples can be combined with, or substituted for, one another. Accordingly, the scope of this disclosure should not be limited by the particular disclosed examples described above, but should be determined only by a fair reading of the claims.

What is claimed is:

1. A loose topping dispenser for an automated pizza system comprising:
   a hopper configured to store loose toppings;
   an opening assembly coupled with a first end of the hopper and configured to open the hopper to release the loose toppings;
   a distribution belt positioned above a pizza pan, the distribution belt configured to advance in a first direction wherein the opening assembly drops the loose toppings on the distribution belt and the distribution belt is advanced to drop the loose toppings on a dough on the pizza pan, the pizza pan positioned below the distribution belt; and
   a mix and distribute assembly configured to spread the loose toppings on the distribution belt before being dropped onto the dough, wherein the mix and distribute assembly comprises a plurality of rotatable brushes engaged with a top surface of the distribution belt, wherein the mix and distribute assembly includes a guard, the guard positioned over the top surface of the distribution belt with the plurality of rotatable brushes at least partially therein, the guard including a vertical wall configured to prevent spillage of the loose toppings from the distribution belt, and wherein the plurality of rotatable brushes are planetary gears and the mix and distribute assembly includes a rim gear engaged with the planetary gears.

2. The loose topping dispenser of claim 1, wherein the rim gear includes at least one non-rotating brush configured to sweep loose topping away from an outer circumference of the guard.

3. The loose topping dispenser of claim 1, further comprising:
   a funnel, a wide end of the funnel aligned below the opening assembly and a narrow end of the funnel positioned above the distribution belt.

4. The loose topping dispenser of claim 3, wherein the hopper is one of a plurality of hoppers positioned above the wide end of the funnel.

5. The loose topping dispenser of claim 1, further comprising:
   a rail set including a first rail having a first pan slot and a second rail having a second pan slot for conveying the pizza pan in the first direction.

6. The loose topping dispenser of claim 5, wherein the rail set is configured to move the pizza pan along the first direction as the distribution belt advances the loose toppings in the first direction such that the loose toppings are deposited on the dough on the pizza pan.

7. The loose topping dispenser of claim 5, wherein the pizza pan is stationary on the rail set as the distribution belt advances the loose toppings.

8. The loose topping dispenser of claim 5, wherein the pizza pan is movable in the second direction on the rail set as the distribution belt advances the loose toppings in the first direction such that the loose toppings are dropped on only a first portion of the dough.

9. The loose topping dispenser of claim 1, wherein the distribution belt includes a sliding rail, the sliding rail configured to retract the distribution belt in a second direction relative to the pizza pan as the distribution belt advances the loose toppings in the first direction such that the loose toppings are dropped on the dough on the pizza pan.

10. The loose topping dispenser of claim 9, wherein the sliding rail is configured to retract the distribution belt at a first speed in the second direction and the pizza pan is movable at a second speed in the second direction.

11. The loose topping dispenser of claim 1, wherein a first set of loose toppings are dropped on a first portion of the dough and a second set of loose toppings are dropped on a second portion of the dough.

12. The loose topping dispenser of claim 1, wherein the distribution belt is configured to drop the loose toppings at a first end of the distribution belt, and wherein the distribution belt includes a mandrel at a second end of the distribution belt.

13. The loose topping dispenser of claim 12, wherein the mandrel is configured to rotate to advance the distribution belt in the first direction and retract the first end of the distribution belt in a second direction.

14. The loose topping dispenser of claim 13, wherein the distribution belt includes a roller at the first end of the distribution belt.

15. The loose topping dispenser of claim 14, wherein the roller is biased in the first direction so the roller supports the distribution belt.

16. A loose topping dispenser for an automated pizza system comprising:
  a hopper configured to store loose toppings;
  an opening assembly coupled with a first end of the hopper and configured to open the hopper to release the loose toppings; and
  a distribution belt positioned above a pizza pan, the distribution belt configured to advance in a first direction at a first speed;
  wherein the opening assembly is configured to drop the loose toppings on the distribution belt and the distribution belt is configured to drop the loose toppings on a dough on the pizza pan positioned below the distribution belt;
  wherein the distribution belt includes a rail, the rail being configured to retract the distribution belt in a second direction relative to the pizza pan as the distribution belt advances the loose toppings in the first direction such that the loose toppings are dropped on the dough on the pizza pan;
  wherein the pizza pan is configured to be moved in the second direction at a second speed that is half of the first speed such that the loose topping are dropped on only half of the dough, in use.

17. A loose topping dispenser for an automated pizza system comprising:
  a hopper configured to store loose toppings;
  an opening assembly coupled with a first end of the hopper and configured to open the hopper to release the loose toppings; and
  a distribution belt positioned above a pizza pan, the distribution belt configured to advance in a first direction;
  wherein the opening assembly drops the loose toppings on the distribution belt and the distribution belt is advanced to drop the loose toppings on a dough on the pizza pan, the pizza pan positioned below the distribution belt;
  wherein the distribution belt includes a sliding rail, the sliding rail configured to retract the distribution belt in a second direction relative to the pizza pan as the distribution belt advances the loose toppings in the first direction such that the loose toppings are dropped on the dough on the pizza pan;
  wherein the pizza pan is movable in the second direction on a rail set as the distribution belt advances the loose toppings in the first direction such that the loose topping are dropped on only a first portion of the dough, wherein the sliding rail is configured to retract the distribution belt at a first speed in the second direction and the pizza pan is movable at a second speed in the second direction, and wherein the second speed is half of the first speed.

* * * * *